United States Patent
Katoh et al.

(10) Patent No.: US 10,942,438 B2
(45) Date of Patent: Mar. 9, 2021

(54) STRUCTURE AND METHOD OF MANUFACTURING STRUCTURE

(71) Applicant: FUJIFILM Corporation, Tokyo (JP)

(72) Inventors: Shunya Katoh, Kanagawa (JP); Rie Takasago, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/553,134

(22) Filed: Aug. 27, 2019

(65) Prior Publication Data

US 2019/0391479 A1 Dec. 26, 2019

Related U.S. Application Data

(63) Continuation of application No. PCT/JP2018/007747, filed on Mar. 1, 2018.

(30) Foreign Application Priority Data

Mar. 2, 2017 (JP) .............................. JP2017-039413

(51) Int. Cl.
  *G03B 21/604* (2014.01)
  *B32B 7/023* (2019.01)
  (Continued)

(52) U.S. Cl.
  CPC ............ *G03B 21/604* (2013.01); *B32B 7/023* (2019.01); *G02B 5/26* (2013.01); *G02B 5/3066* (2013.01);
  (Continued)

(58) Field of Classification Search
  CPC ........ G03B 21/604; B32B 7/023; G02B 5/26; G02B 5/3066; G02F 1/133536
  (Continued)

(56) References Cited

U.S. PATENT DOCUMENTS

| 4,456,336 A * | 6/1984 | Chung ................. G02B 3/0043 349/113 |
| 6,876,427 B2 * | 4/2005 | Bowley ................. C09K 19/02 252/299.01 |

(Continued)

FOREIGN PATENT DOCUMENTS

| JP | 2005037735 | 2/2005 |
| JP | 2005049866 | 2/2005 |

(Continued)

OTHER PUBLICATIONS

"International Search Report (Form PCT/ISA/210) of PCT/JP2018/007747," dated May 15, 2018, with English translation thereof, pp. 1-3.

(Continued)

*Primary Examiner* — Clayton E. LaBalle
*Assistant Examiner* — Kevin C Butler
(74) *Attorney, Agent, or Firm* — JCIPRNET

(57) ABSTRACT

An object of the present invention is to provide a structure having an excellent diffuse reflectivity and a method of manufacturing a structure. The object is achieved by a structure including a plurality of reflection layers formed by fixing a cholesteric liquid crystalline phase, the reflection layers being laminated, in which in a reflection layer, a bright portion and a dark portion derived from the cholesteric liquid crystalline phase have wavy structures in a cross section, and undulations of the wavy structures of bright portions closest to each other coincide in the adjacent reflection layers; and by a method of manufacturing a structure including forming a reflection layer formed by fixing a cholesteric liquid crystalline phase, in which a bright portion and a dark portion have wavy structures, in a cross section, and forming the reflection layer on a first reflection (Continued)

layer by a coating method using an composition containing a liquid crystal compound and a chiral agent.

13 Claims, 3 Drawing Sheets

(51) Int. Cl.
  *G02B 5/26* (2006.01)
  *G02B 5/30* (2006.01)
  *G02F 1/1335* (2006.01)

(52) U.S. Cl.
  CPC ...... *G02F 1/133536* (2013.01); *G02B 5/3033* (2013.01)

(58) Field of Classification Search
  USPC .......................................................... 359/443
  See application file for complete search history.

(56) References Cited

U.S. PATENT DOCUMENTS

| | | | |
|---|---|---|---|
| 7,746,421 B2 * | 6/2010 | Takahashi | G02F 1/13362 349/62 |
| 2001/0026335 A1 * | 10/2001 | Moon | G02F 1/133512 349/63 |
| 2001/0050739 A1 * | 12/2001 | Jung | G02F 1/133536 349/115 |
| 2003/0142250 A1 * | 7/2003 | Kawahara | G02F 1/133536 349/96 |
| 2010/0025641 A1 * | 2/2010 | Jimbo | G02B 5/26 252/587 |
| 2010/0214657 A1 * | 8/2010 | Kuroda | G02B 27/288 359/485.02 |
| 2014/0293436 A1 * | 10/2014 | Nagahama | E06B 9/386 359/634 |
| 2016/0223730 A1 * | 8/2016 | Kim | G02B 5/3083 |

FOREIGN PATENT DOCUMENTS

| | | | | |
|---|---|---|---|---|
| JP | 2015141318 | | 8/2015 | |
| WO | 2017030176 | | 2/2017 | |
| WO | WO-2017030176 A1 * | 2/2017 | ............. G03B 21/14 |

OTHER PUBLICATIONS

"Written Opinion of the International Searching Authority (Form PCT/ISA/237) of PCT/JP2018/007747," dated May 15, 2018, with English translation thereof, pp. 1-8.

"Office Action of Japan Counterpart Application", dated May 26, 2020, with English translation thereof, p. 1-p. 10.

* cited by examiner

US 10,942,438 B2

STRUCTURE AND METHOD OF MANUFACTURING STRUCTURE

CROSS-REFERENCE TO RELATED APPLICATIONS

This application is a Continuation of PCT International Application No. PCT/JP2018/007747 filed on Mar. 1, 2018, which claims priority under 35 U.S.C. § 119(a) to Japanese Patent Application No. 2017-039413 filed on Mar. 2, 2017. The above application is hereby expressly incorporated by reference, in its entirety, into the present application.

BACKGROUND OF THE INVENTION

1. Field of the Invention

The present invention relates to a structure in which a reflection layer is laminated, and a method of manufacturing the structure.

2. Description of the Related Art

A layer formed by fixing a cholesteric liquid crystalline phase is known as a layer having a property of selectively reflecting either right circular polarization light or left circular polarization light in a specific wavelength range. For this reason, it has been developed for various applications, for example, it is used as a phase difference layer (JP2005-049866A). Further, in JP2005-049866A, a direction of an alignment regulating force of an alignment film is set in a random state, and therefore the direction of a director of a liquid crystal compound in contact with the alignment film is made randomly.

SUMMARY OF THE INVENTION

On the other hand, expansion of a viewing angle is required from a viewpoint of applying a layer formed by fixing the cholesteric liquid crystalline phase to a projection image display member such as a projection screen.

More specifically, in a case where light is incident from a normal direction of a surface of the layer formed by fixing the cholesteric liquid crystalline phase, either the right circular polarization light or the left circular polarization light is selectively reflected. At that time, in a case where a reflection is made not only in the normal direction but also in an oblique direction, it leads to an improvement in visibility from the oblique direction. In other words, the reflection layer is required to have excellent characteristics in which incident light is reflected in various directions (a so-called diffuse reflectivity).

Present inventors have produced a reflection layer using an alignment film which is described in JP2005-049866A and is not subjected to a rubbing treatment, and studied the diffuse reflectivity of the reflection layer. As a result, the diffuse reflectivity did not satisfy a recently required level and therefore a further improvement was necessary.

In view of an above situation, an object of the present invention is to provide a structure having an excellent diffuse reflectivity by having a plurality of reflection layers and all the reflection layers having the good diffuse reflectivity, and a method of manufacturing the structure.

The present inventors have conducted intensive studies on the above problems, and found that a reflection layer having desired characters could be manufactured by providing a reflection layer, on a substrate, which is formed by fixing a cholesteric liquid crystalline phase, in which a bright portion and a dark portion derived from the cholesteric liquid crystalline phase have wavy structures in a cross section, and laminating the reflection layer formed by fixing the cholesteric liquid crystalline phase by a coating method.

That is, the present inventors have found that the above described object can be achieved by the following configuration.

[1] A structure comprising:
a plurality of reflection layers formed by fixing a cholesteric liquid crystalline phase, the reflection layers being laminated,
in which in a reflection layer, a bright portion and a dark portion derived from the cholesteric liquid crystalline phase have wavy structures in a cross section of the structure, and
undulations of the wavy structures of bright portions closest to each other coincide in adjacent reflection layers.

[2] The structure according to [1], wherein a selective reflection wavelength of at least one of the plurality of reflection layers is different from selective reflection wavelengths of other reflection layers.

[3] The structure [2], in which in the reflection layer having the selective reflection wavelength different from those of the other reflection layers, the difference of the selective reflection wavelength from those of the other reflection layers is 10 nm or more.

[4] The structure according to any one of [1] to [3], further comprising:
three or more of the reflection layers,
in which at least one of the reflection layers reflects red light, at least one of the reflection layers reflects green light, and at least one of the reflection layers reflects blue light.

[5] The structure according to any one of [1] to [4], in which in the wavy structure of the reflection layer in the cross section of the structure, a pitch of the wavy structure of the bright portion closest to the adjacent reflection layer is 0.5 to 5 μm.

[6] The structure according to any one of [1] to [5], in which a thickness of the reflection layer is 0.5 to 30 μm.

[7] The structure according to any one of [1] to [6], in which the selective reflection wavelength of the reflection layer is 200 to 2000 nm.

[8] The method of manufacturing a structure comprising:
a step of forming a first reflection layer, which is a layer formed by fixing a cholesteric liquid crystalline phase, and in which a bright portion and a dark portion derived from the cholesteric liquid crystalline phase have wavy structures, in a cross section; and
a step of forming an upper reflection layer by applying an upper layer composition containing a liquid crystal compound and a chiral agent, and aligning the liquid crystal compound into a cholesteric liquid crystalline phase state,
in which after the step of forming the first reflection layer, the step of forming the upper reflection layer is performed on the first reflection layer, or further the step of forming the upper reflection layer is performed once or more times on the formed upper reflection layer.

[9] The method of manufacturing a structure according to [8], in which in the step of forming the first reflection layer, a treatment is performed, the treatment being for applying a first layer composition containing the liquid crystal compound and the chiral agent onto a substrate, and heating the applied first layer composition to align the liquid crystal compound into the cholesteric liquid crystalline phase state, and then a treatment for cooling or heating the first layer composition is performed.

[10] The method of manufacturing a structure according to [9], in which in the step of forming the first reflection layer, a treatment for curing the first layer composition is performed simultaneously with the cooling or the heating of the first layer composition, or after the first layer composition is cooled or heated.

[11] The method of manufacturing a structure according to any one of [8] to [10], in which in the step of forming the upper reflection layer, in a case where at least one of the upper reflection layers is formed, after the upper layer composition is applied, the upper layer composition is heated to align the liquid crystal compound into the cholesteric liquid crystalline phase state, and then the upper layer composition is cooled.

According to the present invention, it is possible to provide a structure having an excellent diffuse reflectivity by having a plurality of reflection layers and all the reflection layers having the good diffuse reflectivity, and a method of manufacturing the structure.

DESCRIPTION OF THE PREFERRED EMBODIMENTS

Hereinafter, the present invention will be described in detail.

Further, in the present specification, a numerical range expressed by using "to" means a range including numerical values described before and after "to" as a lower limit value and an upper limit value, respectively.

In addition, in the present specification, a term "(meth) acrylate" is a notation expressing both acrylate and methacrylate, a term "(meth)acryloyl group" is a notation expressing both acryloyl group and methacryloyl group, and a term "(meth)acrylic" is a notation expressing both acrylic and methacrylic.

In the present specification, visible light is light of a wavelength visible to human eyes among electromagnetic waves, and indicates light in a wavelength range of more than 400 nm and less than 700 nm. Nonvisible light is light in a wavelength range of 400 nm or less or a wavelength range of 700 nm or more. In addition, although not being subjected to this limitation, in the visible light, light in a wavelength range of 420 to 490 nm is blue light, light in a wavelength range of 495 to 570 nm is green light, and light in a wavelength range of 620 to 750 nm is red light.

Figure 1:
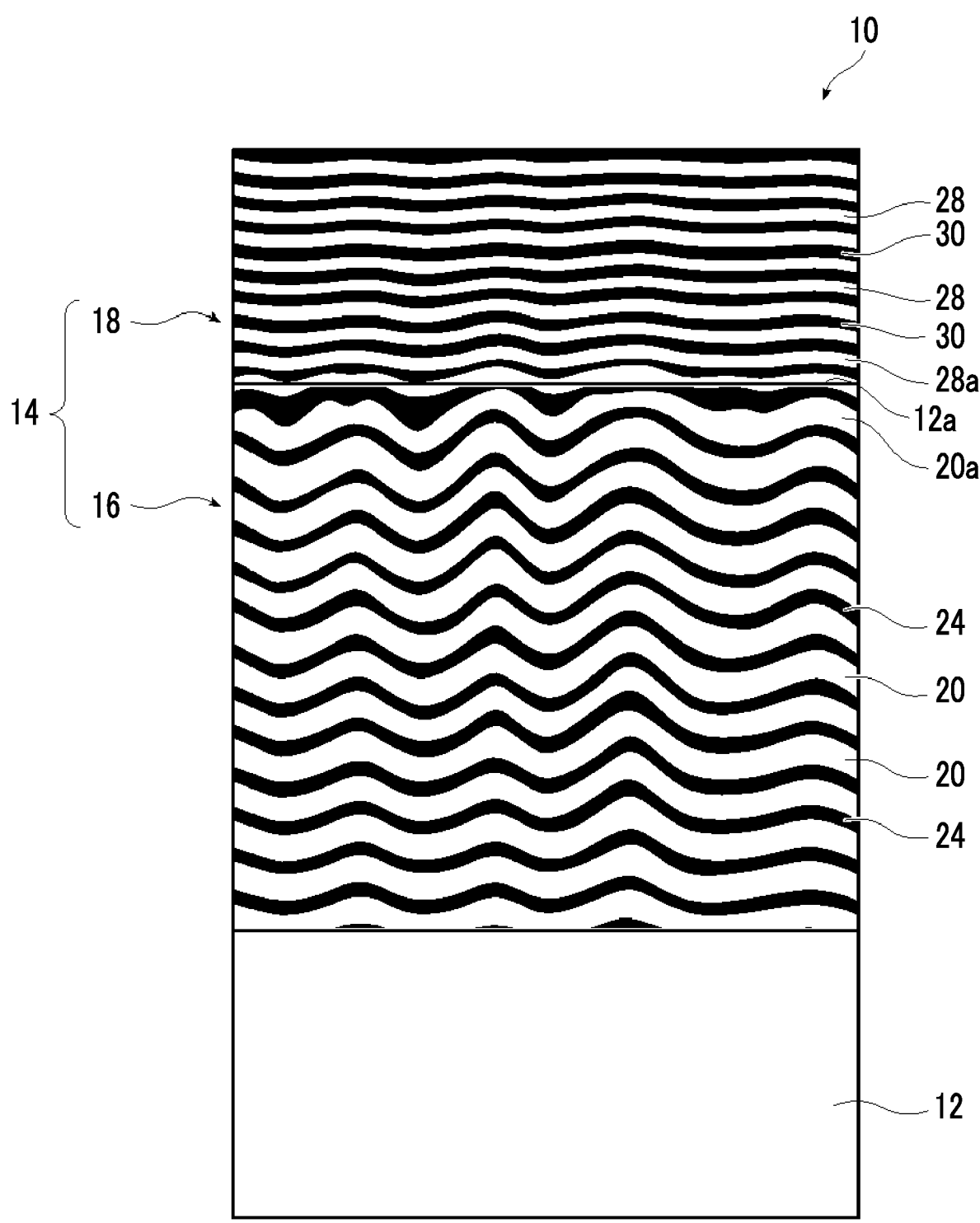
FIG. 1 is a view conceptually showing a cross section of a reflection member using a structure of the present invention.

FIG. 1 conceptually shows a cross section of an example of a reflection member using the structure of the present invention.

FIG. 1 is a view conceptually showing, for example, a state in which a cross section of a layer formed by fixing a cholesteric liquid crystalline phase is observed by a scanning electron microscope (SEM: Scanning Electron Microscope). In this regard, the same applies to FIGS. 2 and 3 described later.

A reflection member 10 shown in FIG. 1 has a substrate 12 and a structure 14 formed on one surface of the substrate 12. The structure 14 is a structure of the present invention, and has a first reflection layer 16 formed on the substrate 12 and an upper reflection layer 18 laminated on the first reflection layer 16.

The first reflection layer 16 and the upper reflection layer 18 are both layers formed by fixing the cholesteric liquid crystalline phase. Therefore, in the cross section of the first reflection layer 16 and the upper reflection layer 18 (the structure 14), a striped pattern, which is derived from the cholesteric liquid crystalline phase and in which a bright portion and a dark portion are alternately laminated in a thickness direction (a vertical direction in FIG. 1), is observed.

That is, in the cross section of the first reflection layer 16, a striped pattern in which a bright portion 20 and a dark portion 24 are alternately laminated in the thickness direction is observed, which is derived from the cholesteric liquid crystalline phase. On the other hand, in the cross section of the upper reflection layer 18, a striped pattern, which is derived from the cholesteric liquid crystalline phase and in which a bright portion 28 and a dark portion 30 are alternately laminated in the thickness direction, is observed.

In the following description, in a case where it is not necessary to distinguish between the first reflection layer 16 and the upper reflection layer 18, both are collectively referred to as a "reflection layer".

Here, in the structure 14 of the present invention, the bright portion and the dark portion in the cross section of the first reflection layer 16 and the upper reflection layer 18 have periodic wavy structures. The cross section of the first reflection layer 16 and the upper reflection layer 18 are cross sections of the reflection layer to be laminated.

That is, in the present invention, the reflection layer is a layer having a cholesteric liquid crystalline structure and having a structure in which an angle formed between a helical axis and a surface of the reflection layer periodically changes. In other words, the reflection layer is a reflection layer which has the cholesteric liquid crystalline structure, in which the cholesteric liquid crystalline structure gives the striped pattern of the bright portion and the dark portion in the cross-sectional view of the reflection layer observed by the scanning electron microscope, and the angle formed between a normal line formed by the dark portion and the surface of the reflection layer periodically changes.

Figure 2:
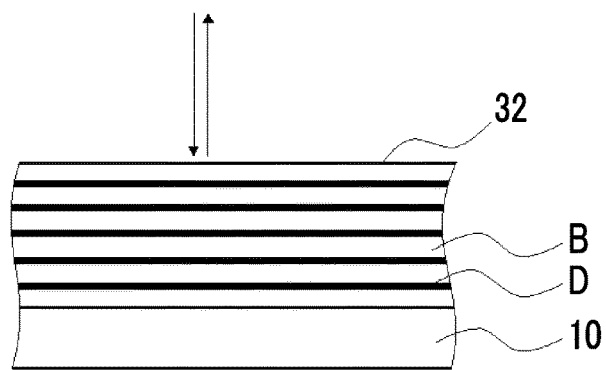
FIG. 2 is a conceptual diagram for explaining light reflection by a cholesteric liquid crystalline phase.

FIG. 2 conceptually shows a cross section of the layer formed by fixing a typical cholesteric liquid crystalline phase.

As described above, as shown in FIG. 2, in the cross section of a layer 32 formed by fixing the cholesteric liquid crystalline phase disposed on the substrate 12, a striped pattern of a bright portion B and a dark portion D is usually observed. That is, in the cross section of the layer formed by fixing the cholesteric liquid crystalline phase, a layered structure in which the bright portion B and the dark portion D are alternately laminated is observed.

In FIG. 2, one bright portion B and two dark portions D disposed above and below the one bright portion B correspond to one helical pitch of the cholesteric liquid crystalline phase.

Typically, the striped pattern (the layered structure) of the bright portion B and the dark portion D is formed to be parallel to the surface of the substrate 12 as shown in FIG.

2. In a case of such an aspect, a layer 32 shows a specular reflectivity. That is, in a case where the light is incident from a normal direction of the layer 32 formed by fixing the cholesteric liquid crystalline phase, the light is reflected in the normal direction, but the light is hardly reflected in an oblique direction, and is inferior in diffuse reflectivity. (See the arrow in FIG. 2).

Figure 3:
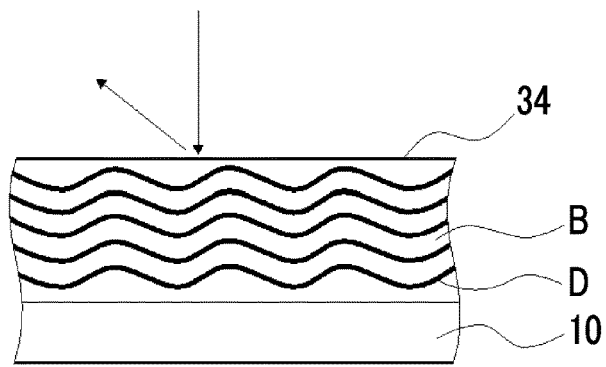
FIG. 3 is a conceptual diagram for explaining light reflection by the cholesteric liquid crystalline phase.

On the other hand, as a layer 34 whose cross section is conceptually shown in FIG. 3, in a case where the bright portion B and the dark portion D of the layer 34 formed by fixing the cholesteric liquid crystalline phase have wavy structures (an undulation structure), when light is incident on the layer 34 having the wavy structure (the undulation structure) in the normal direction of the layer 34, as shown in FIG. 3, since there is a region in which the helical axis of a liquid crystal compound is inclined, a part of the incident light is reflected in the oblique direction (see the arrow in FIG. 3).

That is, in the layer formed by fixing the cholesteric liquid crystalline phase, the bright portion B and the dark portion D have the wavy structures, so that a reflection layer having a high diffuse reflectivity can be realized.

As described above, the structure 14 of the present invention has a structure in which the first reflection layer 16 formed by fixing the cholesteric liquid crystalline phase and the upper reflection layer 18 formed by fixing the cholesteric liquid crystalline phase are laminated. In addition, the bright portion 20 and the dark portion 24 (the striped pattern of the bright portion 20 and the dark portion 24) of the first reflection layer 16 have the wavy structures, and similarly, the bright portion 28 and the dark portion 30 of the upper reflection layer 18 (the striped pattern of the bright portion 28 and the dark portion 30) also have the wavy structures.

Here, in the structure of the present invention, the undulations of the wavy structures of the bright portions closest to each other coincide in adjacent reflection layers. In the structure 14 shown in FIG. 1, the undulations of the wavy structures coincide, in the wavy structure of a bright portion 20a of the first reflection layer 16 and the wavy structure of a bright portion 28a of the upper reflection layer 18, which are the bright portions closest to each other in the adjacent first reflection layer 16 and the upper reflection layer 18.

That is, in the structure of the present invention, in which the reflection layer formed by fixing the cholesteric liquid crystalline phase is laminated, in the adjacent reflection layers, the wavy structure of the upper reflection layer follows (tracing) the wavy structure of the lower reflection layer. In the structure 14 of the illustrated example, the wavy structures of the bright portion 28 and the dark portion 30 of the upper reflection layer 18 follow the wavy structures of the bright portion and the dark portion of the adjacent lower first reflection layer 16.

Further, in the present invention, the bright portions closest to each other in the adjacent reflection layers are the bright portions closest to each other not including an interface with the adjacent reflection layer.

That is, in the case of the structure 14 shown in FIG. 1, the bright portions closest to each other are the bright portions closest to each other not including the interface 12a between the first reflection layer 16 and the upper reflection layer 18, and specifically, the bright portion 20a of the first reflection layer 16 and the bright portion 28a of the upper reflection layer 18, which are the bright portions that are closest to each other and do not include the interface 12a, are the bright portions closest to each other in the adjacent reflection layers.

In addition, the wavy structure of the bright portion in the cross section of the layer formed by fixing the cholesteric liquid crystalline phase often has a fluctuation of a pitch rather than having the undulation of uniform pitch (a period) over an entire region in a plane direction. Furthermore, the wavy structure of the upper reflection layer 18 almost, but not completely, follows the wavy structure of the first reflection layer 16.

Therefore, in the present invention, a case that the undulations of the wavy structures of the bright portion 20a and the bright portion 28a, which are the bright portions closest to each other, coincide include a case where, as shown in FIG. 1, the undulations of the wavy structures of the bright portion 20a and the bright portion 28a substantially coincide, in addition to a case where a phase and the period of the undulations in the wavy structure completely coincide.

Figure 4:
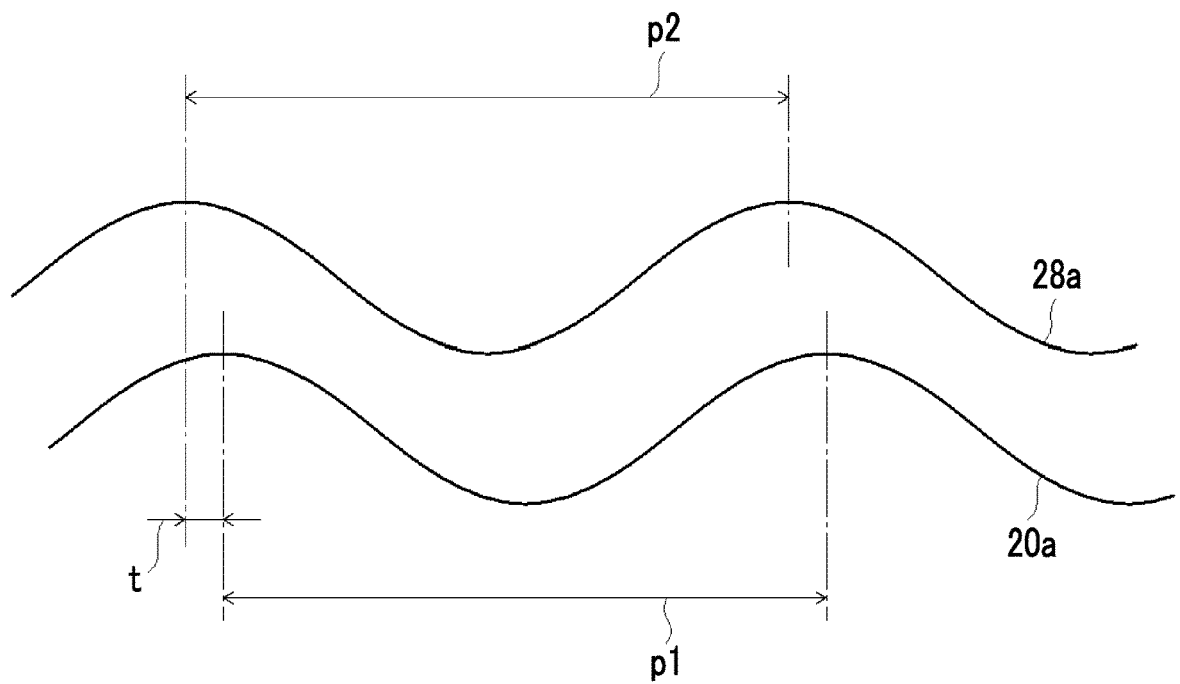
FIG. 4 is a conceptual diagram for explaining a coincidence of undulations of bright portions closest to each other in the structure of the present invention.

As an example, in the present invention, a case where any of either a difference between a pitch p1 of the bright portion 20a and a pitch p2 of the bright portion 28a calculated by "[(p1−p2)/p1]×100" is ±15% or less, or a phase difference t between the bright portion 20 and the bright portion 28a is 20° or less, is satisfied, preferably a case where both are satisfied is considered that the undulations of the wavy structures of the bright portion 20a and the bright portion 28a coincide (see FIG. 4). Further, as shown in FIG. 4, the pitch p1 and the pitch p2 are distances between peaks of convex portions in the undulations of the wavy structure.

Further, in a case of comparing the pitch p1 of the bright portion 20a with the pitch p2 of the bright portion 28a, the distance (pitch p1) between the peak of one convex portion of the bright portion 20a and the peak of the other convex portion adjacent to the one convex portion, is compared with the distance (pitch p2) between the peak of the convex portion of the bright portion 28a immediately above the one convex portion of the bright portion 20a and the peak of the convex portion of the bright portion 28a immediately above the other convex portion of the bright portion 20a (see FIG. 4).

The structure 14 of the present invention has such a structure, that is, a structure which is formed by fixing the cholesteric liquid crystalline phase, in which the reflection layer with the bright portion and the dark portion having the wavy structure is laminated, and which has a configuration in which the wavy structures of the bright portion and the dark portion of the upper layer follow the wavy structures of the bright portion and the dark portion of the lower layer, and thus at the interface between the lower reflection layer and the upper reflection layer, defects of the laminated and wavy structure are eliminated and also the wavy structure of the upper layer follows the wavy structure of the lower layer, so that the wavy structure of the upper layer is induced to the wavy structure of the lower layer, which enables a formation of a suitable wavy structure to obtain a strong diffuse reflectivity.

Therefore, according to the structure of the present invention, for example, in a case where a thick reflection layer is formed, the reflection layer is laminated a plurality of times to form a reflection layer having a target thickness, and thus over the entire region in the thickness direction, it is possible to form the reflection layer in which the bright portion and dark portion have the suitable wavy structures. In addition, even in a case where reflection layers having different selective reflection wavelengths (a color to be reflected) are laminated, a configuration of all the reflection layers is possible, in which the bright portion and the dark portion have the suitable wavy structures, so that the light of all colors is suitably reflected and diffused, for example, and a projection image display screen, in which a proper image observation is possible even in a case of the oblique observation, can be obtained.

In the structure 14 of the present invention, the wavy structures of the bright portion and the dark portion in the cross section of the first reflection layer 16 and the upper reflection layer 18 have substantially the uniform wave pitches (the periods); however, wave heights may fluctuate.

For example, as shown in the wavy structures of the bright portion and dark portion of the first reflection layer 16, a configuration may be adopted, in which the height of the wave is highest at a center region of the reflection layer in the thickness direction, and decreases gradually toward an upper side (a surface side) in the thickness direction and a substrate 12 side. That is, the configuration may be adopted, in which an amplitude of the wavy structure of the cross section of the reflection layer is greatest at the center region in the thickness direction, and reduces gradually toward the surface side and the substrate 12 side.

Alternatively, as in the wavy structure of the layer 34 shown in FIG. 3, a structure having the waves of a uniform height in the entire region in the thickness direction may be adopted.

In the structure 14 of the illustrated example, an upper surface of the first reflection layer 16 (the interface with the upper reflection layer 18) and an upper surface of the upper reflection layer 18 (a surface of the structure 14) are both planar (flat); however, the present invention is not limited thereto. That is, in the present invention, the surface (an upper surface of the reflection layer) of the first reflection layer 16 and/or the upper reflection layer 18 may have the undulation structure. Further, the upper surface of the reflection layer is a surface opposite to the substrate 12 across the reflection layer.

In a case where the upper surface of the reflection layer has the undulation structure, typically, the undulation structure is periodic (substantially periodic), and the phase of the undulation is opposite to the wavy structures of the bright portion and the dark portion in the cross section. That is, the convex portion of the wavy structure in the cross section becomes a concave portion in the upper surface, and the concave portion of the wavy structure in the cross section becomes the convex portion in the upper surface.

Such a reflection layer having the undulation structure on the upper surface can be formed by performing at least one of a selection of a chiral agent and/or an alignment control agent, and a selection of heating treatment or cooling treatment conditions in a method of manufacturing the present invention described later.

In the cross section of the reflection layer (the cholesteric liquid crystalline phase), the reflection layer having the undulation on the surface has the wave height (the wave amplitude) of the wavy structures of the bright portion and the dark portion due to the helical structure of the cholesteric liquid crystalline phase, which is greater than that of the reflection layer having the flat surface shown in FIG. 2. That is, in a case where the reflection layer has the great wavy structure therein, the undulations thereof are also transferred to the surface, so that the surface of the reflection layer becomes undulated in shape.

Therefore, the reflection layer having the undulation on the surface can obtain the higher diffuse reflectivity.

In the structure 14 of the present invention, the wavy structures of the bright portion and the dark portion in the first reflection layer 16 and the upper reflection layer 18 are formed similarly not only in a lateral direction of FIG. 1, but also, for example, in the cross section in a direction vertical to a paper sheet surface of FIG. 1. That is, the wavy structure of the reflection layer is two-dimensionally formed in the plane direction of the reflection layer, and the wavy structures of the bright portion and the dark portion are recognized in the cross section of the reflection layer in all directions.

Note that the present invention is not limited thereto, and the reflection layer may have the wavy structure in which a continuous wave is formed to proceed only in one direction on the cross section. However, from a viewpoint of the diffuse reflectivity, as described above, it is preferable that the wavy structures of the bright portion and the dark portion are recognized in the cross section of the reflection layer in all the directions.

In this regard, the same applies to the undulation of the upper surface of the reflection layer.

In the structure 14 of the present invention, the pitches p1 and p2 (the pitch of the wavy structure of the reflection layer) of the wavy structures of the cross sections of the first reflection layer 16 and the upper reflection layer 18 are not particularly limited. The pitch of the wavy structure of the reflection layer is preferably 0.5 to 5 μm, and more preferably 1 to 4 μm.

In order for the reflection layer to exhibit the suitable diffuse reflectivity, it is preferable to reduce the pitch of the wavy structure, and to increase the wave height, that is, the height of the undulation of the wavy structure. However, the pitch of the wavy structure and the height of the undulation are usually in a trade-off relationship. On the other hand, by setting the pitch of the wavy structure of the reflection layer in the above range, it is possible to form the wavy structure having a suitable balance of the pitch and the height, and to form the structure 14 having the high diffuse reflectivity.

The first reflection layer 16 and the upper reflection layer 18 formed by fixing the cholesteric liquid crystalline phase are layers showing selective reflection characteristics with respect to light in a predetermined wavelength range. The reflection layer functions as a circular polarization selective reflection layer that selectively reflects one of either the right circular polarization light or the left circular polarization light, and transmits the other circular polarization light in a selective reflection wavelength range.

In the structure 14, the selective reflection wavelength (a center wavelength of the selective reflection) of the cholesteric liquid crystalline phase constituting the first reflection layer 16 and the upper reflection layer 18 is not particularly limited.

The structure of the present invention is preferably capable of selectively reflecting necessary light from ultraviolet light to infrared light, and the selective reflection wavelength of the cholesteric liquid crystalline phase of the reflection layer is preferably selected from a range of 200 to 2000 nm. In the following description, the "selective reflection wavelength of the cholesteric liquid crystalline phase of the reflection layer" is also simply referred to as a "selective reflection wavelength of the reflection layer".

Here, the first reflection layer 16 and the upper reflection layer 18 may have the same selective reflection wavelength, but preferably have a different selective reflection wavelength from each other. Specifically, the first reflection layer 16 and the upper reflection layer 18 preferably have a different selective reflection wavelength from each other by 10 nm or more.

Accordingly, the structure 14 can reflect a plurality of types of light having different colors, and for example, by using the structure of the present invention for the projection image display screen, the projection image display screen capable of displaying the color image can be produced.

In addition, although the structure 14 of the illustrated example has two reflection layers of the first reflection layer 16 and the upper reflection layer 18, the present invention is not limited thereto. That is, the structure of the present invention may be configured to have three or more reflection layers by further forming a reflection layer (an upper reflection layer) on the upper reflection layer 18. Even in a case of having two or more upper reflection layers, in the upper reflection layer of the lower layer and the upper reflection layer thereon, the undulations of the wavy structures of the bright portions closest to each other coincide, similar to the first reflection layer 16 and the upper reflection layer 18 shown in FIG. 1.

In a case where two or more upper reflection layers are provided, at least one layer is preferably used as a reflection layer that reflects the red light and that is formed by fixing the cholesteric liquid crystalline phase in which the selective reflection wavelength is in a region of the red light, at least one of other layers is preferably used as a reflection layer that reflects the green light and that is formed by fixing the cholesteric liquid crystalline phase in which the selective reflection wavelength is in a region of the green light, and further at least one of the other layers is preferably used as a reflection layer that reflects the blue light and that is formed by fixing the cholesteric liquid crystalline phase in which the selective reflection wavelength is in a region of the blue light. Accordingly, for example, by using the structure of the present invention for the projection image display screen, the projection image display screen capable of displaying a full color image can be produced.

The selective reflection wavelength (a center wavelength $\lambda$ of the selective reflection) depends on the pitch P of the helical structure (=a helical period) in the cholesteric liquid crystalline phase and follows a relationship of an average refractive index n of the reflection layer (the cholesteric liquid crystalline phase) and $\lambda = n \times P$.

Here, the center wavelength $\lambda$ of the selective reflection of the reflection layer means a wavelength at a center of gravity of a reflection peak of a circular polarization reflection spectrum measured from the normal direction of the reflection layer. As can be seen from the above equation, the center wavelength of the selective reflection can be adjusted by adjusting the pitch of the helical structure. That is, by adjusting an n value and a P value, for example, in order to selectively reflect either the right circular polarization light or the left circular polarization light with respect to the blue light, the center wavelength $\lambda$ is adjusted so that an apparent center wavelength of the selective reflection can be set to a wavelength range of 420 to 490 nm. Further, the apparent center wavelength of the selective reflection means a wavelength at the center of gravity of the reflection peak of the circular polarization reflection spectrum of the reflection layer measured in an observation direction in practical use. A case of the practical use means, for example, a case of the use for a projection image display member.

The pitch of the cholesteric liquid crystalline phase depends on the type of the chiral agent to be used together with the liquid crystal compound or an addition concentration thereof, which can be adjusted to obtain a desired pitch.

Reflected light of the first reflection layer 16 and the upper reflection layer 18 formed by fixing the cholesteric liquid crystalline phase is the circular polarization light. That is, the structure 14 of the present invention reflects the circular polarization light. Whether the reflected light is the right circular polarization light or the left circular polarization light depends on a helical twisting direction of the cholesteric liquid crystalline phase. The selective reflection of the circular polarization light by the cholesteric liquid crystalline phase is performed to reflect the right circular polarization light in a case where the helical twisting direction of the cholesteric liquid crystalline phase is right, and to reflect the left circular polarization light in a case where the helical twisting direction is left.

In the structure 14 of the present invention, the first reflection layer 16 and the upper reflection layer 18 may reflect the right circular polarization light or may reflect the left circular polarization light. In addition, the first reflection layer 16 and the upper reflection layer 18 may reflect the circular polarization light in the same direction or may reflect the circular polarization light in different directions. In this regard, the same applies to the structure having three or more reflection layers.

Further, a rotation direction of the cholesteric liquid crystalline phase can be adjusted by the type of the liquid crystal compound forming the reflection layer or the type of the chiral agent to be added.

As a method of measuring the helical twisting direction (a sense) or the pitch, methods described in "Easy Steps in Liquid Crystal Chemistry Experiment" p 46, edited by The Japanese Liquid Crystal Society, Sigma Publishing, published in 2007, and "Liquid Crystal Handbook" p 196, Editorial Committee of Liquid Crystal Handbook, Maruzen can be used.

The thickness of the structure 14 of the present invention is not particularly limited, and may be appropriately set according to an application of the structure 14, the type of liquid crystal compound forming the reflection layer of the structure 14, the number of the reflection layers of the structure, or the like. The thickness of the structure 14 is preferably 1 to 50 µm, and more preferably 2 to 30 µm. Further, the thickness of this structure is irrelevant to the number of reflection layers.

The thicknesses of the first reflection layer 16 and the upper reflection layer 18 may be also appropriately set according to the application of the structure 14, the type of liquid crystal compound forming the reflection layer of the structure 14, the number of the reflection layers of the structure, or the like. The thickness of the reflection layer is preferably 0.5 to 30 µm, and more preferably 1 to 10 µm, from the viewpoint of the more excellent diffuse reflectivity of the reflection layer.

The thicknesses of the structure 14, the first reflection layer 16 and the upper reflection layer 18 may be measured by a known method using a laser film thickness microscope (a film thickness measurement using a laser microscope) or the like.

As described above, the reflection member 10 is obtained by forming the structure 14 including the first reflection layer 16 and the upper reflection layer 18 on the substrate 12.

In the reflection member 10, the substrate 12 is a plate-like object for supporting the structure 14 (a composition forming the reflection layer).

The substrate 12 is preferably a transparent substrate. Further, the transparent substrate is intended to refer to a substrate having a transmittance of visible light of 60% or more, and the transmittance thereof is preferably 80% or more and more preferably 90% or more.

The material constituting the substrate 12 is not particularly limited, and examples thereof include a cellulose-based polymer, a polycarbonate-based polymer, a polyester-based polymer, a (meth)acrylic polymer, a styrene-based polymer, a polyolefin-based polymer, a vinyl chloride-based polymer, an amide-based polymer, an imide-based polymer, a sulfone-based polymer, a polyether sulfone-based polymer, and a polyether ether ketone-based polymer.

The substrate may contain various additives such as an ultraviolet (UV) absorber, a matting agent fine particle, a plasticizer, a deterioration inhibitor, and a release agent.

Further, the substrate preferably has low birefringence in a visible light region. For example, the phase difference at a wavelength of 550 nm of the substrate is preferably 50 nm or less and more preferably 20 nm or less.

The thickness of the substrate is not particularly limited but it is preferably 10 to 200 μm and more preferably 20 to 100 μm from the viewpoint of a thickness reduction and usability.

The thickness is intended to refer an average thickness, and is obtained by measuring thicknesses at any five points of the substrate and arithmetically averaging the measured values.

As described above, the structure 14 in which the upper reflection layer 18 is laminated on the first reflection layer 16 is provided on the substrate 12.

The first reflection layer 16 and the upper reflection layer 18 are both reflection layers formed by fixing the cholesteric liquid crystalline phase. Such a reflection layer can be formed, for example, by preparing a composition (a first layer composition and an upper layer composition) containing the liquid crystal compound and the chiral agent, coating and drying the composition, curing the composition as needed, and fixing the cholesteric liquid crystalline phase.

(Liquid Crystal Compound)

The type of the liquid crystal compound is not particularly limited.

Typically, liquid crystal compounds can be classified into a rod type (a rod-like liquid crystal compound) and a disc type (a discotic liquid crystal compound, disk-like liquid crystal compound) depending on the shape thereof. Furthermore, the rod type and the disk type each have a low molecular weight type and a high molecular weight type. The high molecular weight generally refers to having a degree of polymerization of 100 or more (Polymer Physics-Phase Transition Dynamics, Masao Doi, page 2, Iwanami Shoten, 1992). Any liquid crystal compound can also be used in the present invention. In addition, two or more types of liquid crystal compounds may be used in combination.

The liquid crystal compound may have a polymerizable group. The type of the polymerizable group is not particularly limited, and a functional group capable of an addition polymerization reaction is preferable, and a polymerizable ethylenically unsaturated group or a cyclic polymerizable group is more preferable. More specifically, the polymerizable group is preferably a (meth)acryloyl group, a vinyl group, a styryl group, an allyl group, an epoxy group, and an oxetane group, and more preferably a (meth)acryloyl group.

The liquid crystal compound is preferably a liquid crystal compound represented by Formula (I) from the viewpoint of the more excellent diffuse reflectivity of the reflection layer.

Among them, from the viewpoint of the more excellent diffuse reflectivity of the reflection layer, in a case where the number obtained by dividing the number of trans-1,4-cyclohexylene groups which may have a substituent represented by A by m is defined as mc, a liquid crystal compound satisfying mc>0.1 is preferable, and a liquid crystal compound satisfying 0.4≤mc≤0.8 is more preferable.

Further, mc is a number represented by the following calculation formula.

$$mc = (\text{the number of trans-1,4-cyclohexylene groups which may have a substituent represented by } A)/m$$

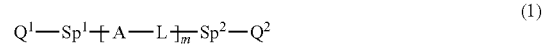

(1)

In the formula,

A represents a phenylene group which may have a substituent or a trans-1,4-cyclohexylene group which may have a substituent, and at least one of A's represents a trans-1,4-cyclohexylene group which may have a substituent, L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)O—, —OC(=O)O—, —CH=N—N=CH—, —CH=CH—, —C≡C—, —NHC(=O)—, —C(=O)NH—, —CH=N—, —N=CH—, —CH=CH—C(=O)O—, and —OC(=O)—CH=CH—, m represents an integer of 3 to 12, Sp$^1$ and Sp$^2$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—, and Q$^1$ and Q$^2$ each independently represent a hydrogen atom or a polymerizable group selected from the group consisting of groups represented by Formulae (Q-1) to (Q-5), provided that one of Q$^1$ and Q$^2$ represents a polymerizable group.

(Q-1)

(Q-2)

(Q-3)

(Q-4)

(Q-5)

A is a phenylene group which may have a substituent or a trans-1,4-cyclohexylene group which may have a substituent. In the present specification, the phenylene group is preferably a 1,4-phenylene group.

Further, at least one of A's is a trans-1,4-cyclohexylene group which may have a substituent.

The m A's may be the same as or different from each other.

m represents an integer of 3 to 12, preferably an integer of 3 to 9, more preferably an integer of 3 to 7, and still more preferably an integer of 3 to 5.

The substituent which the phenylene group and the trans-1,4-cyclohexylene group in Formula (I) may have is not particularly limited, and examples thereof include substituents selected from the group consisting of an alkyl group, a cycloalkyl group, an alkoxy group, an alkyl ether group, an amide group, an amino group, and a halogen atom, and a group formed by combining two or more of the above described substituents. In addition, examples of the substituent include substituents represented by —C(=O)—X$^3$-Sp$^3$-Q$^3$ which will be described later. The phenylene group and the trans-1,4-cyclohexylene group may have 1 to 4 substituents. In a case of having two or more substituents, the two or more substituents may be the same as or different from each other.

In the present specification, the alkyl group may be either linear or branched. The number of carbon atoms in the alkyl group is preferably 1 to 30, more preferably 1 to 10, and still more preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, an isohexyl group, a heptyl group, an octyl group, a nonyl group, a decyl group, an undecyl group, and a dodecyl group. The explanation of the alkyl group in the alkoxy group is also the same as the explanation on the above described alkyl group. In addition, in the present specification, specific examples of the alkylene group in the case of being referred to as an alkylene group include divalent groups obtained by removing one hydrogen atom from each of the foregoing examples of the alkyl group. Examples of the halogen atom include a fluorine atom, a chlorine atom, a bromine atom, and an iodine atom.

In the present specification, the number of carbon atoms in the cycloalkyl group is preferably 3 or more, and more preferably 5 or more, and is preferably 20 or less, more preferably 10 or less, still more preferably 8 or less, and particularly preferably 6 or less. Examples of the cycloalkyl group include a cyclopropyl group, a cyclobutyl group, a cyclopentyl group, a cyclohexyl group, a cycloheptyl group, and a cyclooctyl group.

The substituent which the phenylene group and the trans-1,4-cyclohexylene group may have is preferably a substituent selected from the group consisting of an alkyl group, an alkoxy group, and —C(=O)—X$^3$-Sp$^3$-Q$^3$. Here, X$^3$ represents a single bond, —O—, —S—, or —N(Sp$^4$-Q$^4$)- or represents a nitrogen atom forming a ring structure together with Q$^3$ and Sp$^3$. Sp$^3$ and Sp$^4$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—.

Q$^3$ and Q$^4$ each independently represent a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, or any polymerizable group selected from the group consisting of groups represented by Formulae (Q-1) to (Q-5).

Specific examples of the group where one or two or more —CH$_2$— in a cycloalkyl group is substituted with —O—, —S—, —NH—, —N(CH$_3$)—, —C(=O)—, —OC(=O)—, or —C(=O)O— include a tetrahydrofuranyl group, a pyrrolidinyl group, an imidazolidinyl group, a pyrazolidinyl group, a piperidyl group, a piperazinyl group, and a morpholinyl group. Among them, a tetrahydrofuranyl group is preferable, and a 2-tetrahydrofuranyl group is more preferable.

In Formula (I), L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—. L is preferably —C(=O)O— or —OC(=O)—. The m L's may be the same as or different from each other.

Sp$^1$ and Sp$^2$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—. Sp$^1$ and Sp$^2$ are each independently preferably a linking group formed by combining one or two or more groups selected from the group consisting of a linear alkylene group having 1 to 10 carbon atoms to which a linking group selected from the group consisting of —O—, —OC(=O)—, and —C(=O)O— is bonded to both terminals thereof, —OC(=O)—, —C(=O)O—, —O—, and a linear alkylene group having 1 to 10 carbon atoms, and more preferably a linear alkylene group having 1 to 10 carbon atoms to which —O— is bonded to both terminals thereof.

Q$^1$ and Q$^2$ each independently represent a hydrogen atom or a polymerizable group selected from the group consisting of groups represented by Formulae (Q-1) to (Q-5). However, one of Q$^1$ and Q$^2$ represents a polymerizable group.

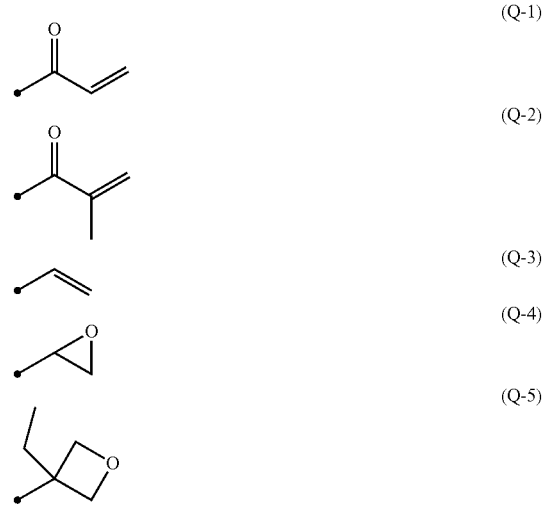

The polymerizable group is preferably an acryloyl group (Formula (Q-1)) or a methacryloyl group (Formula (Q-2)).

Specific examples of the liquid crystal compound include a liquid crystal compound represented by Formula (I-11), a liquid crystal compound represented by Formula (I-21), and a liquid crystal compound represented by Formula (I-31). In addition to the above described compounds, known compounds such as a compound represented by Formula (I) in JP2013-112631A, a compound represented by Formula (I) in JP2010-070543A, a compound represented by Formula (I) in JP2008-291218A, a compound represented by Formula (I) in JP4725516B, a compound represented by General Formula (II) in JP2013-087109A, a compound described in paragraph[0043] of JP2007-176927A, a compound represented by Formula (1-1) in JP2009-286885A, a compound represented by General Formula (I) in WO2014/10325A, a compound represented by Formula (1) in JP2016-081035A, and a compound represented by Formulae (2-1) and (2-2) in JP2016-121339A can be described.

A liquid crystal compound represented by Formula (I-11)

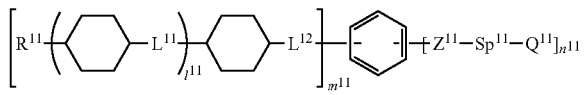

(I-11)

In the formula, $R^{11}$ represents a hydrogen atom, a linear or branched alkyl group having 1 to 12 carbon atoms, or —$Z^{12}$-$Sp^{12}$-$Q^{12}$, $L^{11}$ represents a single bond, —C(=O)O—, or —O(C=O)—, $L^{12}$ represents —C(=O)O—, —OC(=O)—, or —CONR$^2$—, $R^2$ represents a hydrogen atom or an alkyl group having 1 to 3 carbon atoms, $Z^{11}$ and $Z^{12}$ each independently represent a single bond, —O—, —NH—, —N(CH$_3$)—, —S—, —C(=O)O—, —OC(=O)—, —OC(=O)O—, or —C(=O)NR$^{12}$—, $R^{12}$ represents a hydrogen atom or -$Sp^{12}$-$Q^{12}$, $Sp^{11}$ and $Sp^{12}$ each independently represent a single bond, a linear or branched alkylene group having 1 to 12 carbon atoms which may be substituted with $Q^{11}$, or a linking group obtained by substituting one or more —CH$_2$— in a linear or branched alkylene group having 1 to 12 carbon atoms which may be substituted with $Q^{11}$ with —O—, —S—, —NH—, —N(Q$^{11}$)-, or —C(=O)—, $Q^{11}$ represents a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, or a polymerizable group selected from the group consisting of groups represented by Formulae (Q-1) to (Q-5), $Q^{12}$ represents a hydrogen atom or a polymerizable group selected from the group consisting of groups represented by Formulae (Q-1) to (Q-5), $l^{11}$ represents an integer of 0 to 2, $m^{11}$ represents an integer of 1 or 2, $n^{11}$ represents an integer of 1 to 3, and a plurality of $R^{11}$'s, a plurality of $L^{11}$'s, a plurality of $L^{12}$'s, a plurality of $l^{11}$'s, a plurality of $Z^{11}$'s, a plurality of $Sp^{11}$'s, and a plurality of $Q^{11}$'s may be respectively the same as or different from each other.

In addition, the liquid crystal compound represented by Formula (I-11) contains at least one —$Z^{12}$-$Q^{12}$ in which $Q^{12}$ is a polymerizable group selected from the group consisting of groups represented by Formulas (Q-1) to (Q-5), as $R^{11}$.

In addition, the liquid crystal compound represented by Formula (I-11) is preferably —$Z^{11}$-$Sp^{11}$-$Q^{11}$ in which $Z^{11}$ is —C(=O)O— or —C(=O)NR$^{12}$— and $Q^{11}$ is a polymerizable group selected from the group consisting of groups represented by Formulae (Q-1) to (Q-5). In addition, the liquid crystal compound represented by Formula (I-11) is preferably —$Z^{12}$-$Sp^{12}$-$Q^{12}$ in which $Z^{12}$ is —C(=O)O— or —C(=O)NR$^{12}$—, and $Q^{12}$ is a polymerizable group selected from the group consisting of groups represented by Formulae (Q-1) to (Q-5), as $R^{11}$.

The 1,4-cyclohexylene group contained in the liquid crystal compound represented by Formula (I-11) is a trans-1,4-cyclohexylene group.

A suitable aspect of the liquid crystal compound represented by Formula (I-11) may be, for example, a compound in which L" is a single bond, $1^{11}$ is 1 (a dicyclohexyl group), and $Q^{11}$ is a polymerizable group selected from the group consisting of groups represented by Formulae (Q-1) to (Q-5).

Another suitable aspect of the liquid crystal compound represented by Formula (I-11) may be, for example, a compound in which $m^{11}$ is 2, $l^{11}$ is 0, and two $R^{11}$'s each represent —$Z^{12}$-$Sp^{12}$-$Q^{12}$, and $Q^{12}$ is a polymerizable group selected from the group consisting of groups represented by Formulae (Q-1) to (Q-5).

The liquid crystal compound represented by Formula (I-21)

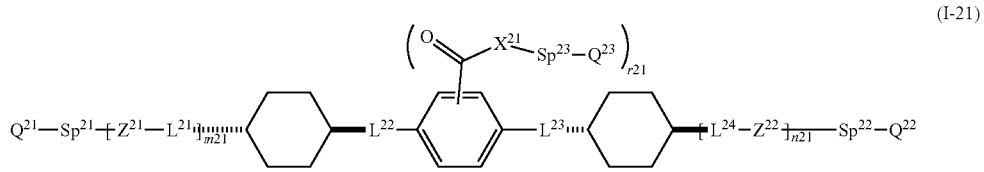

(I-21)

In the formula, $Z^{21}$ and $Z^{22}$ each independently represent a trans-1,4-cyclohexylene group which may have a substituent or a phenylene group which may have a substituent, the above substituents are each independently 1 to 4 substituents selected from the group consisting of —CO—X$^{21}$-$Sp^{23}$-$Q^{23}$, an alkyl group, and an alkoxy group, m21 represents an integer of 1 or 2, and n21 represents an integer of 0 or 1, when m21 represents 2, n21 represents 0, when m21 represents 2, two $Z^{21}$'s may be the same or different, at least one of $Z^{21}$ or $Z^{22}$ is a phenylene group which may have a substituent, $L^{21}$, $L^{22}$, $L^{23}$, and $L^{24}$ each independently represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, $X^{21}$ represents =O=, —S—, or —N(Sp$^{25}$-Q$^{25}$)- or represents a nitrogen atom forming a ring structure together with $Q^{23}$ and $Sp^{23}$, $r^{21}$ represents an integer of 1 to 4, $Sp^{21}$, $Sp^{22}$, $Sp^{23}$, and $Sp^{25}$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—, Q$^{21}$ and Q$^{22}$ each independently represent a polymerizable group selected from the group consisting of groups represented by Formulae (Q-1) to (Q-5), Q$^{23}$ represents a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, any of polymerizable group selected from the group consisting of groups represented by Formulae (Q-1) to (Q-5), or a single bond in a case where X$^{21}$ is a nitrogen atom forming the ring structure together with Q$^{23}$ and Sp$^{23}$, and Q$^{25}$ represents a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, or any of polymerizable group selected from the group consisting of groups represented by Formulae (Q-1) to (Q-5), provided that when Sp$^{25}$ is a single bond, Q$^{25}$ is not a hydrogen atom.

The liquid crystal compound represented by Formula (I-21) is also preferably a structure in which a 1,4-phenylene group and a trans-1,4-cyclohexylene group alternately exist, and, for example, m21 is 2, n21 is 0, and Z$^{21}$ is a trans-1,4-cyclohexylene group which may have a substituent from the Q$^{21}$ side, or an arylene group which may have a substituent, or a structure in which m21 is 1, n21 is 1, Z$^{21}$ is an arylene group which may have a substituent, and Z$^{22}$ is an arylene group which may have a substituent.

A liquid crystal compound represented by Formula (I-31);

—CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, Sp$^{31}$, Sp$^{32}$, Sp$^{33}$, and Sp$^{34}$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—, Q$^{33}$ and Q$^{32}$ each independently represent a polymerizable group selected from the group consisting of groups represented by Formulae (Q-1) to (Q-5), and Q$^{33}$ and Q$^{34}$ each independently represent a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, or any of polymerizable group selected from the group consisting of groups represented by Formulae (Q-1) to (Q-5), provided that Q$^{33}$ may represent a single bond in the case of forming a ring structure together with X$^{31}$ and Sp$^{33}$, and Q$^{34}$ is not a hydrogen atom when Sp$^{34}$ is a single bond.

As the liquid crystal compound represented by Formula (I-31), particularly preferable compounds include a compound in which Z$^{32}$ is a phenylene group and a compound in which m32 is 0.

It is also preferable that the compound represented by Formula (I) has a partial structure represented by Formula (II).

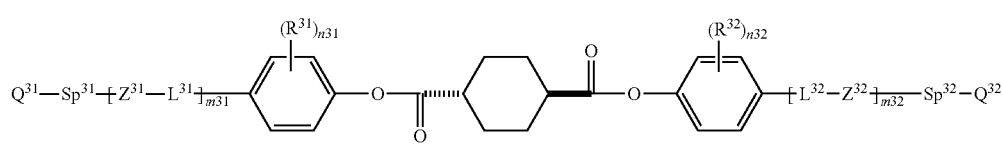

(I-31)

In the formula, R$^{31}$ and R$^{32}$ each independently represent an alkyl group, an alkoxy group, and a group selected from the group consisting of —C(=O)—X$^{31}$-Sp$^{33}$-Q$^{33}$, n31 and n32 each independently represent an integer of 0 to 4, X$^{31}$ represents a single bond, —O—, —S—, or —N(Sp$^{34}$-Q$^{34}$)- or represents a nitrogen atom forming a ring structure together with Q$^{33}$ and Sp$^{33}$, Z$^{31}$ represents a phenylene group which may have a substituent, Z$^{32}$ represents a trans-1,4-cyclohexylene group which may have a substituent or a phenylene group which may have a substituent, the above substituents are each independently 1 to 4 substituents selected from the group consisting of an alkyl group, an alkoxy group, and —C(=O)—X$^{31}$-Sp$^{33}$-Q$^{33}$, m31 represents an integer of 1 or 2, and m32 represents an integer of 0 to 2, when m31 and m32 represent 2, two Z$^{31}$'s and Z$^{32}$'s may be the same or different, L$^{31}$ and L$^{32}$ each independently represent a single bond or a linking group selected from the group consisting of

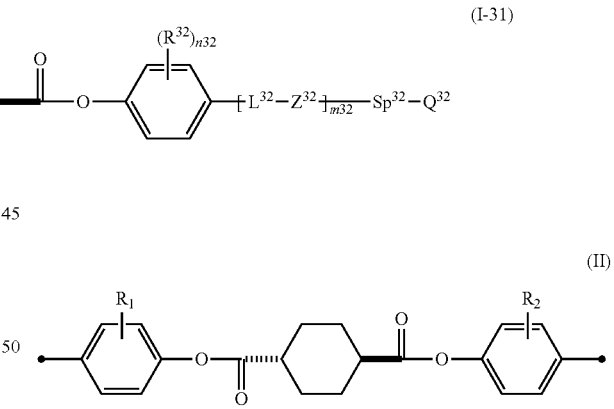

(II)

In Formula (II), black circles indicate the bonding positions with other moieties of Formula (I). The partial structure represented by Formula (II) may be included as a part of the partial structure represented by Formula (III) in Formula (I).

(III)

In the formula, R$^1$ and R$^2$ are each independently a group selected from the group consisting of a hydrogen atom, an alkyl group, an alkoxy group, and a group represented by —C(=O)—$X^3$-$Sp^3$-$Q^3$. Here, $X^3$ represents a single bond, —O—, —S—, or —N($Sp^4$-$Q^4$)- or represents a nitrogen atom forming a ring structure together with $Q^3$ and $Sp^3$. $X^3$ is preferably a single bond or —O—. $R^1$ and $R^2$ are preferably —C(=O)—$X^3$-$Sp^3$-$Q^3$. In addition, it is also preferable that $R^1$ and $R^2$ are the same. The bonding position of each of $R^1$ and $R^2$ to the phenylene group is not particularly limited.

$Sp^3$ and $Sp^4$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —C(=O)—, —OC(=O)—, or —C(=O)O—. $Sp^3$ and $Sp^4$ are each independently preferably a linear or branched alkylene group having 1 to 10 carbon atoms, more preferably a linear alkylene group having 1 to 5 carbon atoms, and still more preferably a linear alkylene group having 1 to 3 carbon atoms.

$Q^3$ and $Q^4$ each independently represent a hydrogen atom, a cycloalkyl group, a group where one or two or more —$CH_2$— in a cycloalkyl group is substituted with —O—, —S—, —NH—, —N($CH_3$)—, —C(=O)—, —OC(=O)—, or —C(=O)O—, or any of polymerizable group selected from the group consisting of groups represented by Formulae (Q-1) to (Q-5).

It is also preferable that the compound represented by Formula (I) has, for example, a structure represented by Formula (II-2).

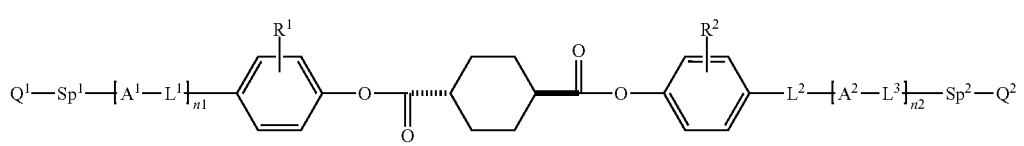

(II-2)

In the formula, $A^1$ and $A^2$ each independently represent a phenylene group which may have a substituent or a trans-1,4-cyclohexylene group which may have a substituent, and the above substituents are each independently 1 to 4 substituents selected from the group consisting of an alkyl group, an alkoxy group, and —C(=O)—$X^3$-$Sp^3$-$Q^3$, $L^1$, $L^2$, and $L^3$ each represent a single bond or a linking group selected from the group consisting of —$CH_2O$—, —$OCH_2$—, —$(CH_2)_2OC(=O)$—, —C(=O)O$(CH_2)_2$—, —C(=O)O—, —OC(=O)—, —OC(=O)O—, —CH=CH—C(=O)O—, and —OC(=O)—CH=CH—, and n1 and n2 each independently represent an integer of 0 to 9, and n1+n2 is 9 or less.

Each of $Q^1$, $Q^2$, $Sp^1$, and $Sp^2$ has the same definition as that of each group in Formula (I). Each of $X^3$, $Sp^3$, $Q^3$, $R^1$, and $R^2$ has the same definition as that of each group in Formula (II).

Examples of the liquid crystal compound represented by Formula (I) and satisfying 0.4≤mc≤0.8 include the following.

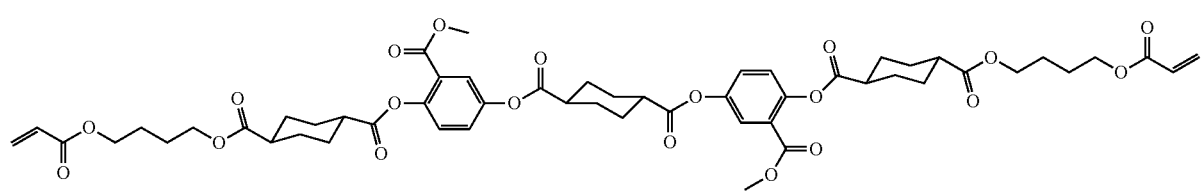

1-1

-continued
1-2
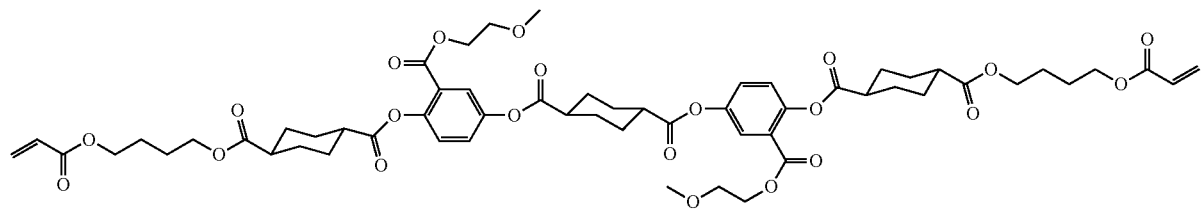
1-3
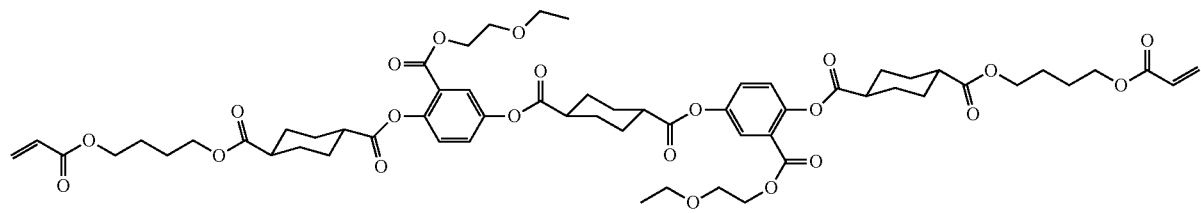
1-4
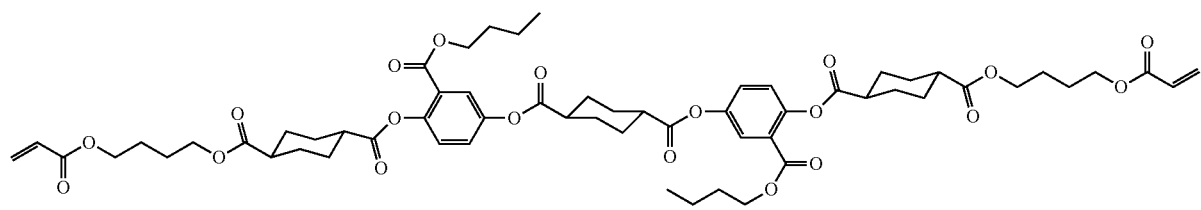
1-5
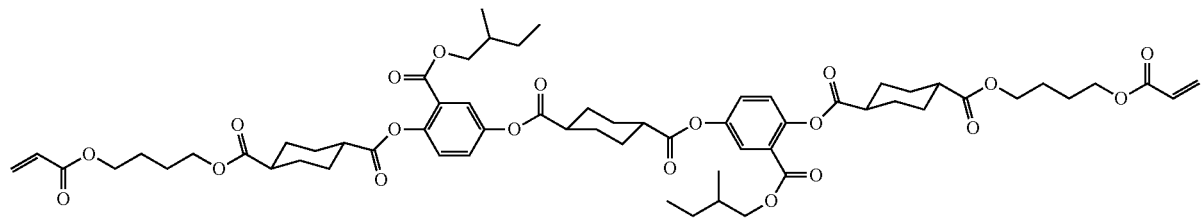
1-6
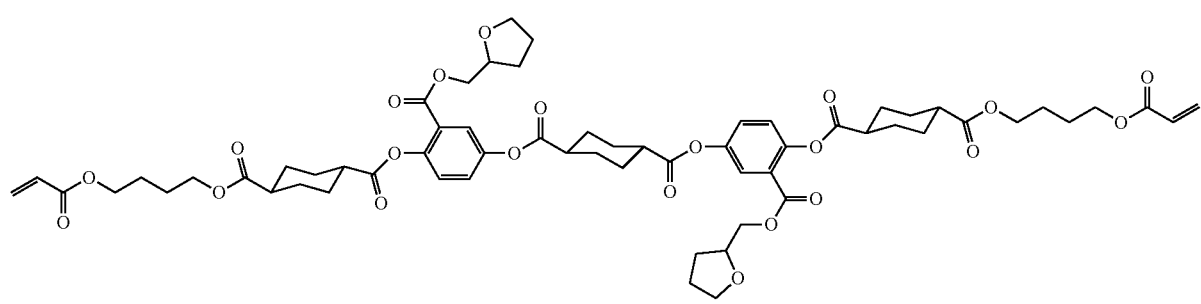
1-7
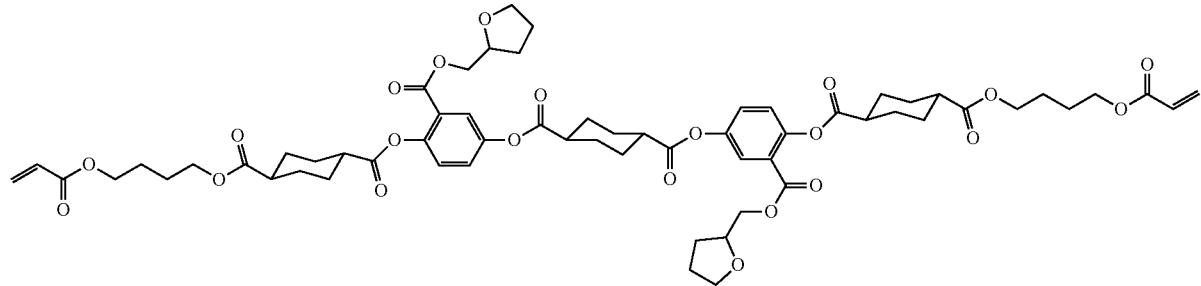

1-8
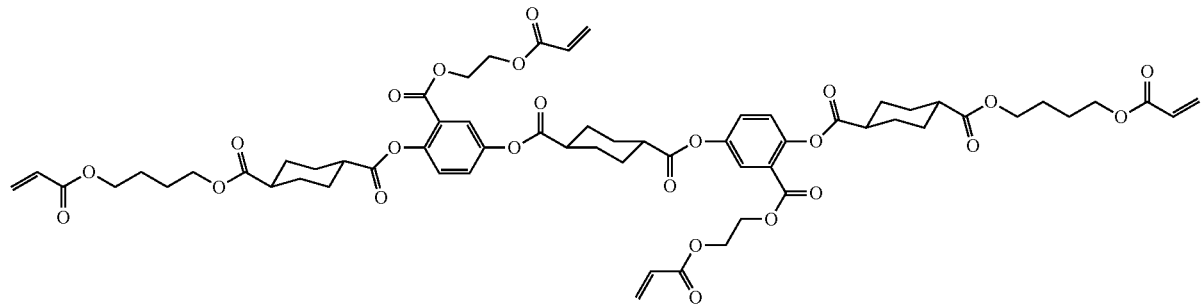
1-9
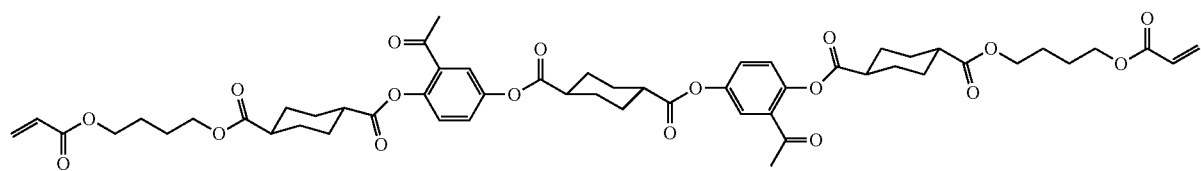
1-10
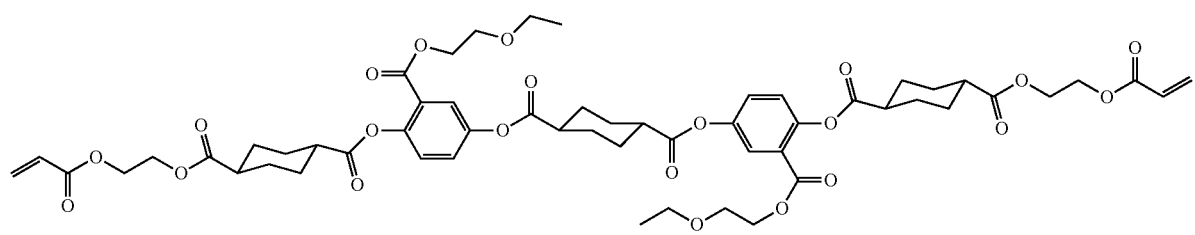
1-11
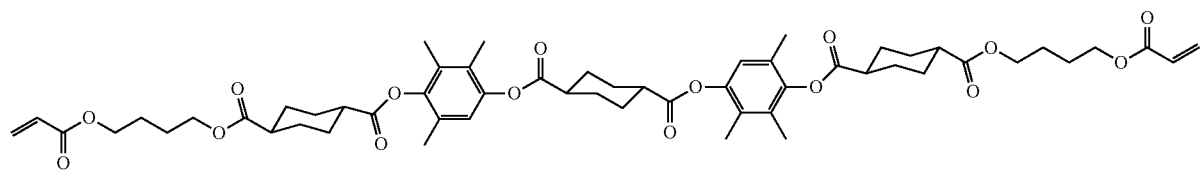
1-12
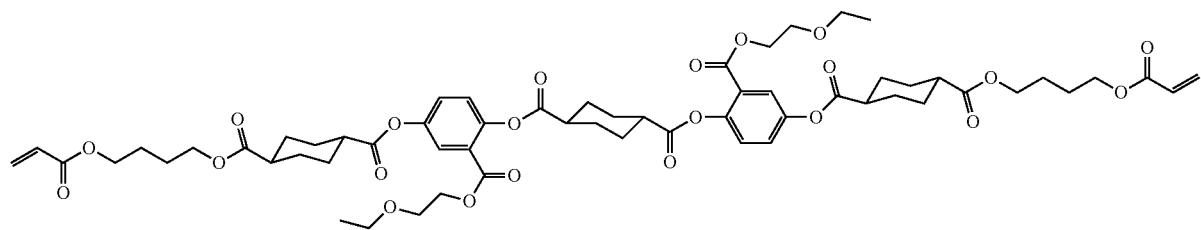
1-13
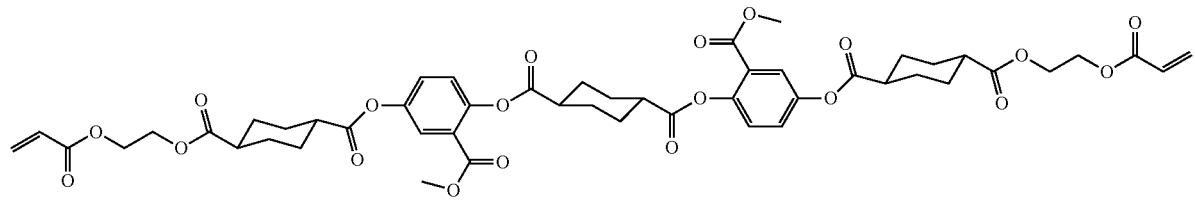

-continued
1-14
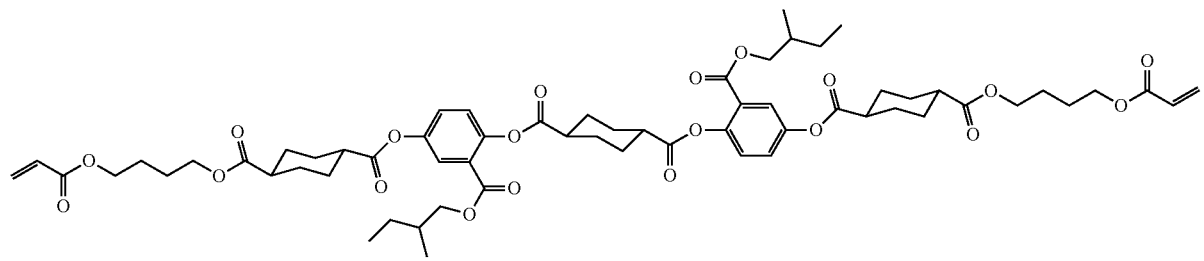
1-15
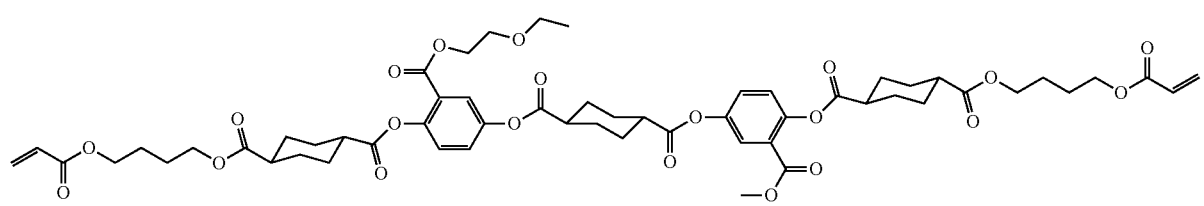
1-16
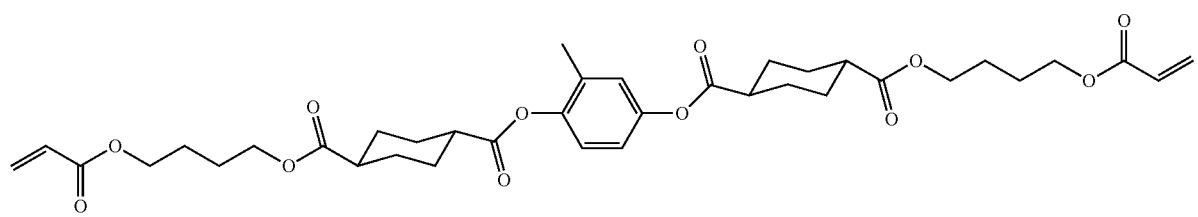
1-17
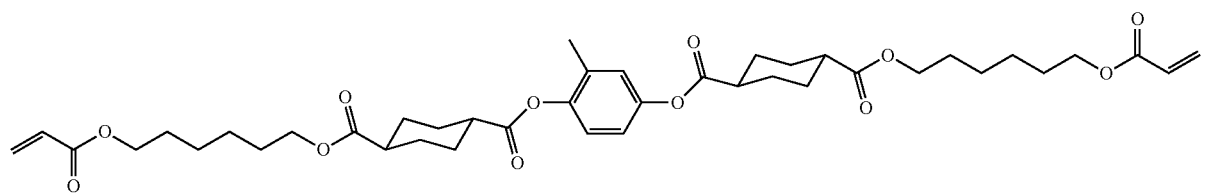
1-18
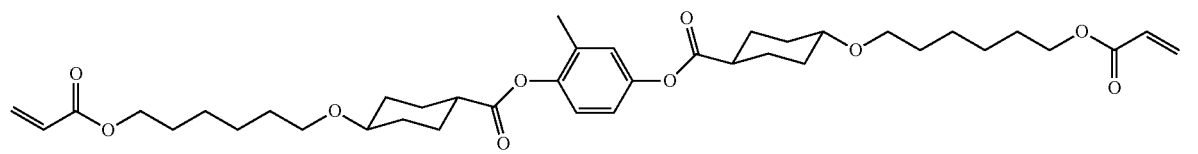
1-19
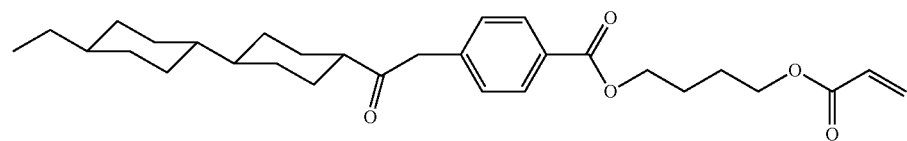
1-20
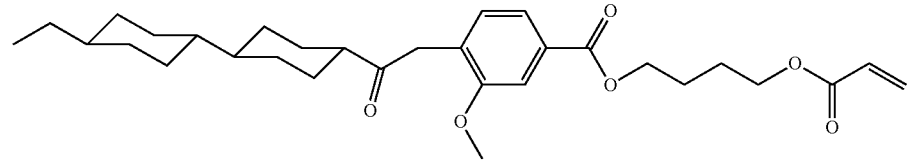
1-21
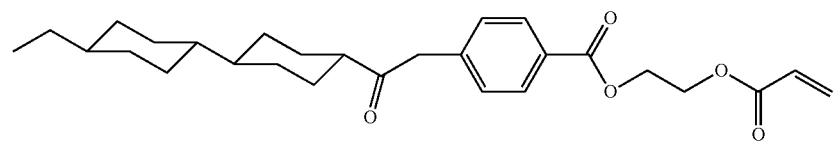

-continued
1-22
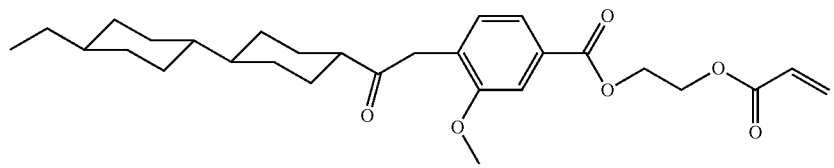
1-23
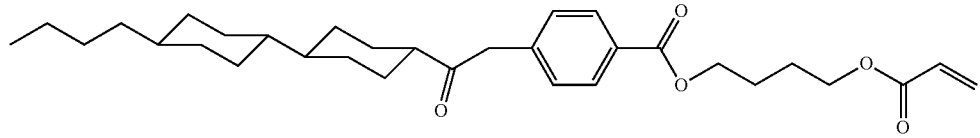
1-24
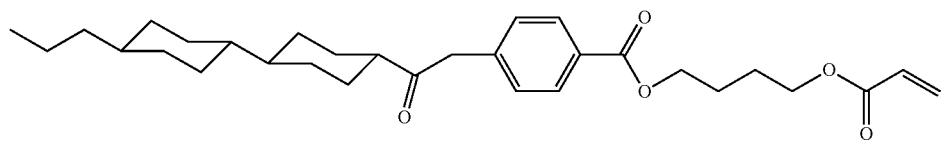
1-25
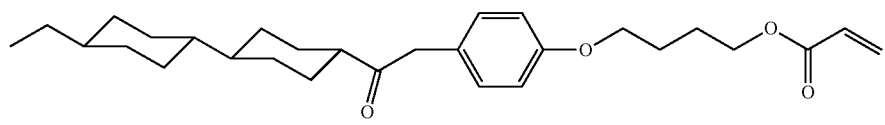
1-26
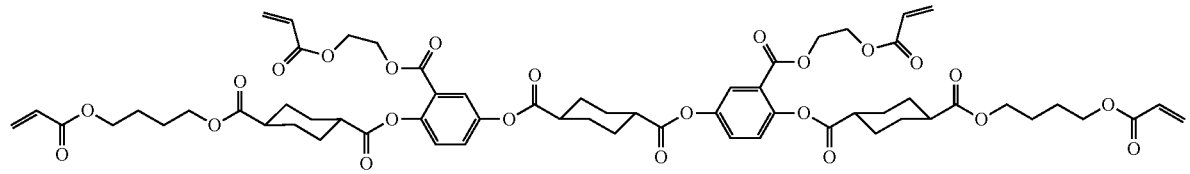
1-27
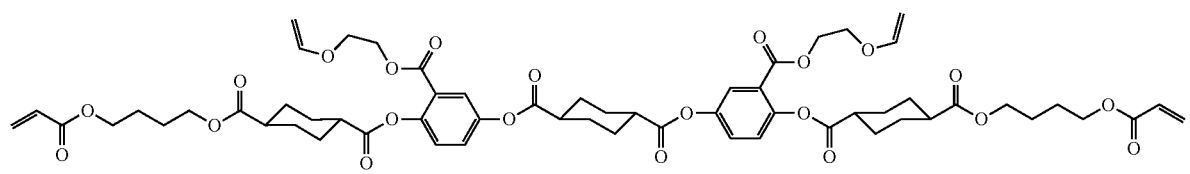
1-28
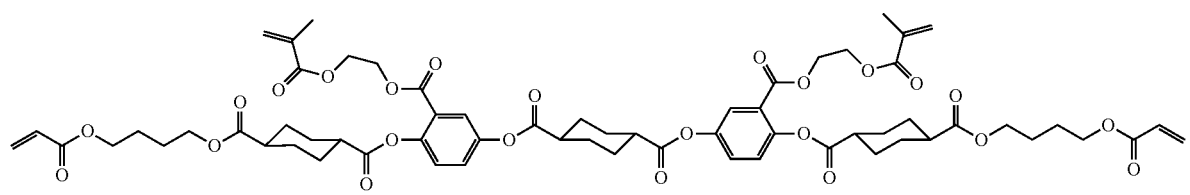
1-29
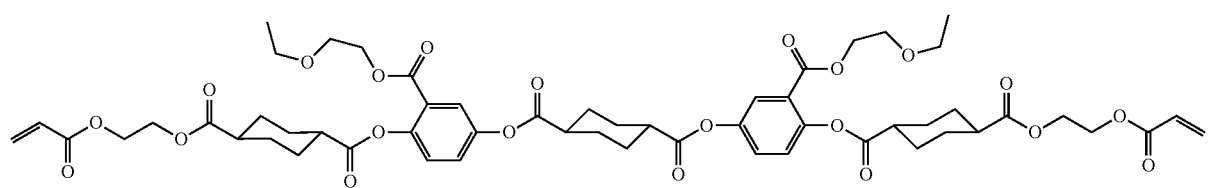
1-30
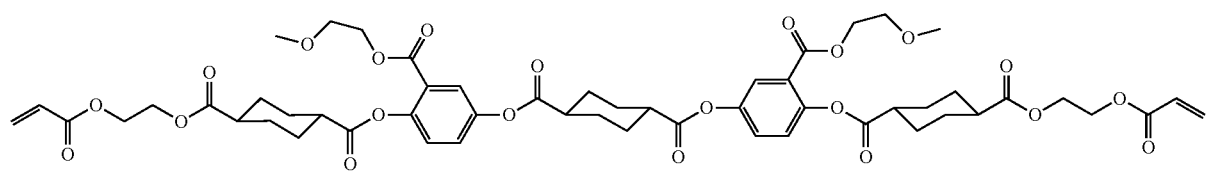

-continued
1-31
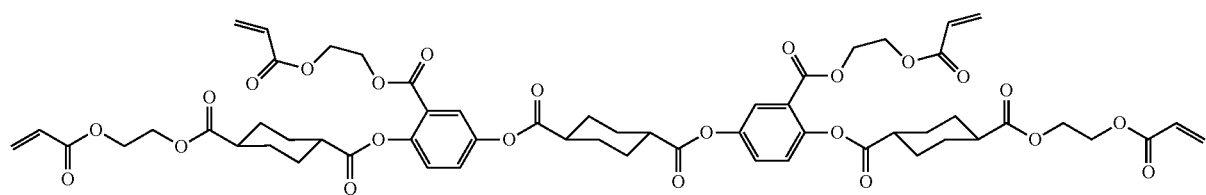
1-32
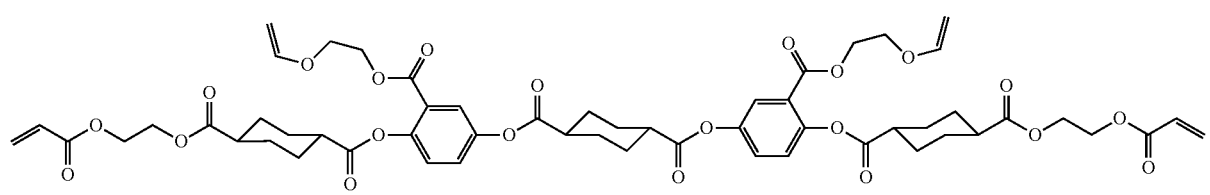
1-33
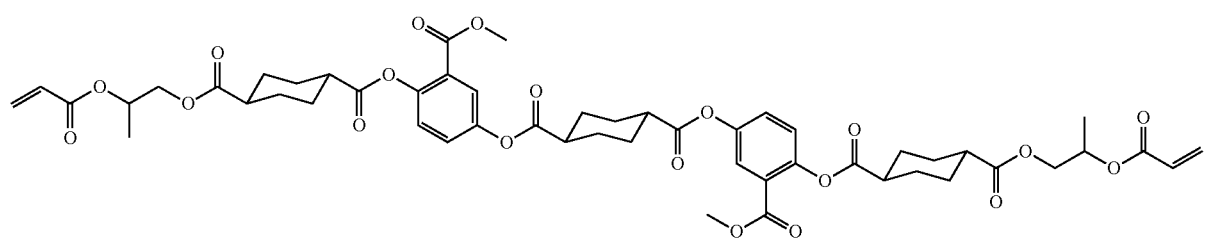
1-34
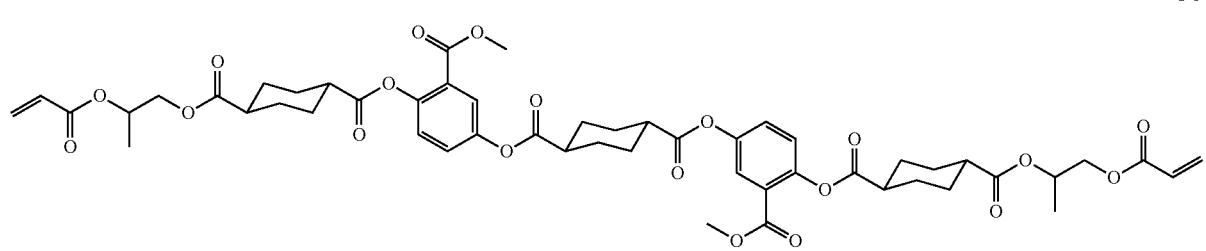
1-35
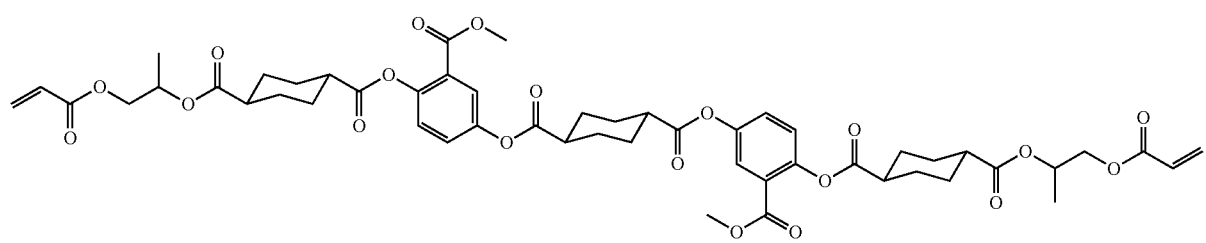
1
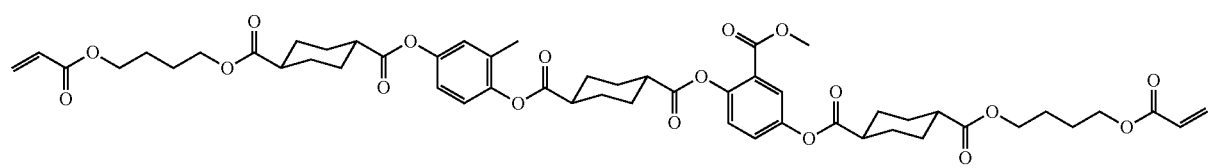

-continued
2
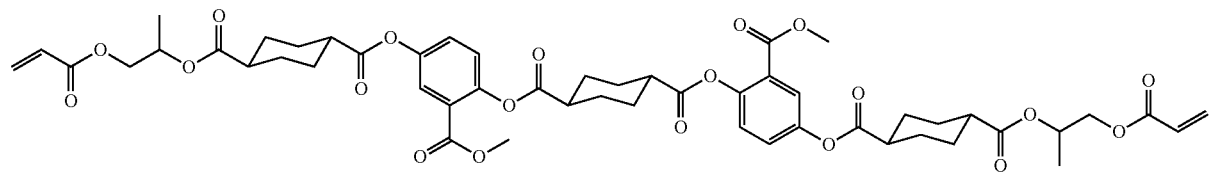
3
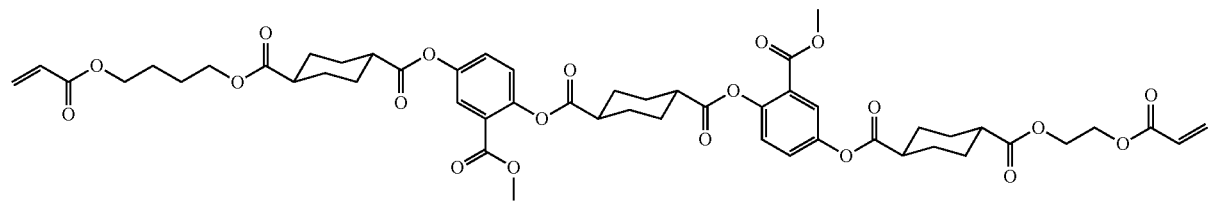
4
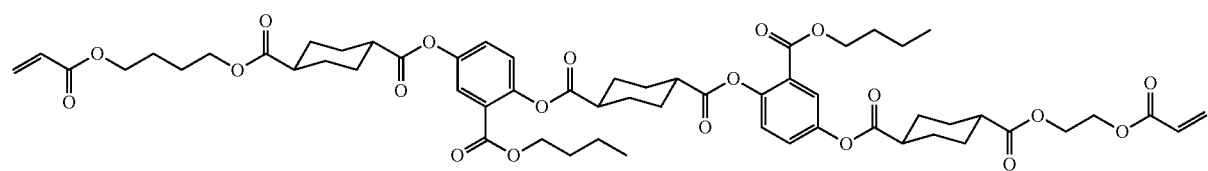
5
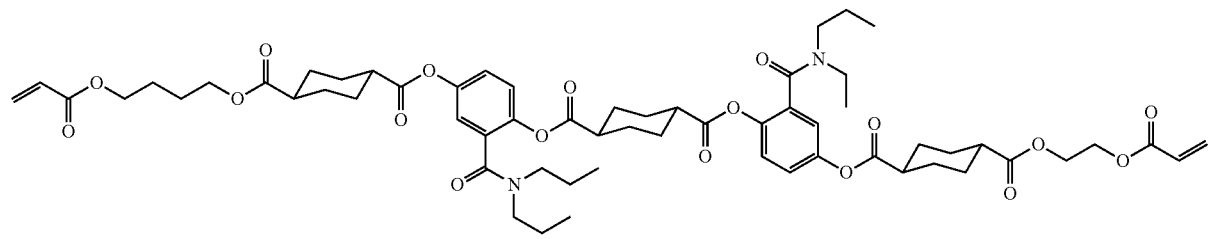
6
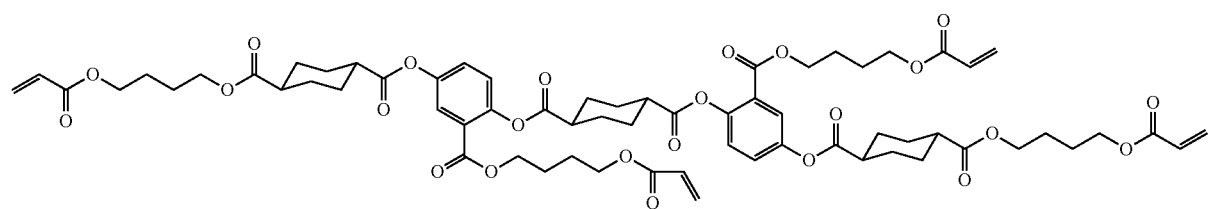
7
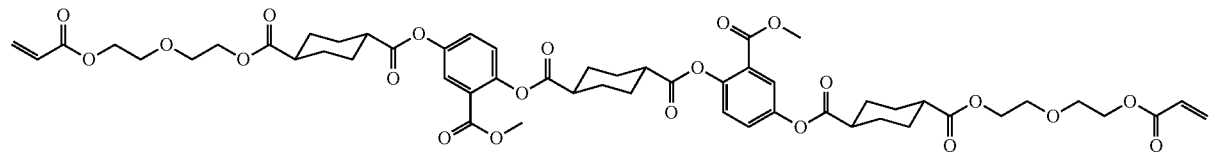
8
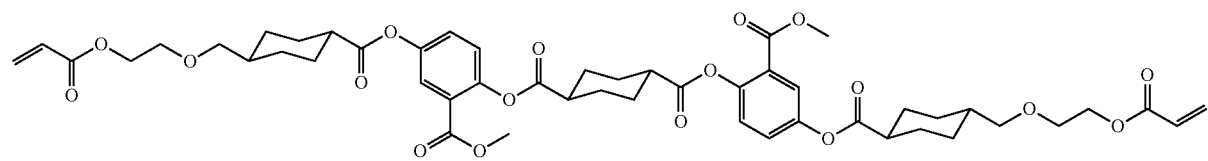

-continued
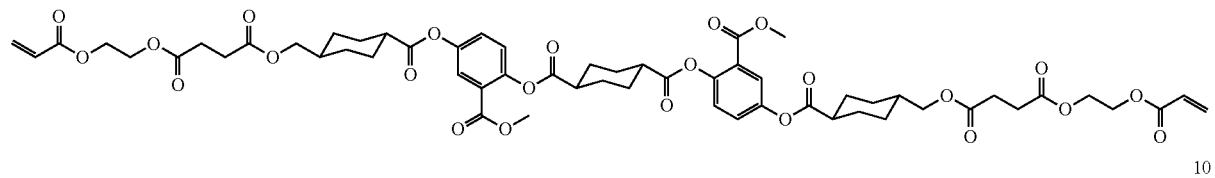
9
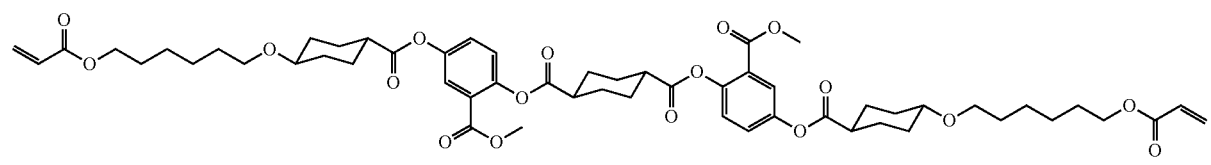
10
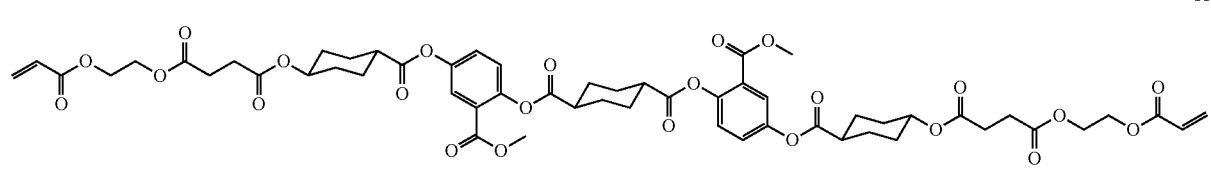
11
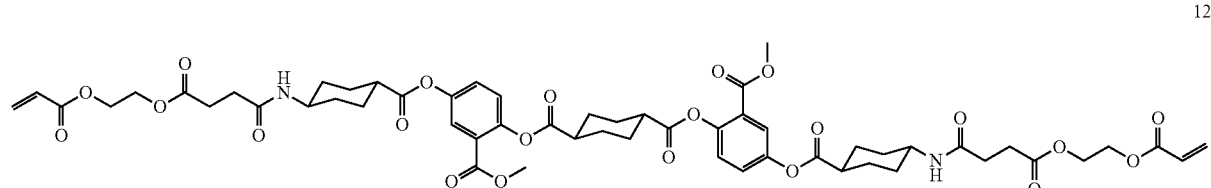
12
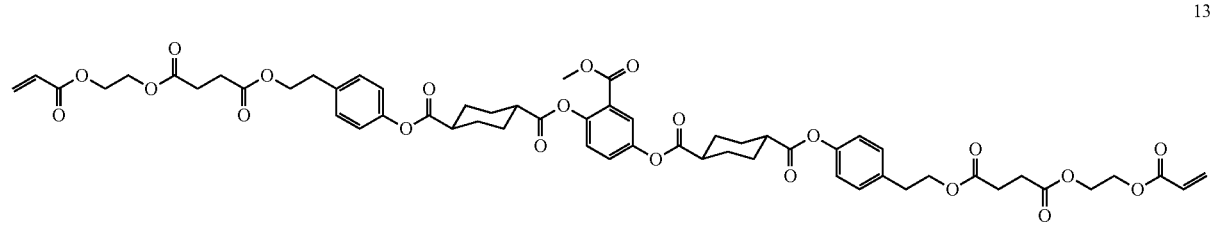
13
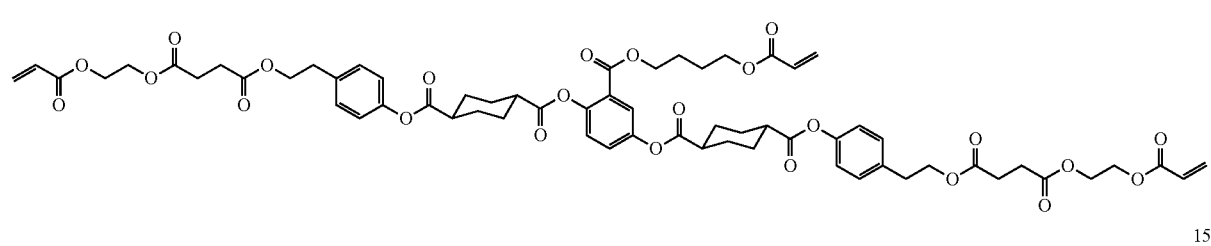
14
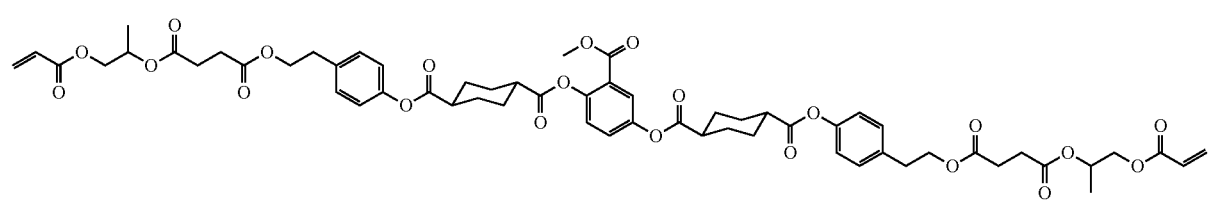
15
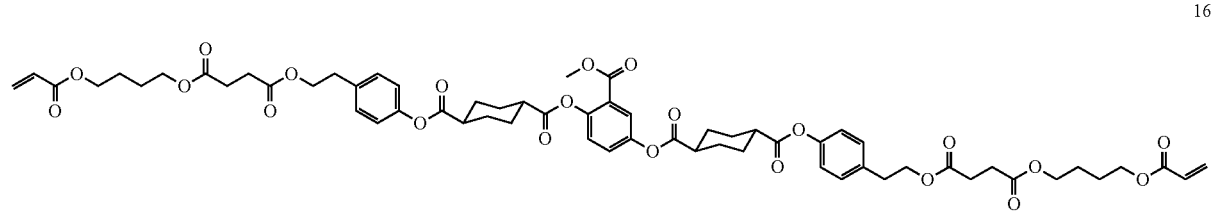
16

17
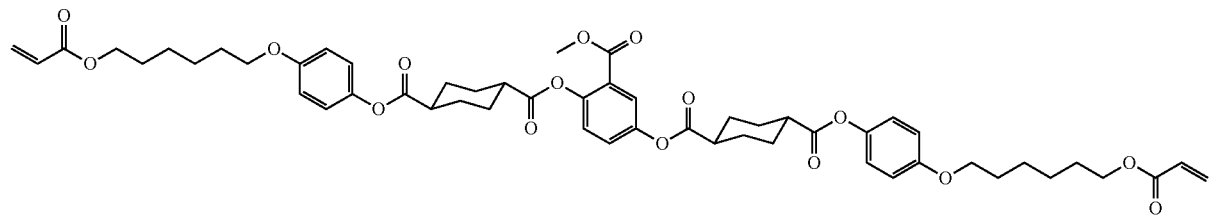
18
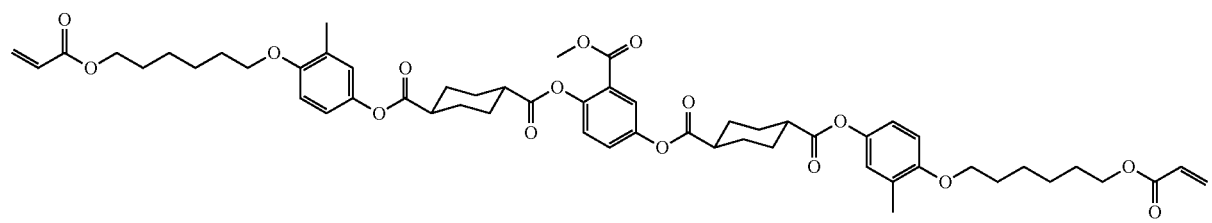
19
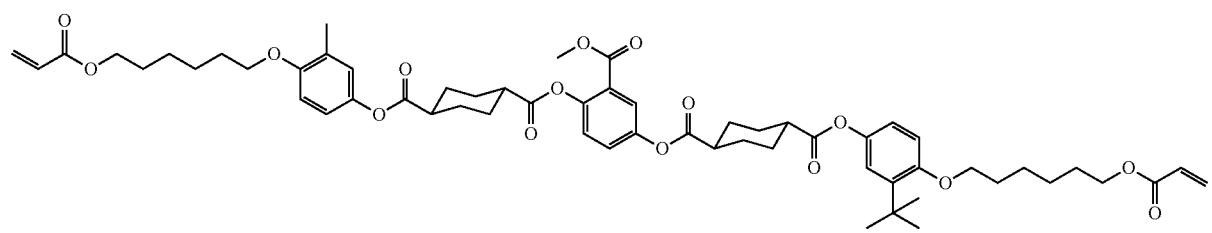
20
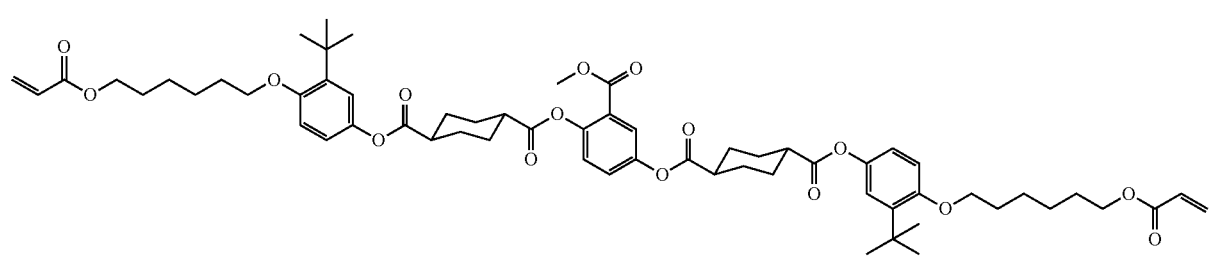
21
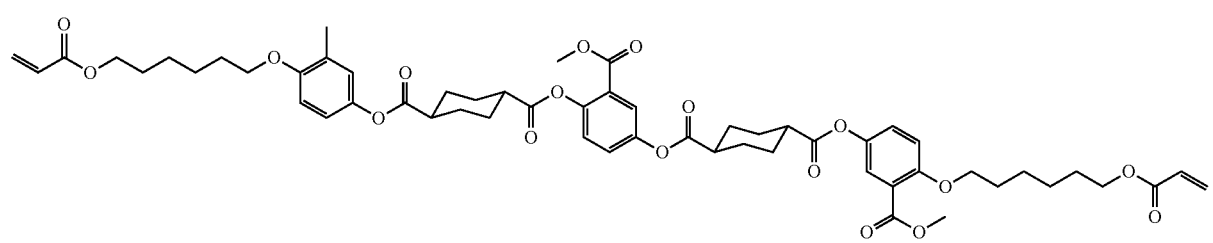
22
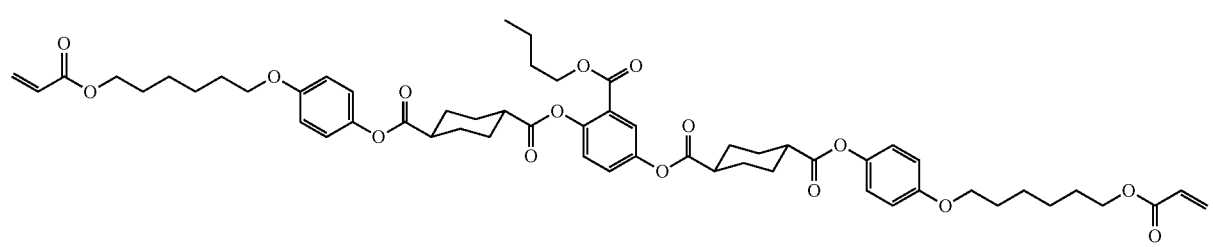

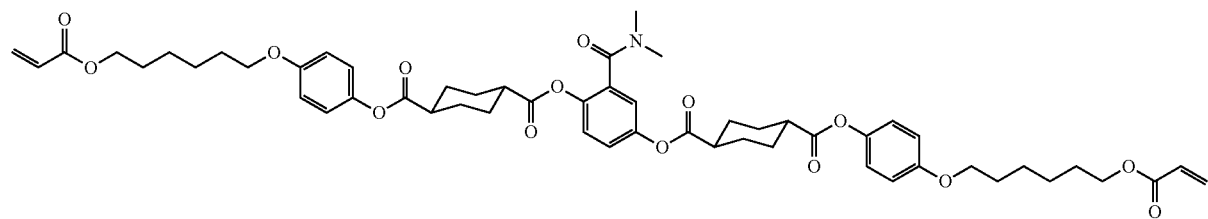
23
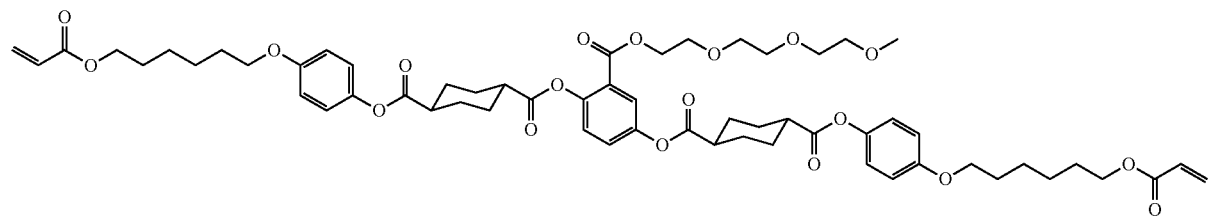
24
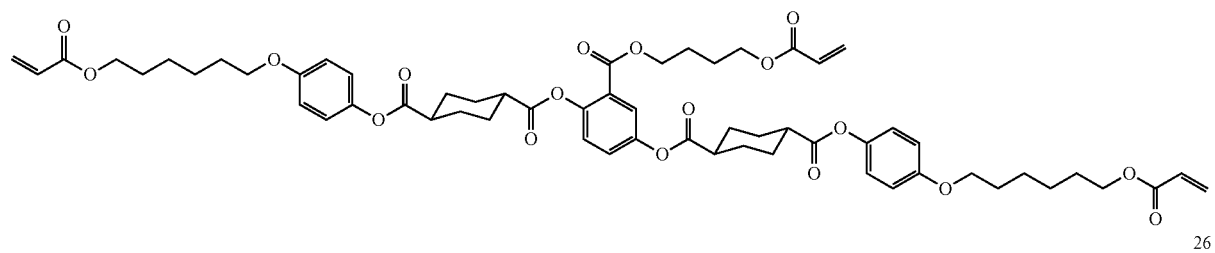
25
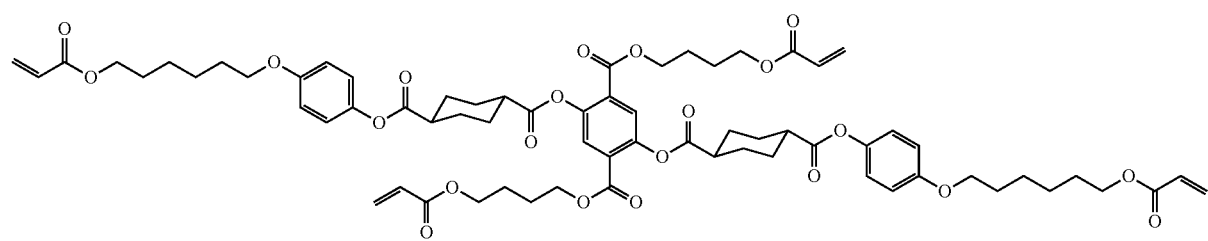
26
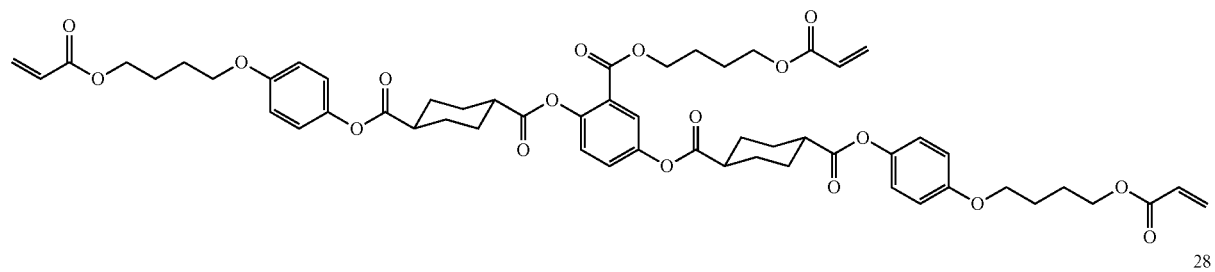
27
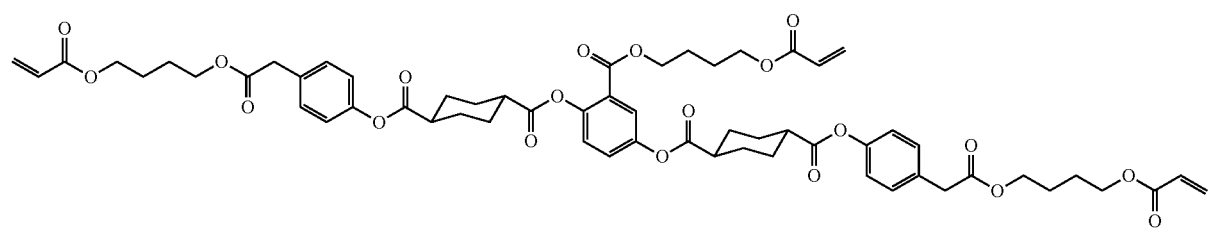
28

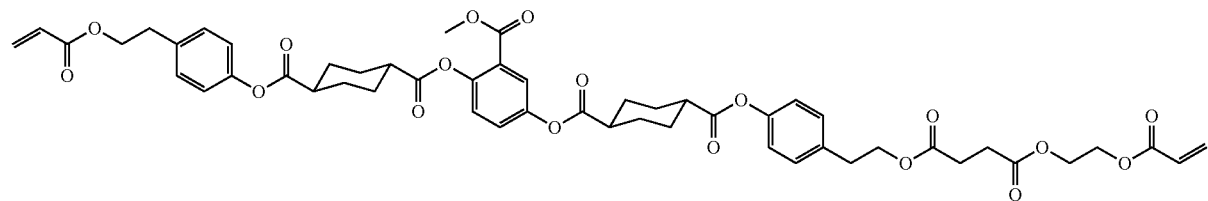
29
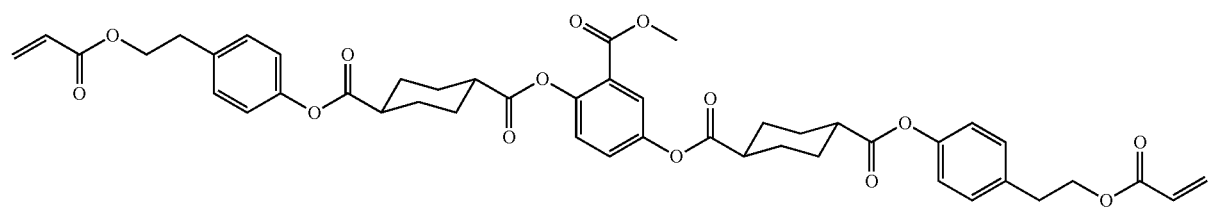
30
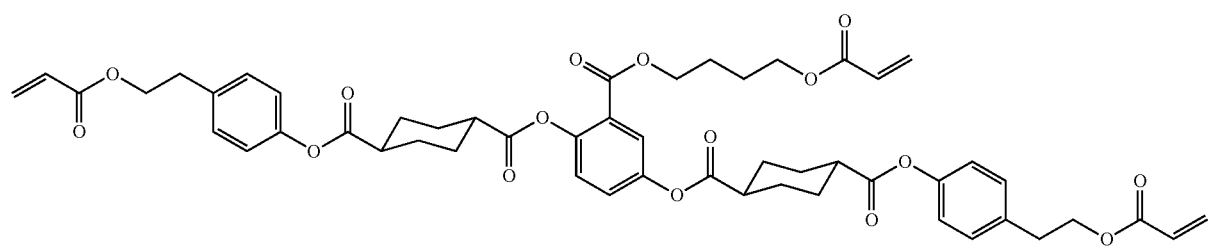
31
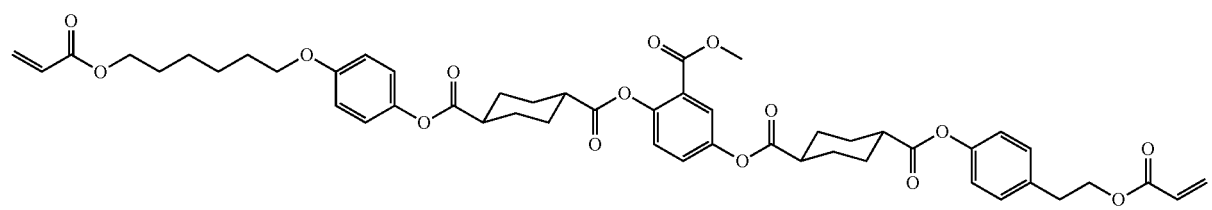
32
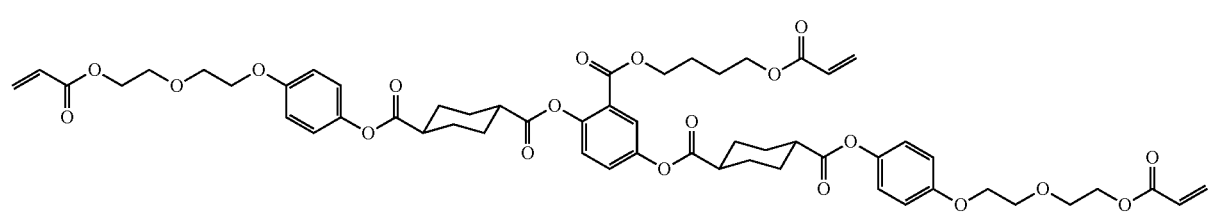
33
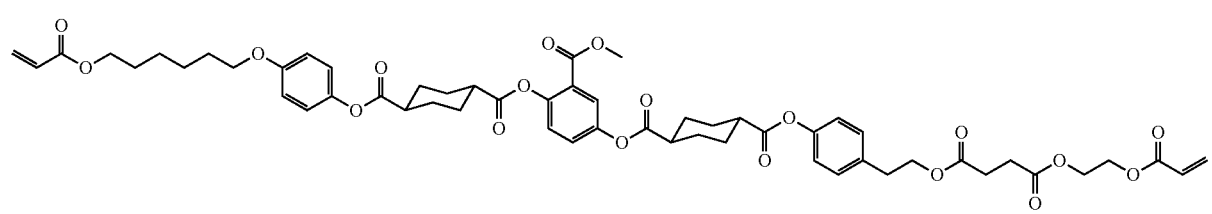
34

35
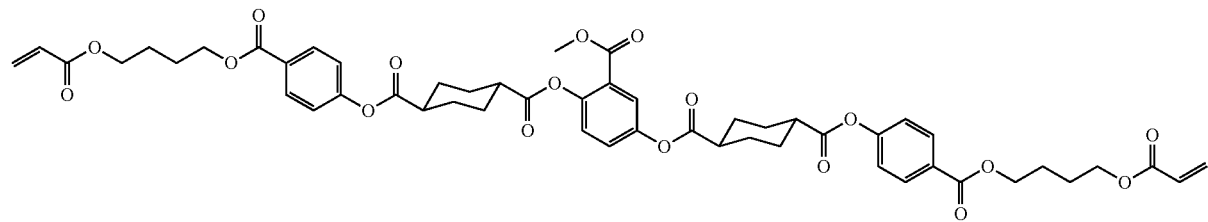
36
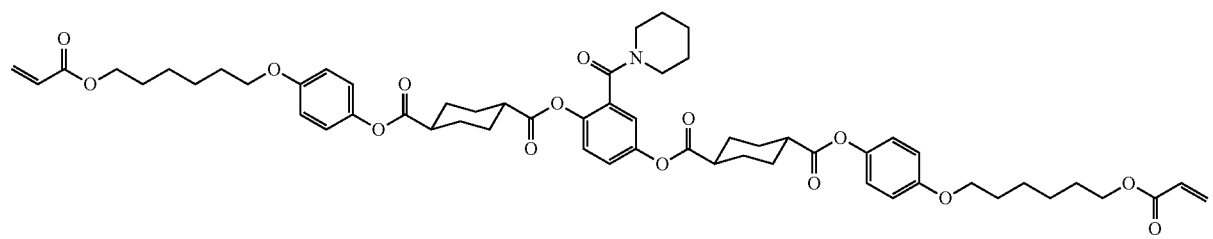
I-1-56
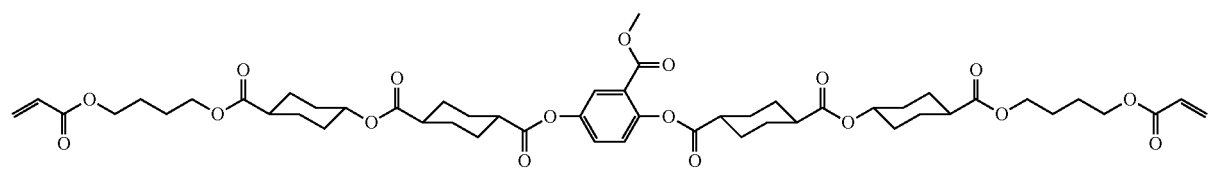
I-1-57
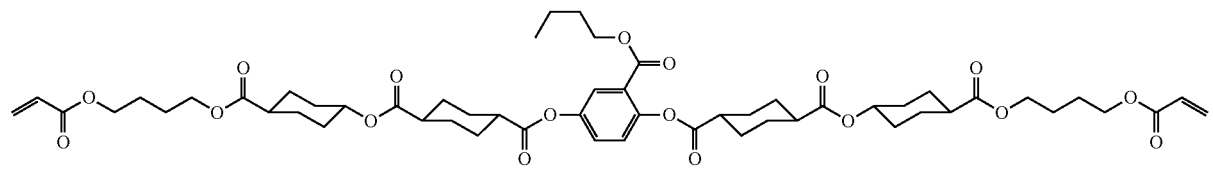
I-1-58
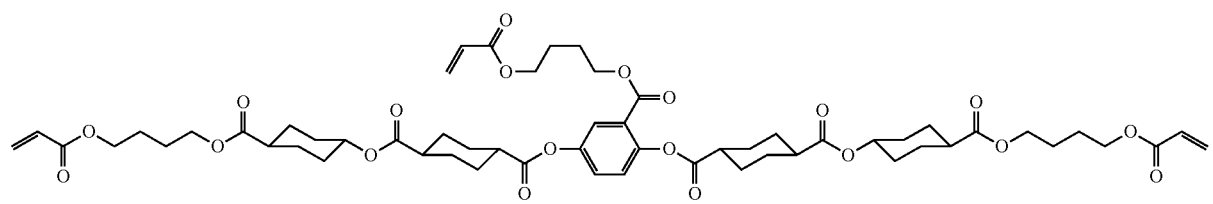
I-1-59
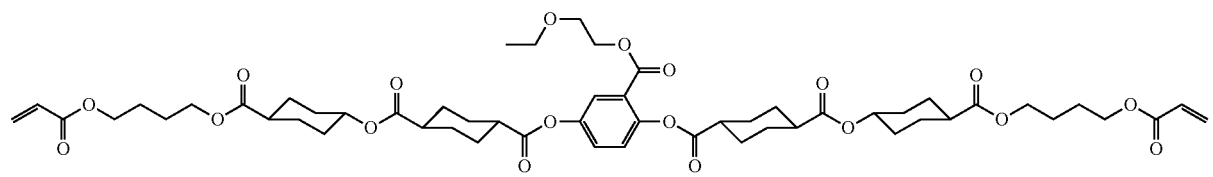

Further, two or more liquid crystal compounds may be used in combination. For example, two or more liquid crystal compounds represented by Formula (I) may be used in combination.

Among them, it is preferable to use a liquid crystal compound which is a liquid crystal compound represented by Formula (I) and satisfies 0.1<mc<0.3, together with the liquid crystal compound which is a liquid crystal compound represented by Formula (I) and satisfies 0.4≤mc≤0.8.

Examples of the liquid crystal compound represented by Formula (I) and satisfying 0.1<mc<0.3 include the following.

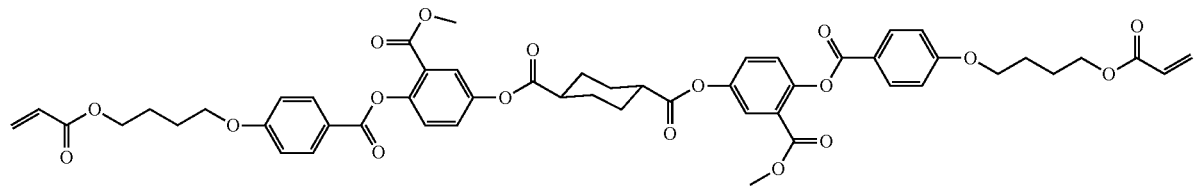

2-1

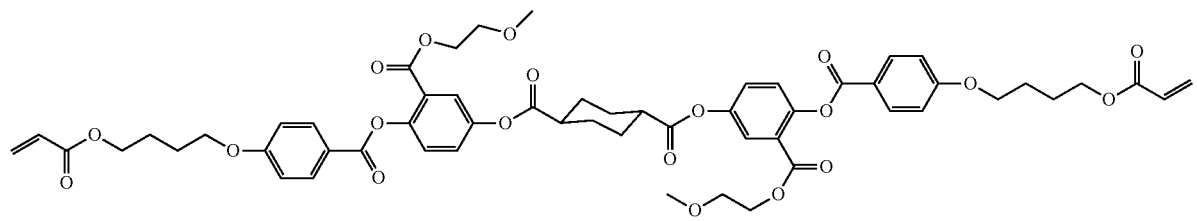

2-2

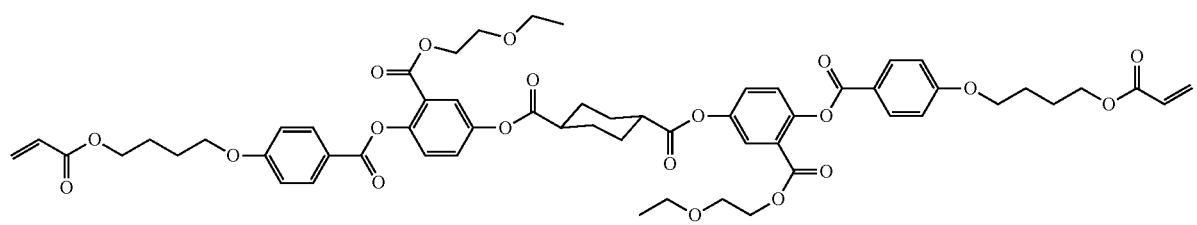

2-3

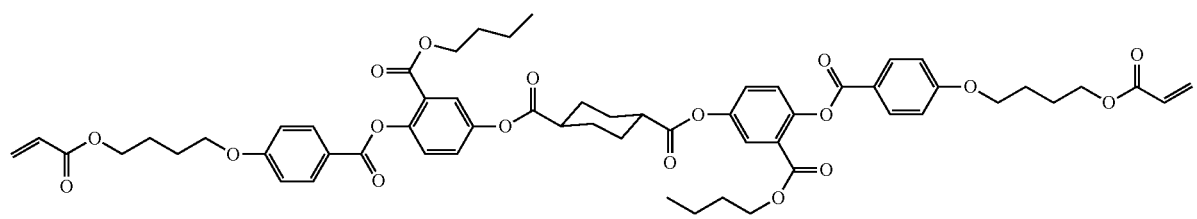

2-4

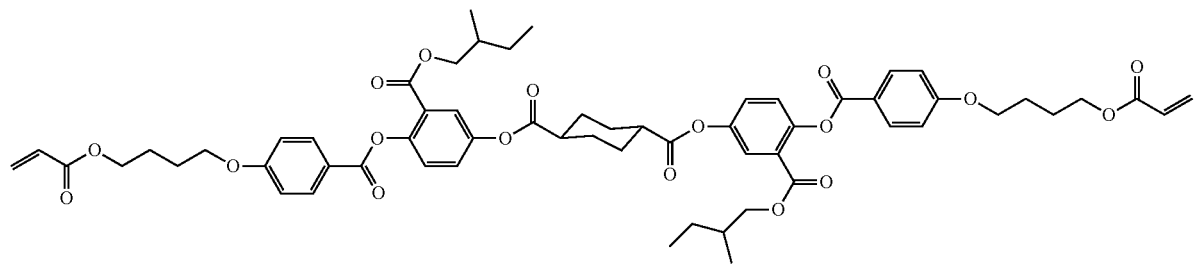

2-5

2-6
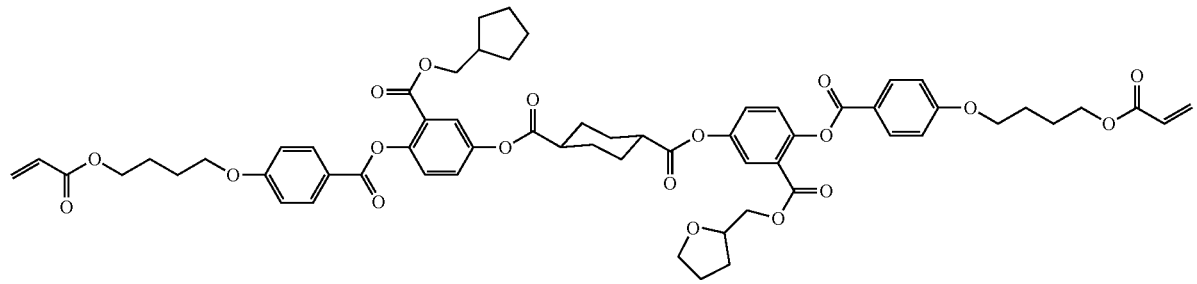
2-7
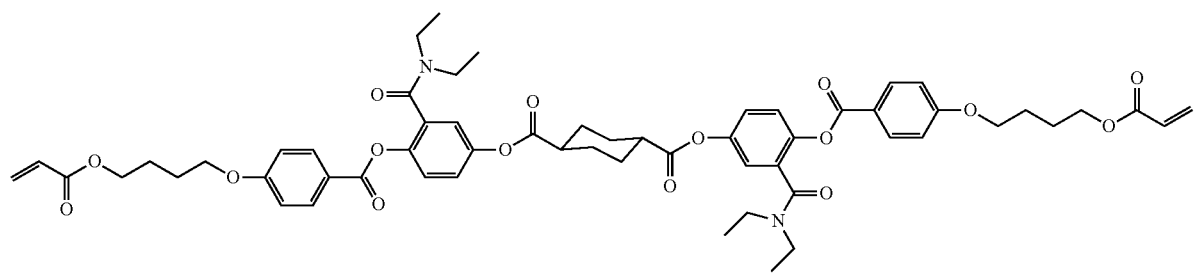
2-8
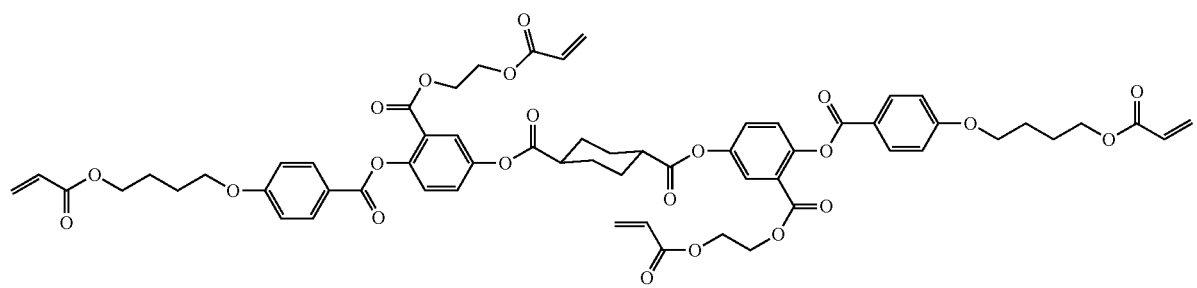
2-9
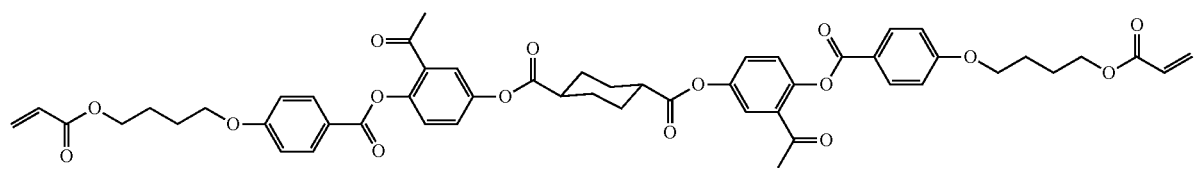
2-10
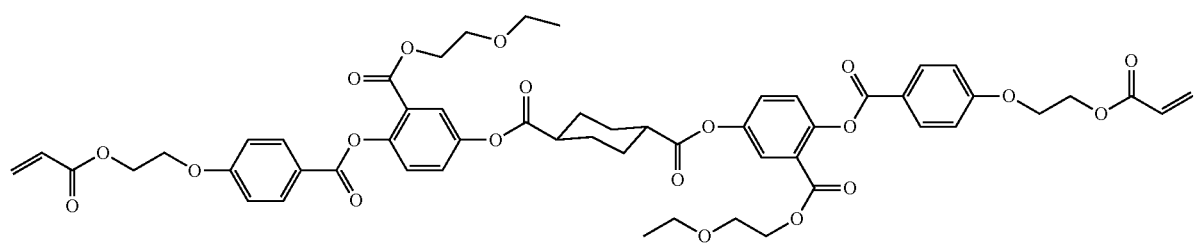
2-11
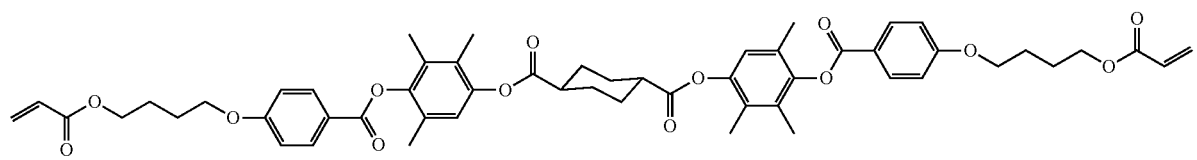

-continued
2-12
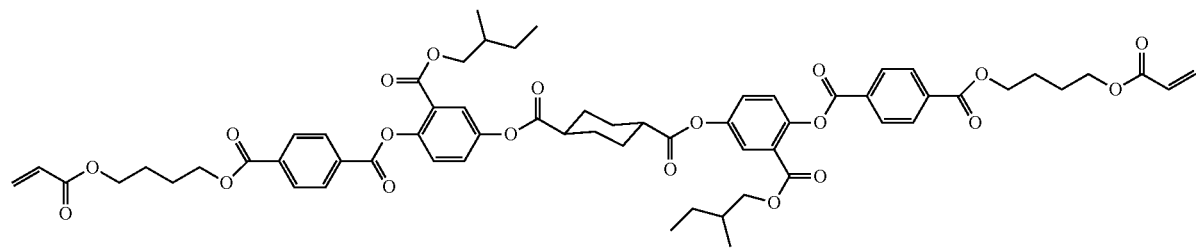
2-13
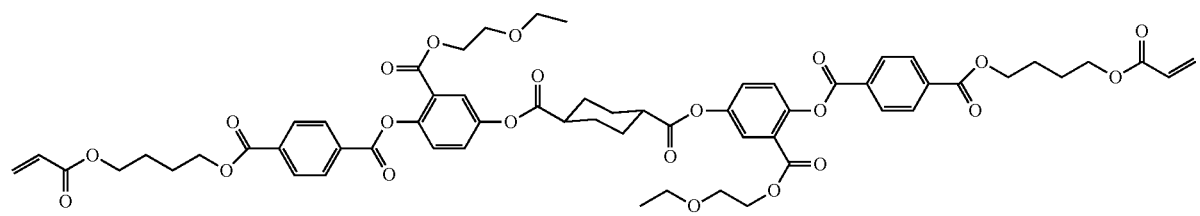
2-14
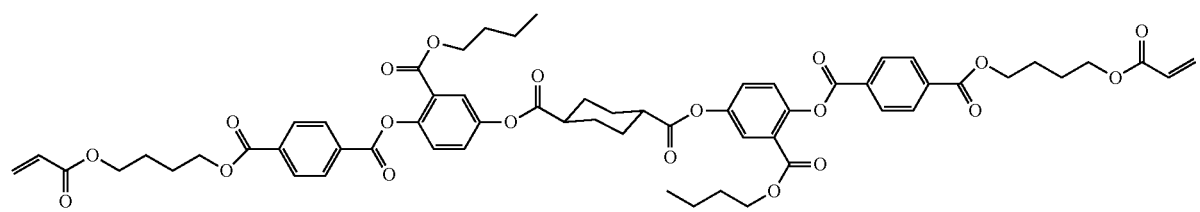
2-15
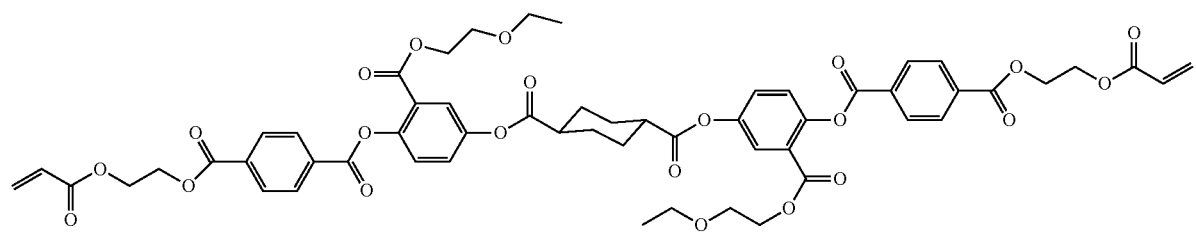
2-16
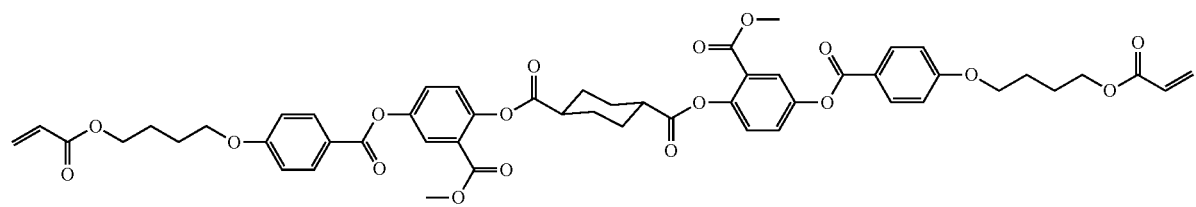
2-17
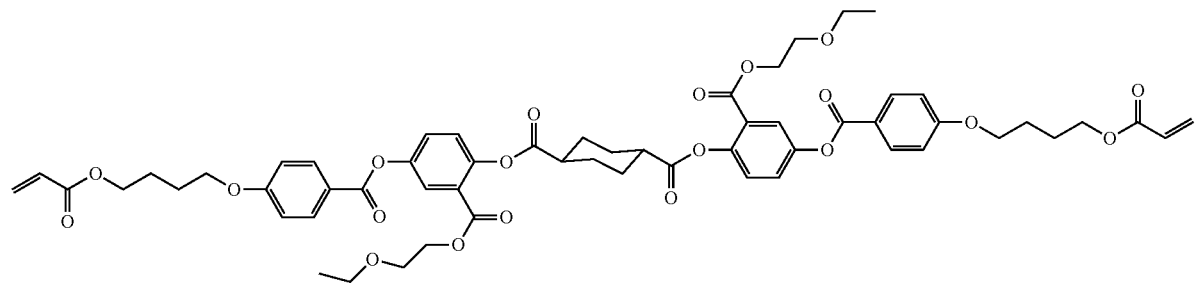

2-18
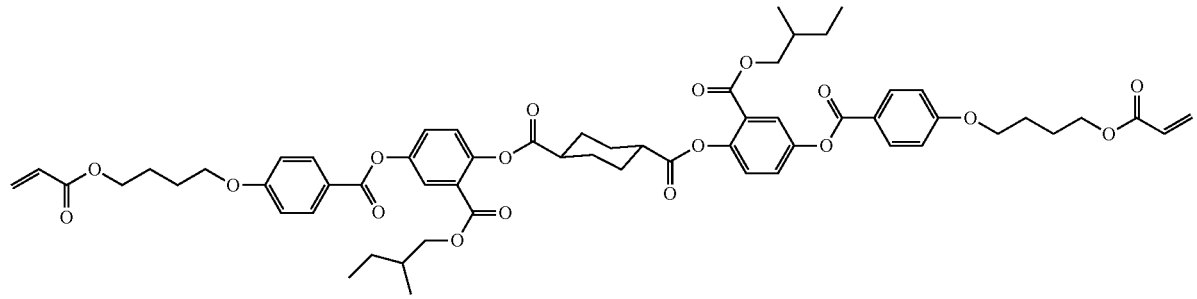
2-19
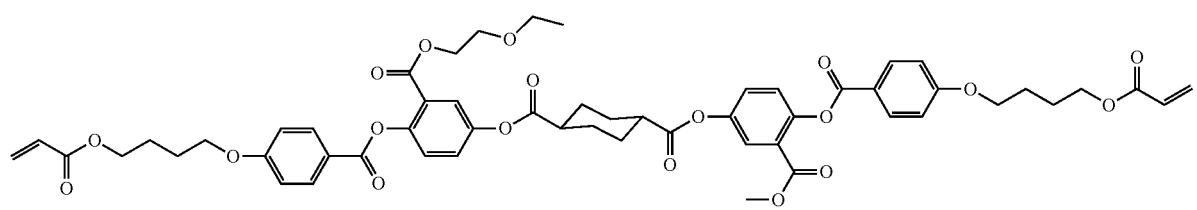
2-20
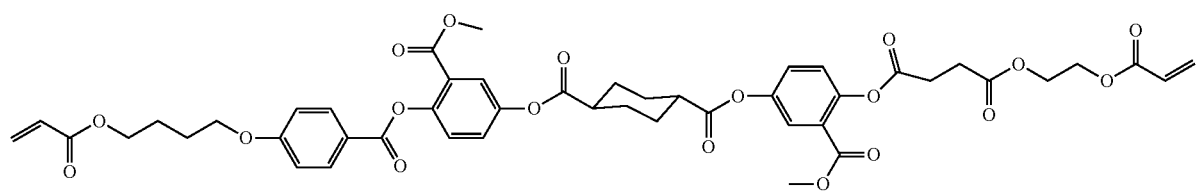
2-21
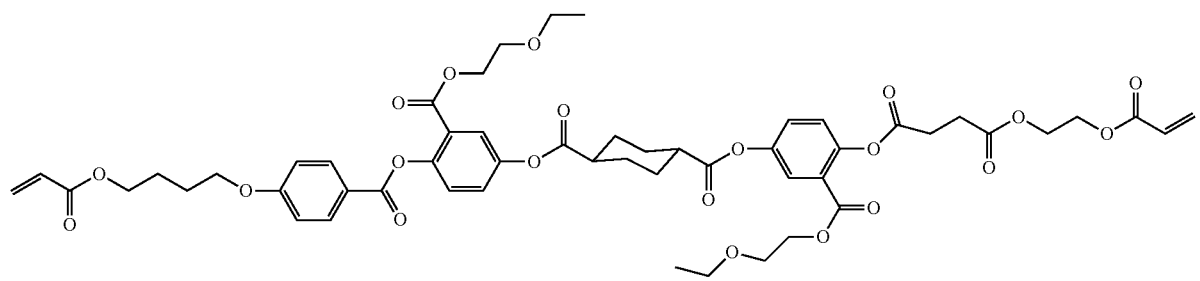
2-22
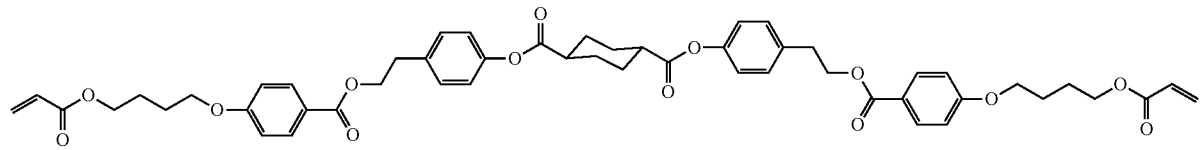
2-23
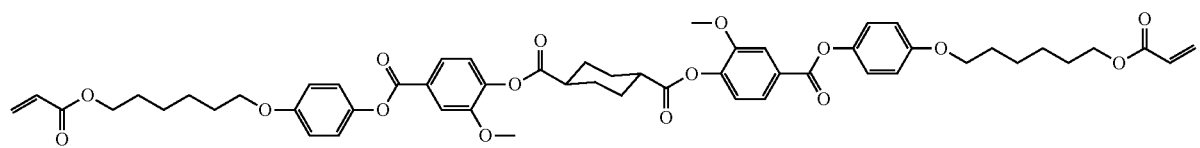
2-24
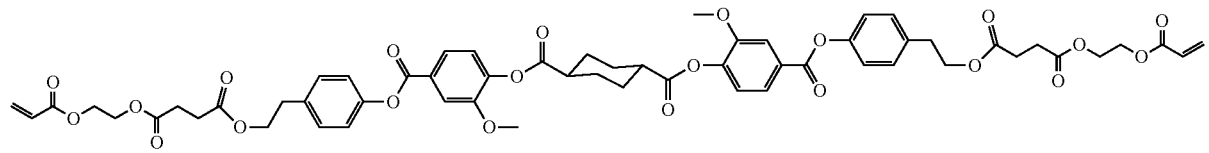

-continued
2-28
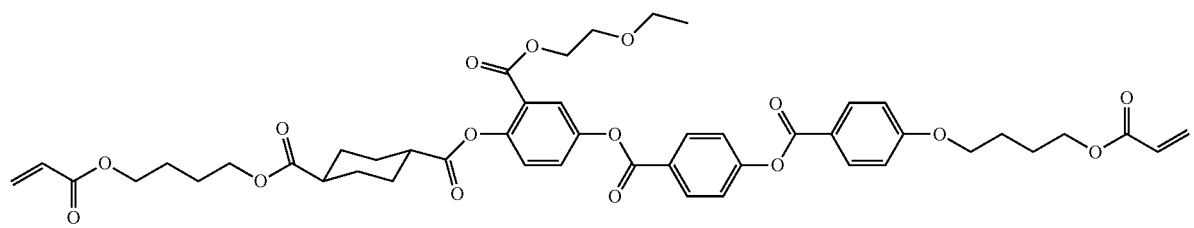
2-29
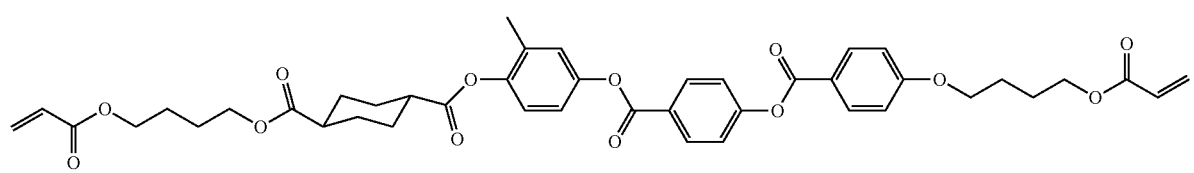
2-30
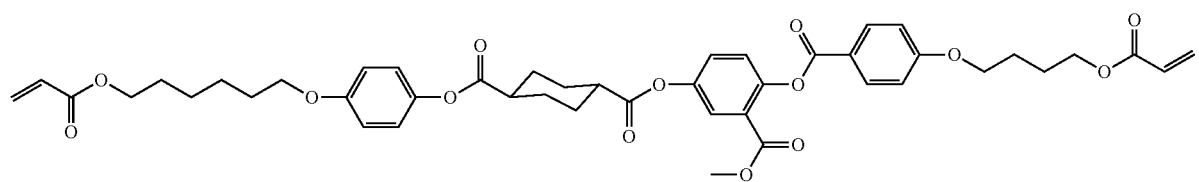
2-31
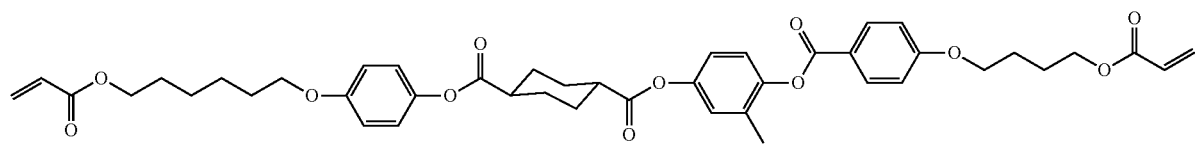
2-32
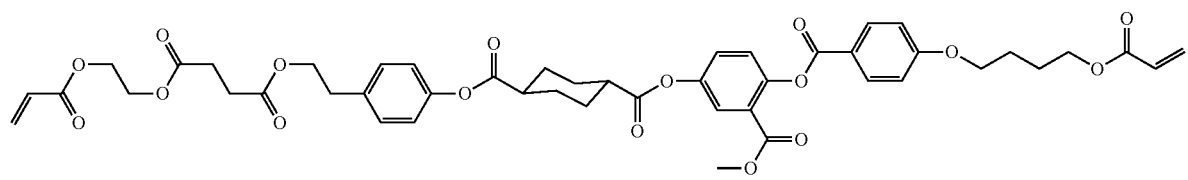
2-33
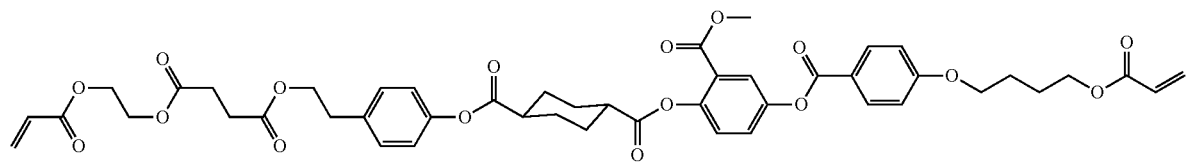
As the liquid crystal compound for use in the present invention, a compound represented by Formula (IV) and described in JP2014-198814A, in particular, a polymerizable liquid crystal compound having one (meth)acrylate group represented by Formula (IV) is also suitably used.
Formula (IV)
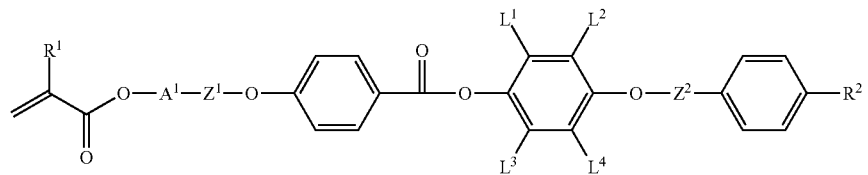

In Formula (IV), $A^1$ represents an alkylene group having 2 to 18 carbon atoms, in which one $CH_2$ in the alkylene group or two or more non-adjacent $CH_2$ may be substituted with —O—;

$Z^1$ represents —C(=O)—, —O—C(=O)—, or a single bond;

$Z^2$ represents —C(=O)— or —C(=O)—CH=CH—;

$R^1$ represents a hydrogen atom or a methyl group;

$R^2$ represents a hydrogen atom, a halogen atom, a linear alkyl group having 1 to 4 carbon atoms, a methoxy group, an ethoxy group, a phenyl group which may have a substituent, a vinyl group, a formyl group, a nitro group, a cyano group, an acetyl group, an acetoxy group, an N-acetylamide group, an acryloylamino group, an N,N-dimethylamino group, or a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl)carbamoyloxy group or a structure represented by Formula (IV-2); and $L^1$, $L^2$, $L^3$, and $L^4$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^1$, $L^2$, $L^3$, or $L^4$ represents a group other than a hydrogen atom.

—$Z^5$-T-Sp-P  Formula (IV-2)

In Formula (IV-2), P represents an acryl group, a methacryl group, or a hydrogen atom, and $Z^5$ represents a single bond, C(=O)O—, —OC(=O)—, —C(=O)$NR^1$— (where $R^1$ represents a hydrogen atom or a methyl group), —$NR^1$C(=O)—, —C(=O)S—, or —SC(=O)—, T represents 1,4-phenylene, and Sp represents a divalent aliphatic group having 1 to 12 carbon atoms which may have a substituent, and one $CH_2$ in the aliphatic group or two or more non-adjacent $CH_2$ may be substituted with —O—, —S—, —OC(=O)—, —C(=O)O—, or —OCOO—.

The compound represented by Formula (IV) is preferably a compound represented by Formula (V).

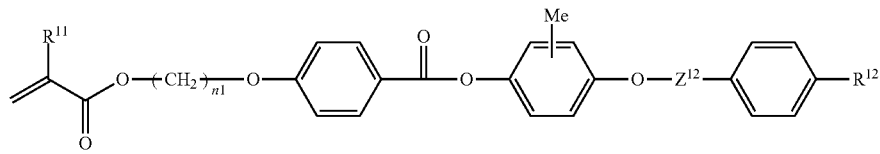

Formula (V)

In Formula (V), n1 represents an integer of 3 to 6;

$R^{11}$ represents a hydrogen atom or a methyl group;

$Z^{12}$ represents —C(=O)— or —C(=O)—CH=CH—; and $R^{12}$ represents a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

—$Z^{51}$-T-Sp-P  Formula (IV-3)

In Formula (IV-3), P represents an acryl group or a methacryl group;

$Z^{51}$ represents —C(=O)O— or —OC(=O)—; T represents 1,4-phenylene; and

Sp represents a divalent aliphatic group having 2 to 6 carbon atoms which may have a substituent. One $CH_2$ in this aliphatic group or two or more non-adjacent $CH_2$ may be substituted with —O—, —OC(=O)—, —C(=O)O—, or —OC(=O)O—.

n1 represents an integer of 3 to 6, preferably 3 or 4.

$Z^{12}$ represents —C(=O)— or —C(=O)—CH=CH— and preferably represents —C(=O)—.

$R^{12}$ is a hydrogen atom, a linear alkyl group having 1 to 4 carbon atoms, a methoxy group, an ethoxy group, a phenyl group, an acryloylamino group, a methacryloylamino group, an allyloxy group, or a group represented by Formula (IV-3), more preferably represents a methyl group, an ethyl group, a propyl group, a methoxy group, an ethoxy group, a phenyl group, an acryloylamino group, a methacryloylamino group, or a group represented by Formula (IV-3), and still more preferably represents a methyl group, an ethyl group, a methoxy group, an ethoxy group, a phenyl group, an acryloylamino group, a methacryloylamino group, or a structure represented by Formula (IV-3).
Specific examples of the compound represented by Formula (IV) are shown below. Note that in the present invention, the compound represented by Formula (IV) is not limited thereto.
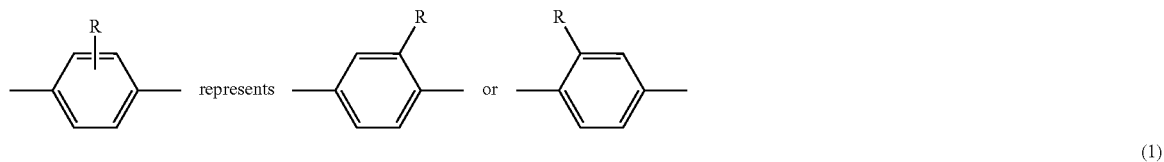
(1)
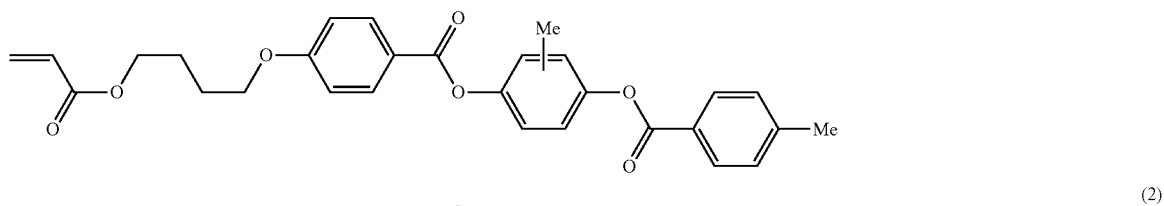
(2)
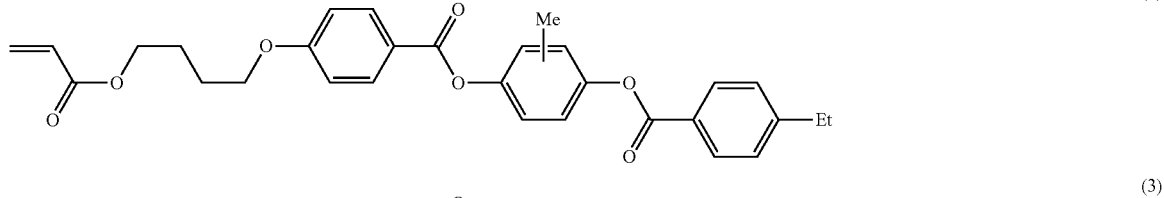
(3)
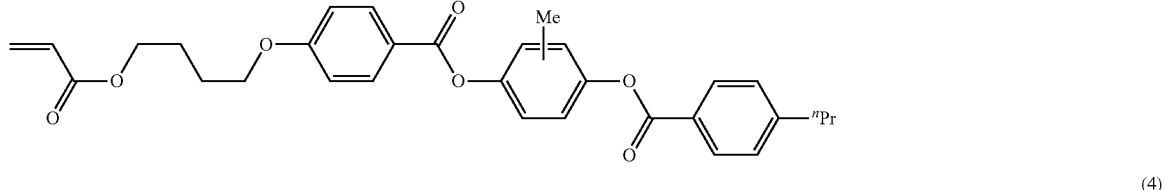
(4)
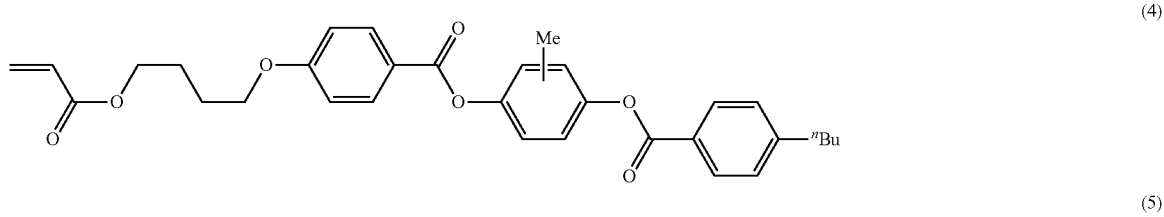
(5)
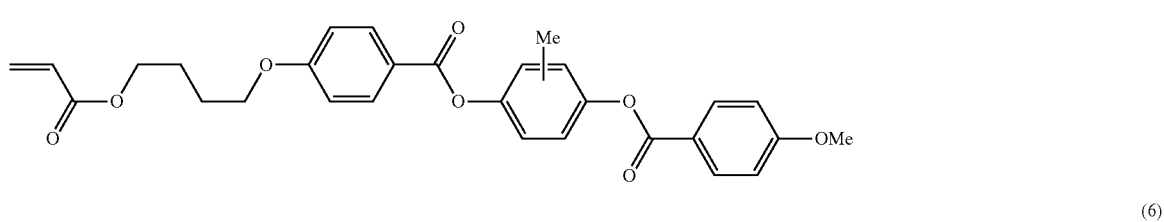
(6)
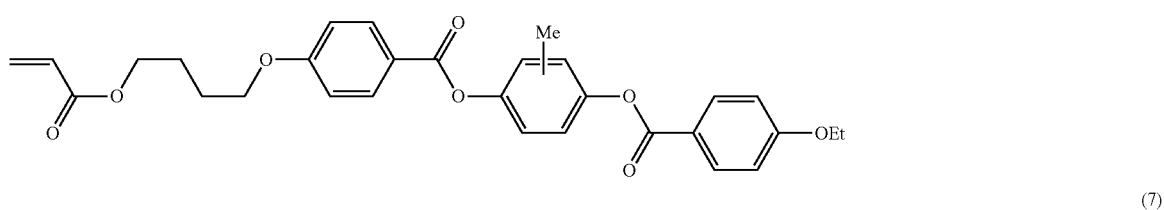
(7)

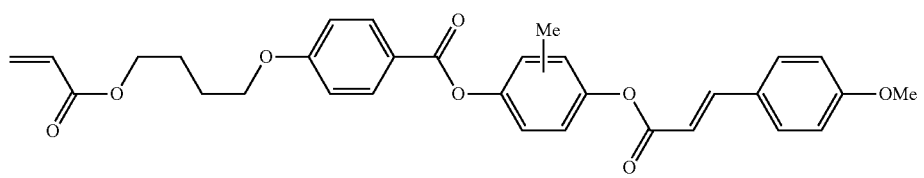
(8)
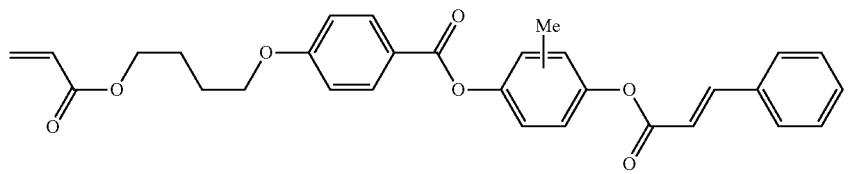
(9)
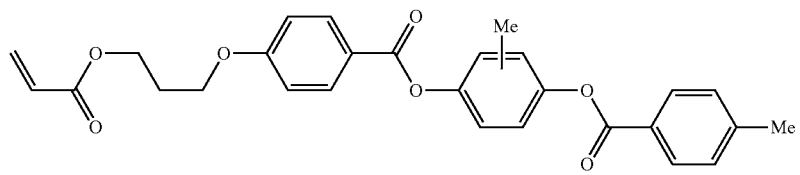
(1A)
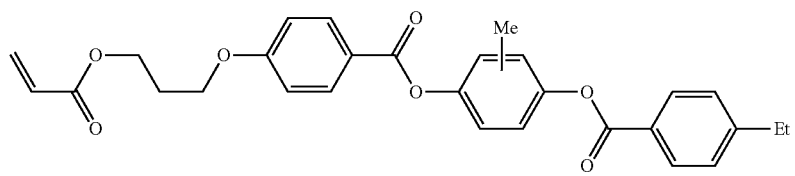
(2A)
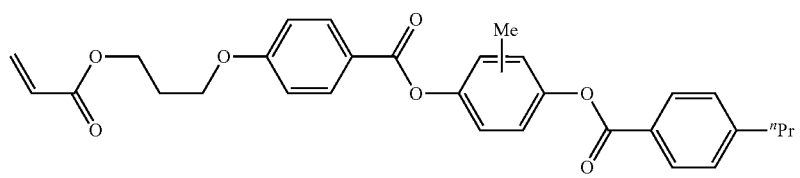
(3A)
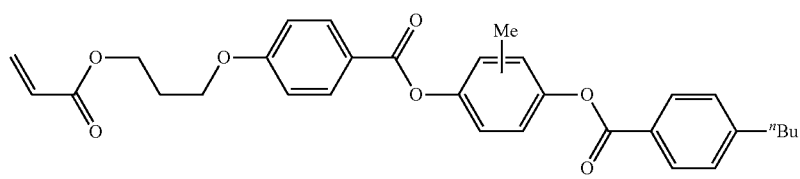
(4A)
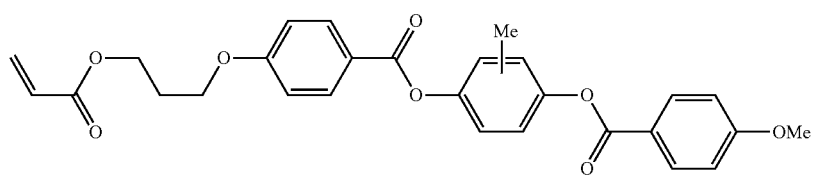
(5A)
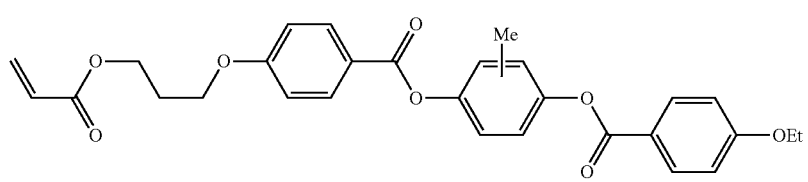
(6A)

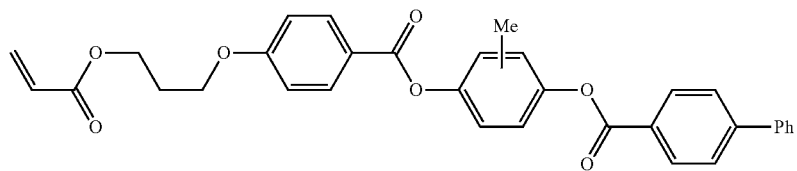
(7A)
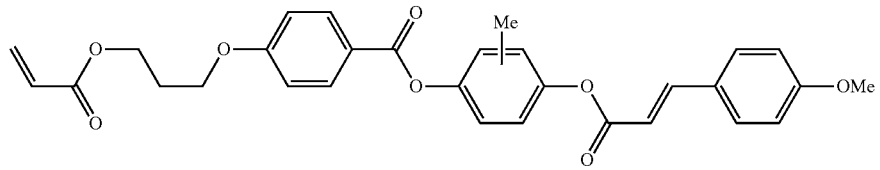
(8A)
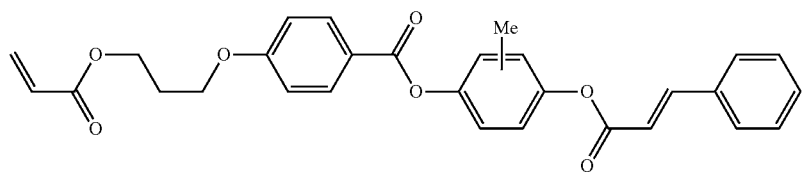
(9A)
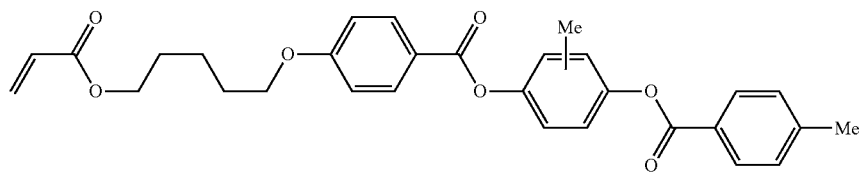
(1B)
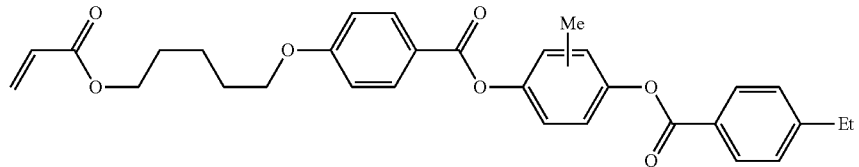
(2B)
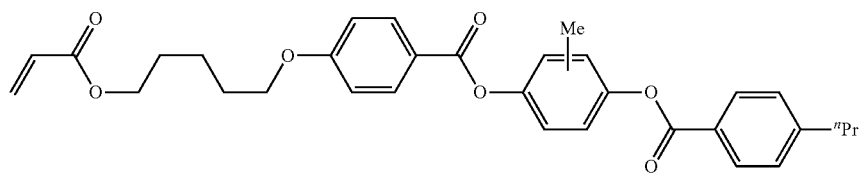
(3B)
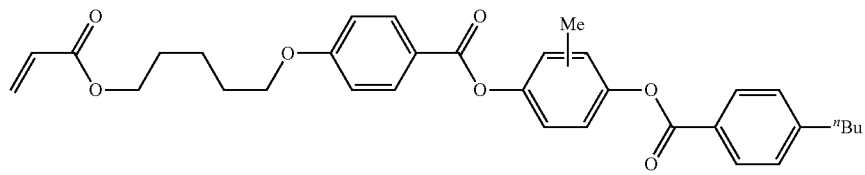
(4B)
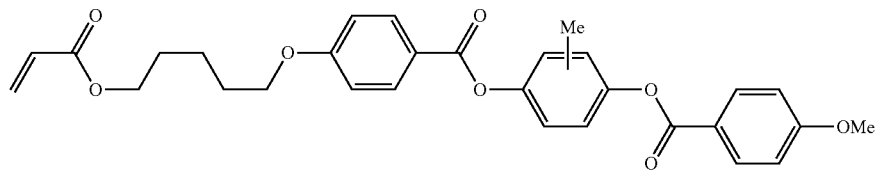
(5B)

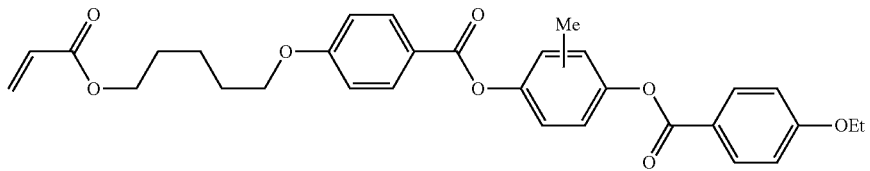 (6B)
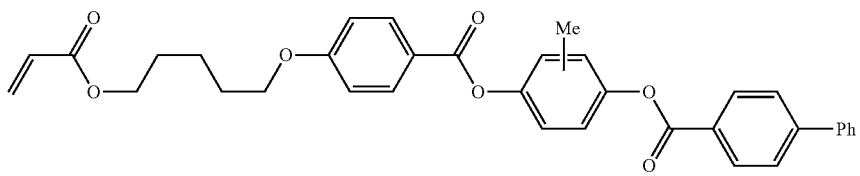 (7B)
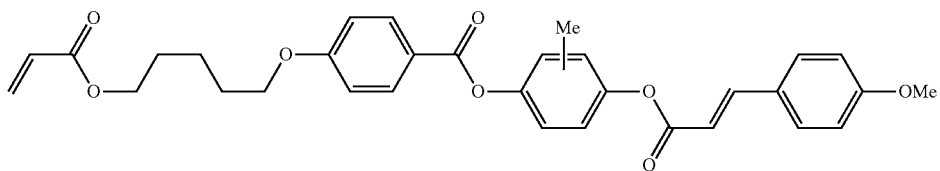 (8B)
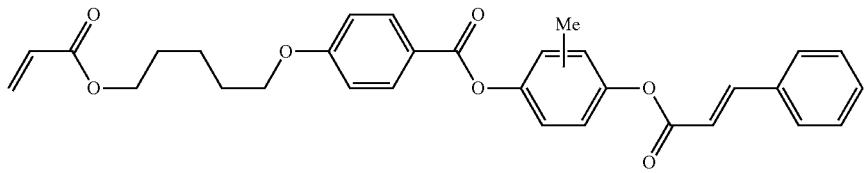 (9B)
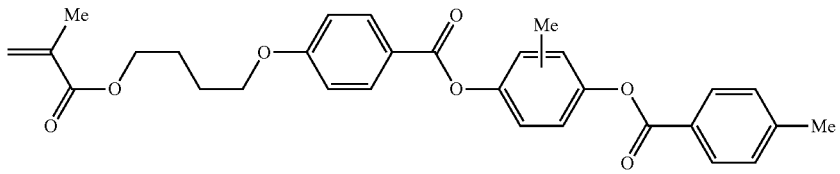 (1C)
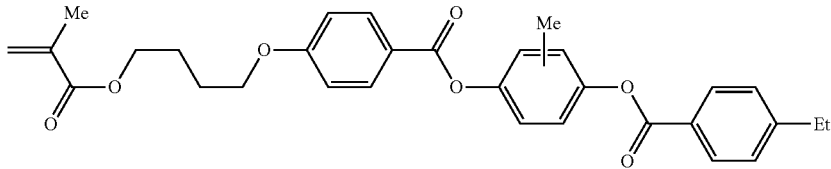 (2C)
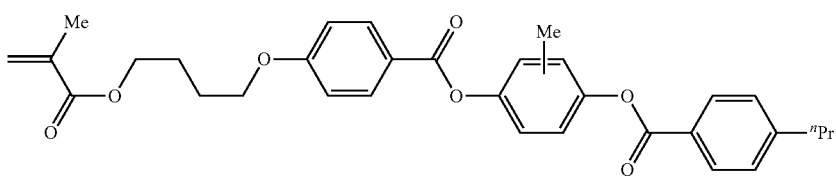 (3C)
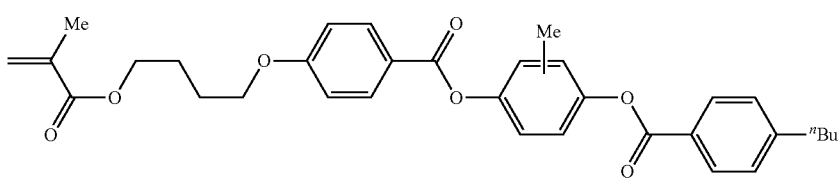 (4C)

-continued
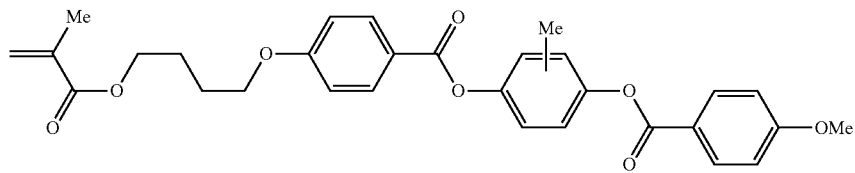
(5C)
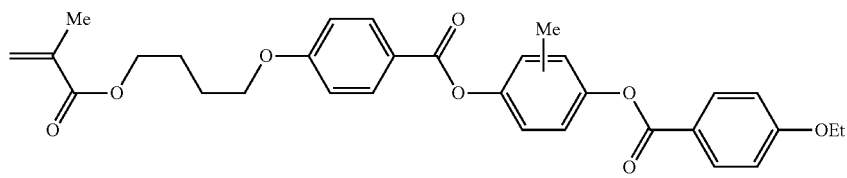
(6C)
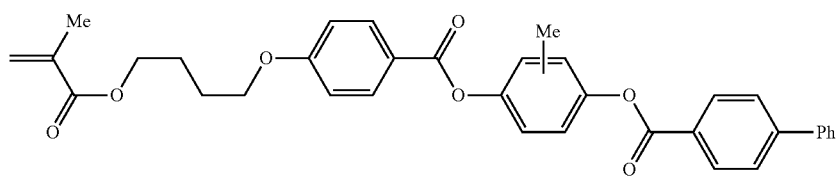
(7C)
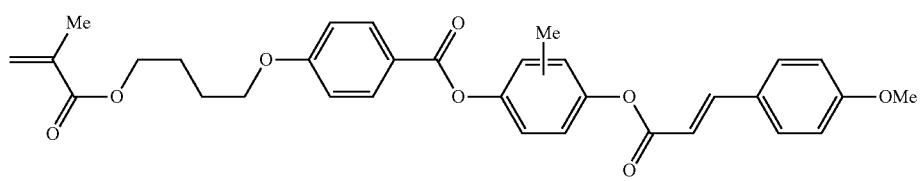
(8C)
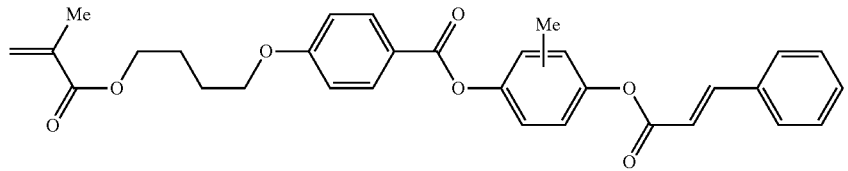
(9C)
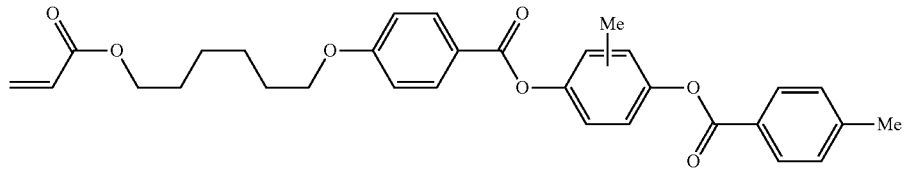
(1D)
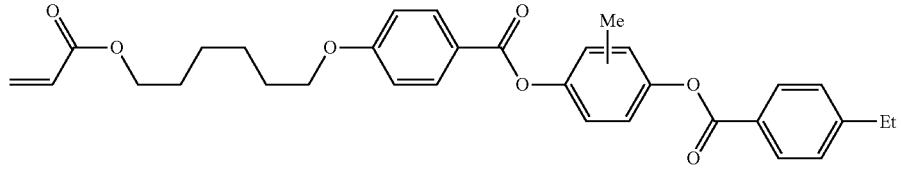
(2D)
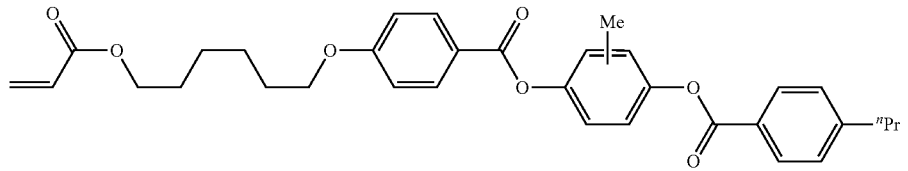
(3D)

-continued
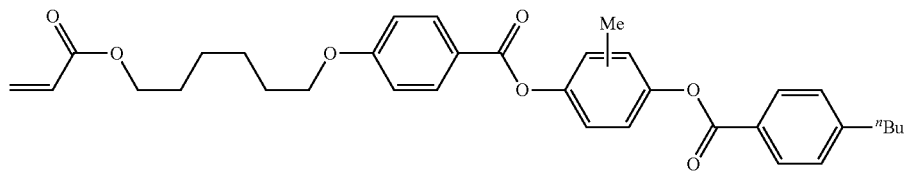
(4D)
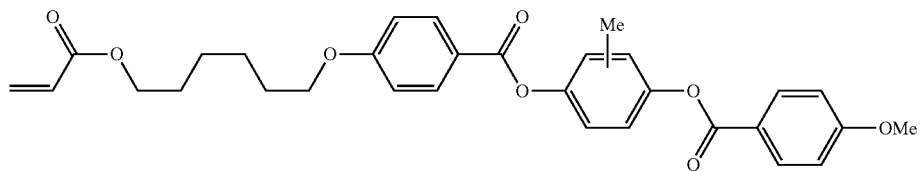
(5D)
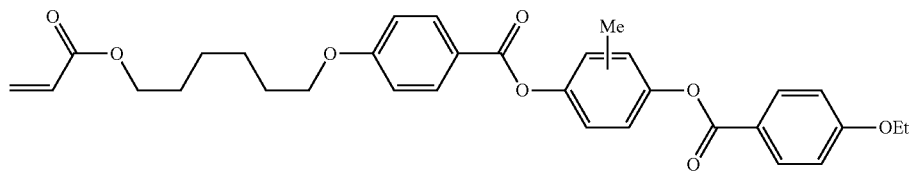
(6D)
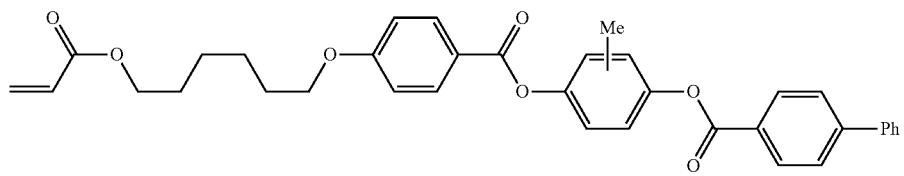
(7D)
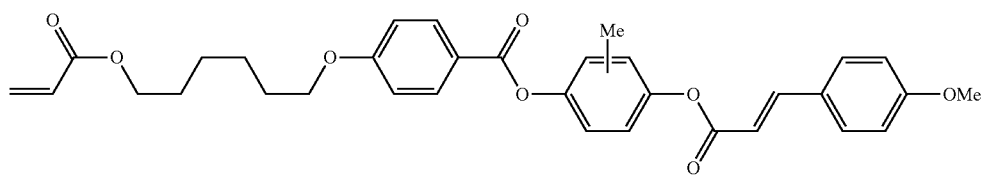
(8D)
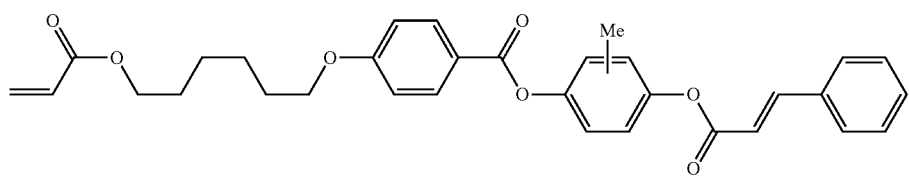
(9D)
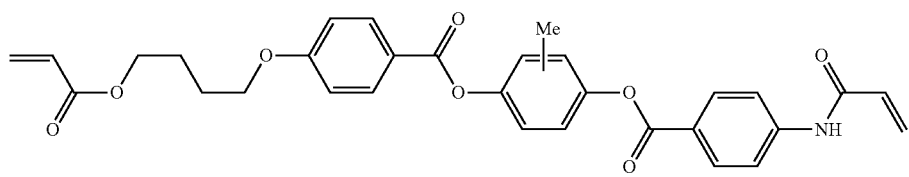
(1L)
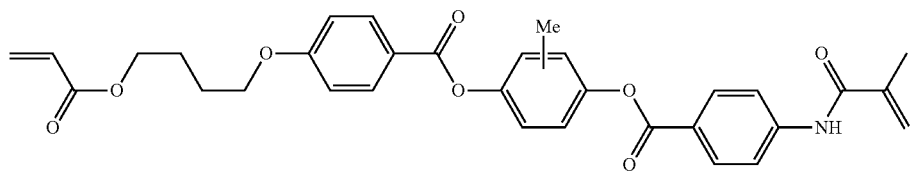
(2L)

-continued
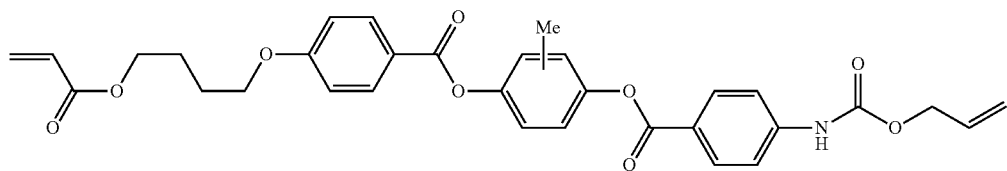
(3L)
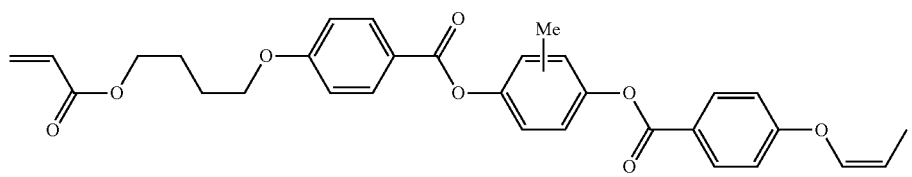
(4L)
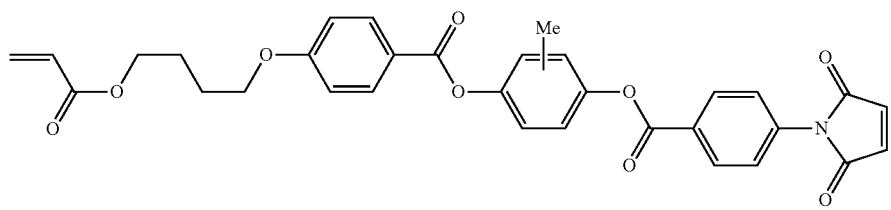
(5L)
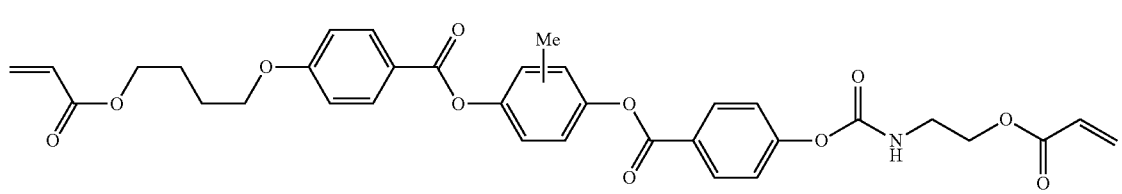
(6L)
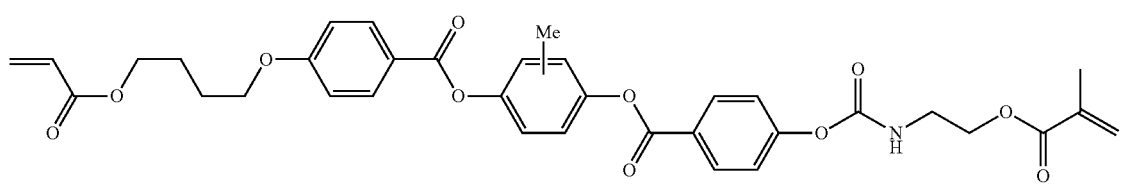
(7L)
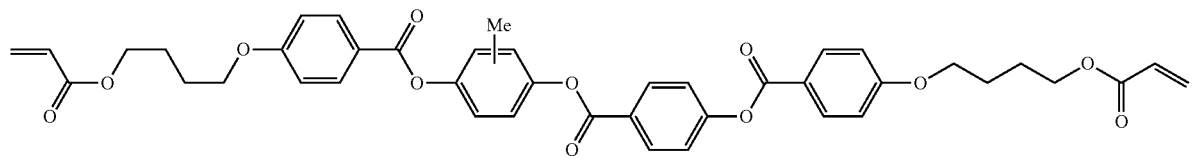
(8L)
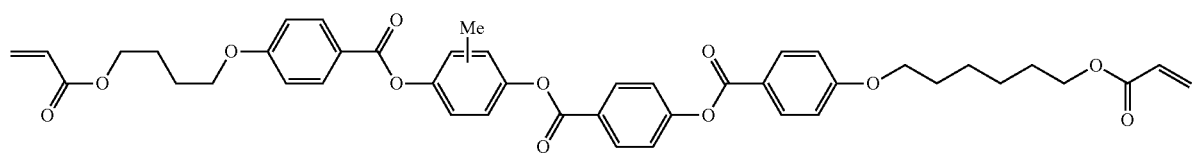
(9L)
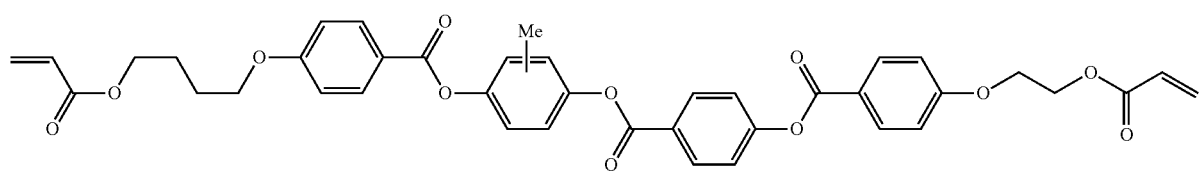
(10L)

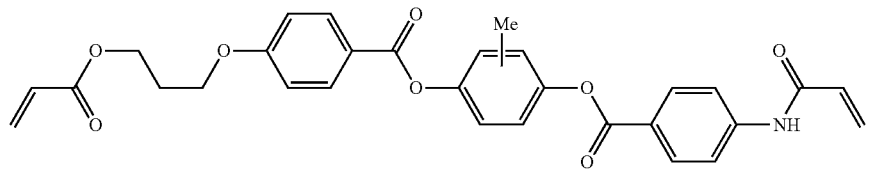
(1M)
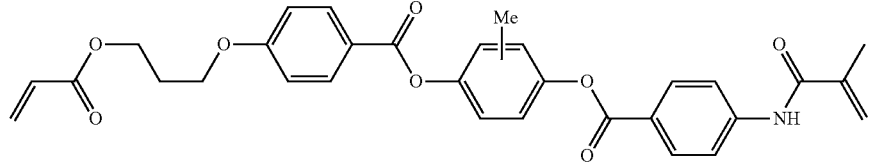
(2M)
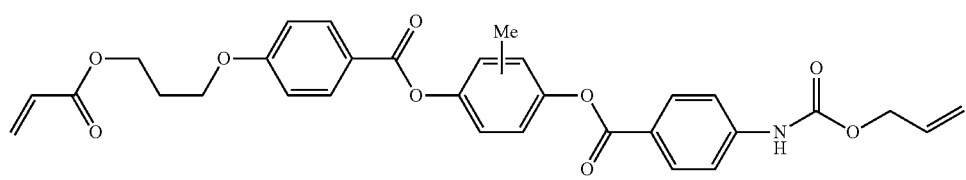
(3M)
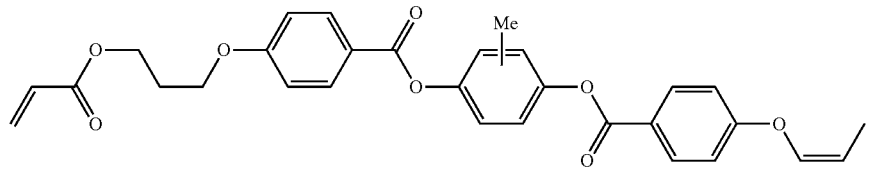
(4M)
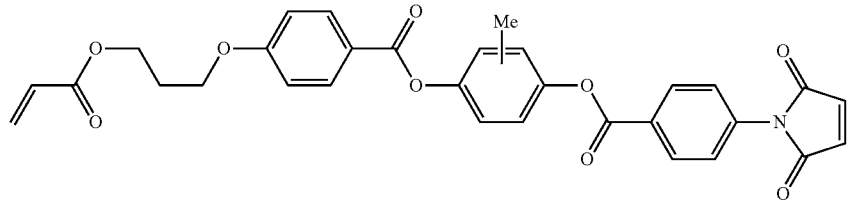
(5M)
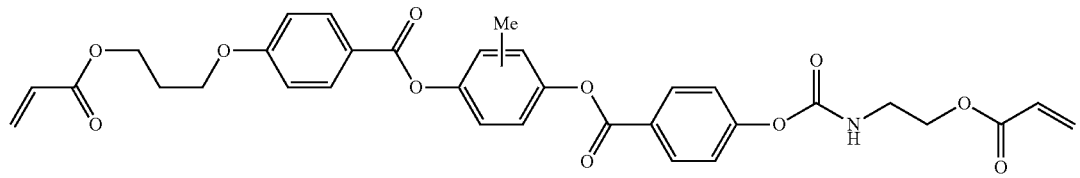
(6M)
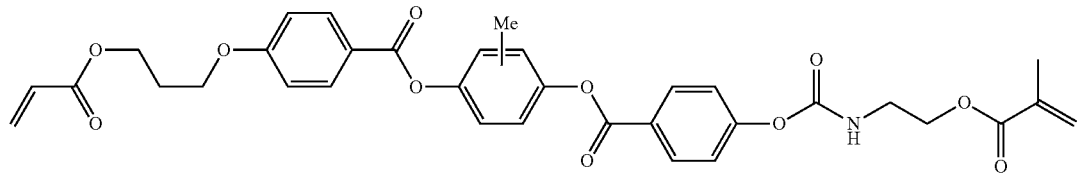
(7M)
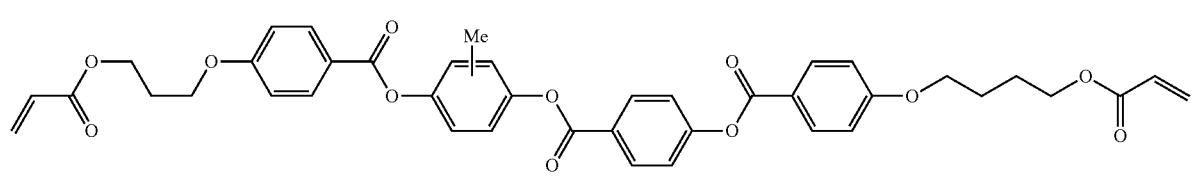
(8M)

-continued
(9M)
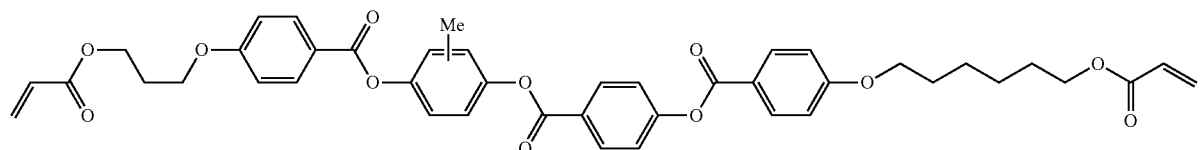
(10M)
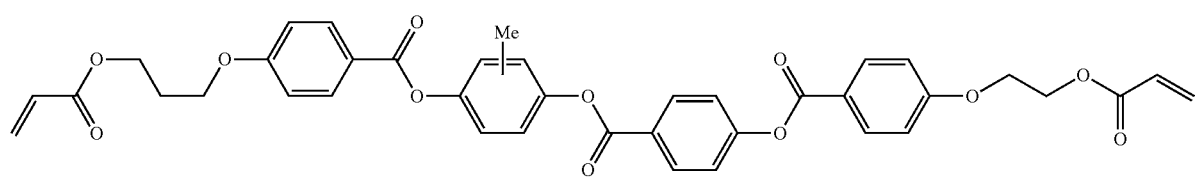
(1N)
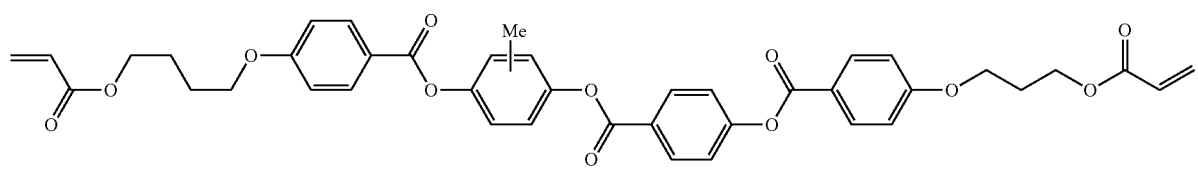
(2N)
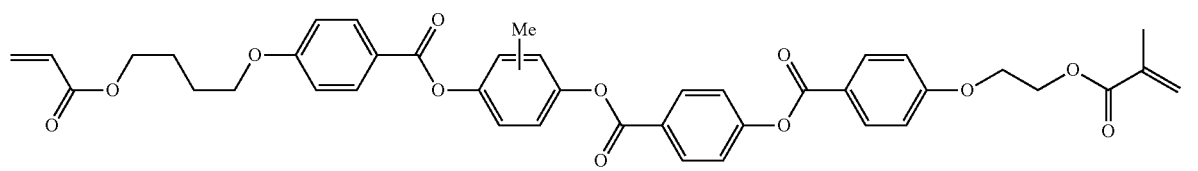
(3N)
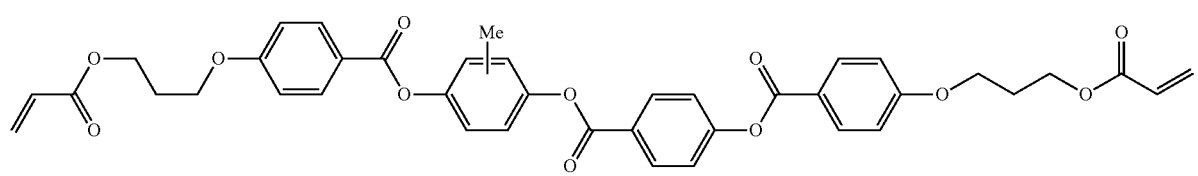
(4N)
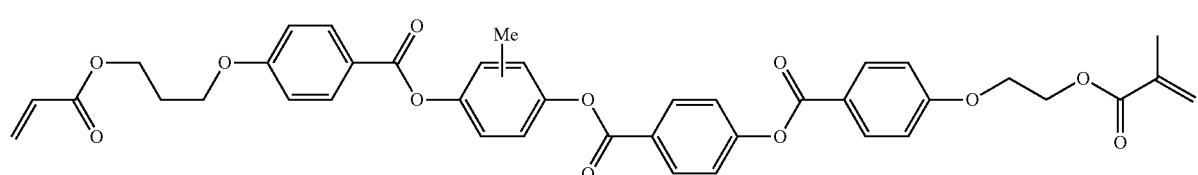
(5N)
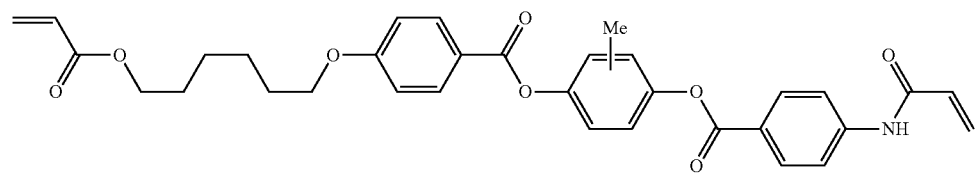
(6N)
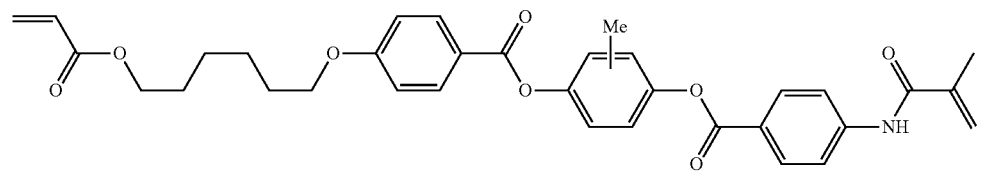

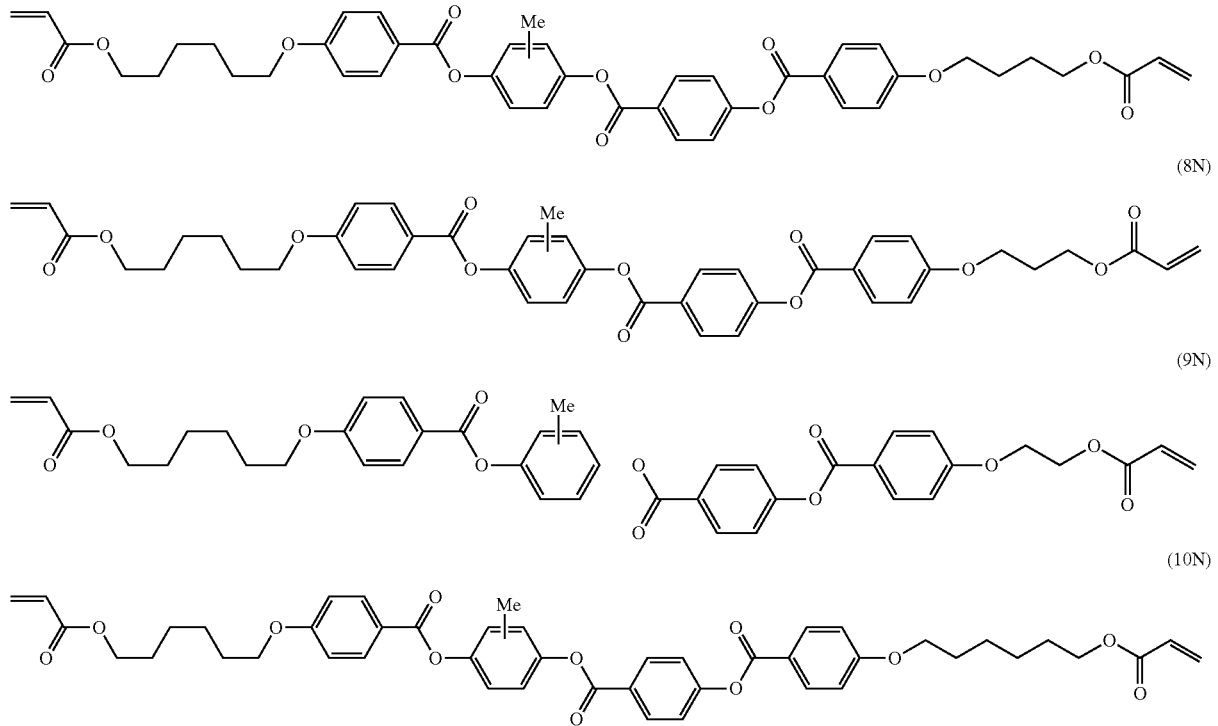

As the liquid crystal compound for use in the present invention, a compound represented by Formula (VI) and also described in JP2014-198814A, in particular, a liquid crystal compound having no (meth)acrylate group represented by Formula (VI) is also suitably used.

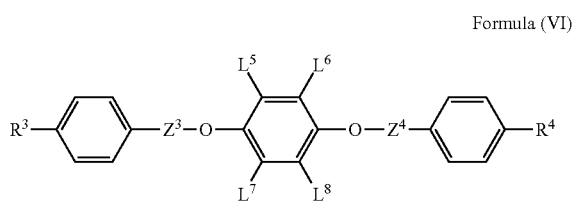

Formula (VI)

In Formula (VI), $Z^3$ represents —C(=O)— or —CH=CH—C(=O)—;

$Z^4$ represents —C(=O)— or —C(=O)—CH=CH—;

$R^3$ and $R^4$ each independently represent a hydrogen atom, a halogen atom, a linear alkyl group having 1 to 4 carbon atoms, a methoxy group, an ethoxy group, an aromatic ring which may have a substituent, a cyclohexyl group, a vinyl group, a formyl group, a nitro group, a cyano group, an acetyl group, an acetoxy group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to carbon atoms, an N-(2-methacryloyloxyethyl)carbamoyloxy group, an N-(2-acryloyloxyethyl)carbamoyloxy group, or a structure represented by Formula (VI-2); and $L^5$, $L^6$, $L^7$, and $L^8$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^5$, $L^6$, $L^7$, or $L^8$ represents a group other than a hydrogen atom.

—$Z^5$-T-Sp-P        Formula (VI-2)

In Formula (VI-2), P represents an acryl group, a methacryl group, or a hydrogen atom, $Z^5$ represents —C(=O)O—, —OC(=O)—, —C(=O)NR$^1$— (where $R^1$ represents a hydrogen atom or a methyl group), —NR$^1$C(=O)—, —C(=O)S—, or —SC(=O)—, T represents 1,4-phenylene, and Sp represents a divalent aliphatic group having 1 to 12 carbon atoms which may have a substituent. Note that one CH$_2$ in this aliphatic group or two or more non-adjacent CH$_2$ may be substituted with —O—, —S—, —OC(=O)—, —C(=O)O—, or —OC(=O)O—.

The compound represented by Formula (VI) is preferably a compound represented by Formula (VII).

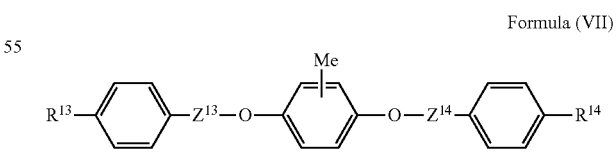

Formula (VII)

In Formula (VII), $Z^{13}$ represents —C(=O)— or —C(=O)—CH=CH—;

$Z^{14}$ represents —C(=O)— or —CH=CH—C(=O)—; and $R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

$Z^{13}$ represents —C(=O)— or —C(=O)—CH=CH— and preferably represents —C(=O)—.

$R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group or a structure represented by Formula (IV-3), preferably represents a methyl group, an ethyl group, a propyl group, a methoxy group, an ethoxy group, a phenyl group, an acryloylamino group, a methacryloylamino group, or a structure represented by Formula (IV-3), and more preferably represents a methyl group, an ethyl group, a methoxy group, an ethoxy group, a phenyl group, an acryloylamino group, a methacryloylamino group or a structure represented by Formula (IV-3).

Specific examples of the compound represented by Formula (VI) are shown below. Note that in the present invention, the compound represented by Formula (VI) is not limited thereto.

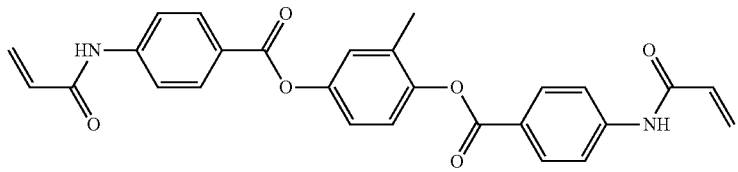
(11L)

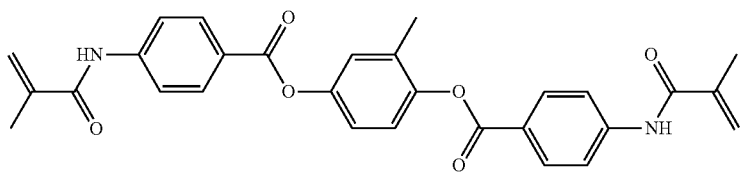
(12L)

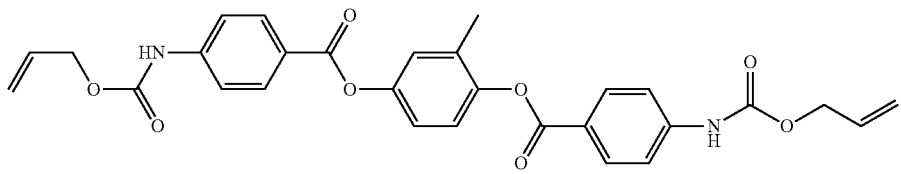
(13L)

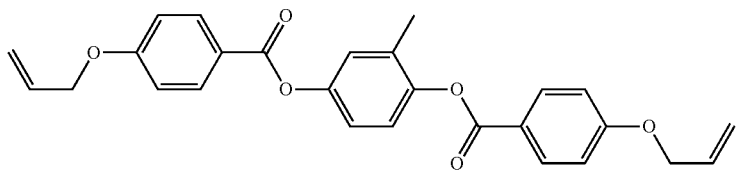
(14L)

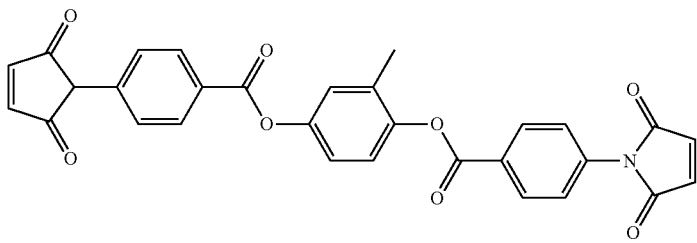
(15L)

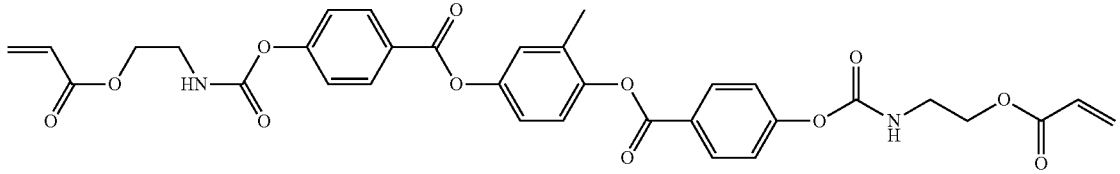
(16L)

-continued
(17L)
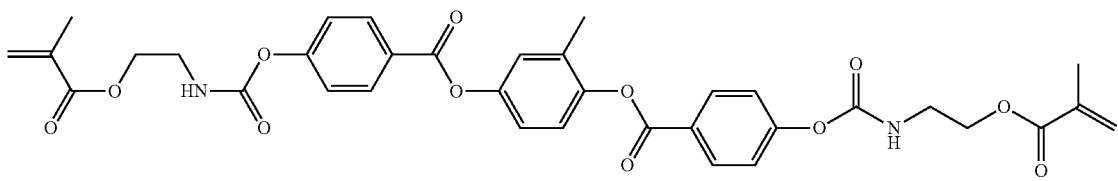
(18L)
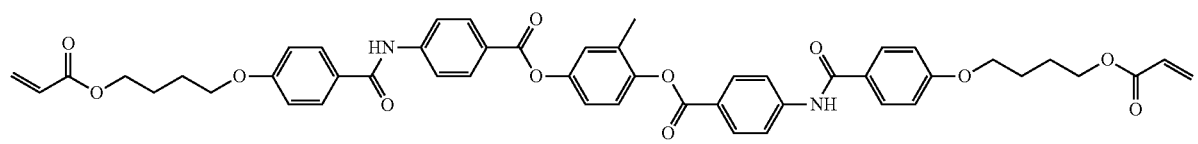
(19L)
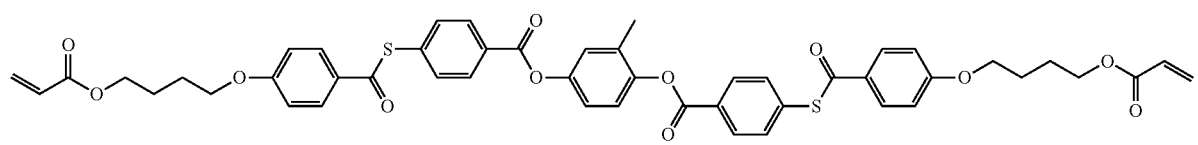
(11M)
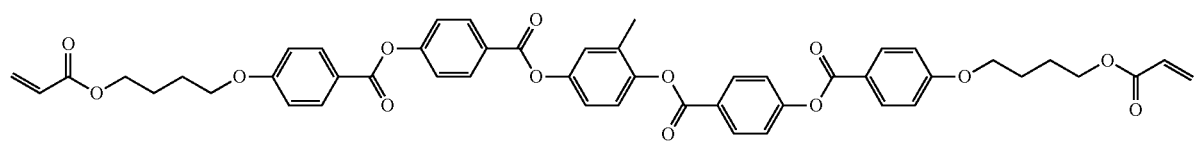
(12M)
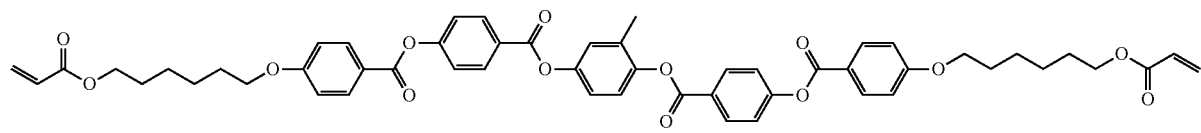
(13M)
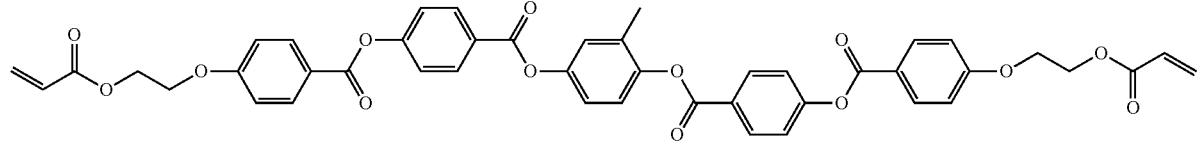
(14M)
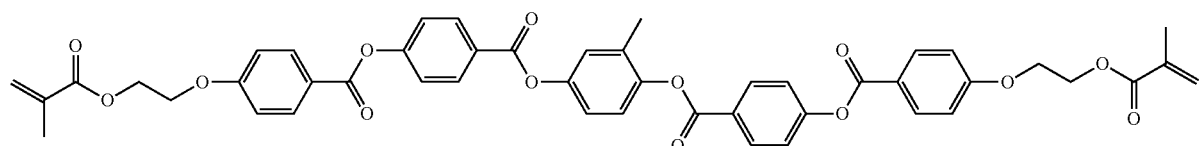
(15M)
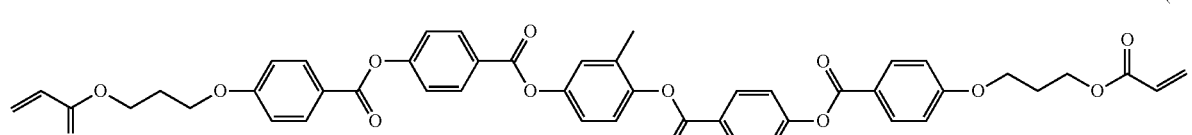
(16M)
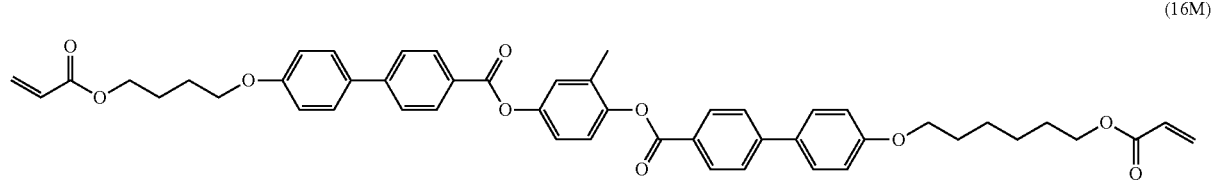

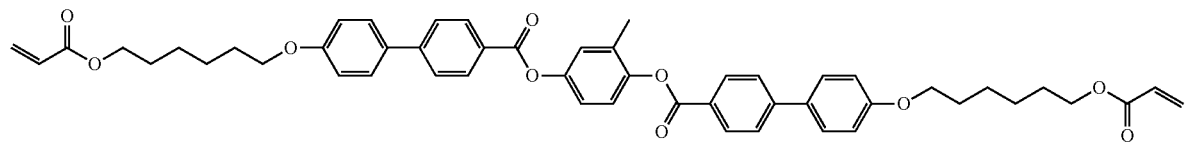
(17M)
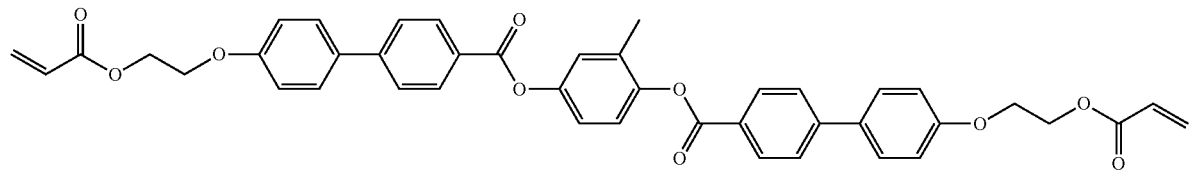
(18M)
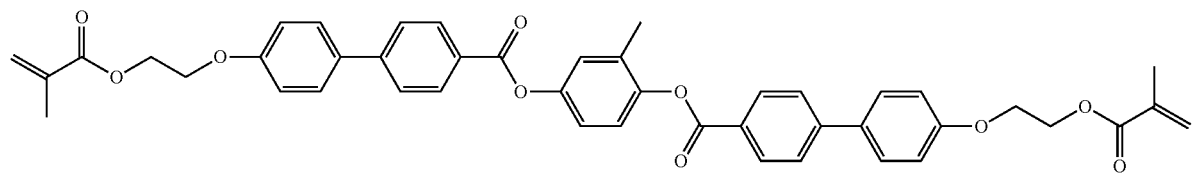
(19M)
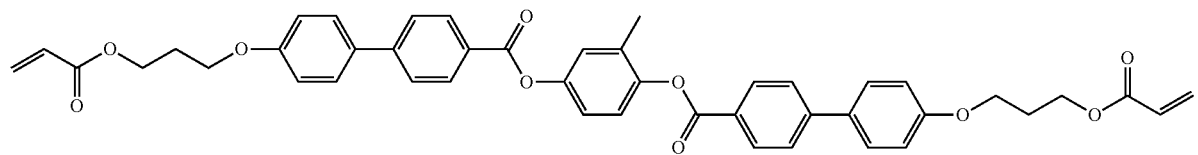
(20M)
As the liquid crystal compound for use in the present invention, similarly, a compound represented by Formula (VIII) and described in JP2014-198814A, in particular, a polymerizable liquid crystal compound having two (meth)acrylate groups represented by Formula (VIII) is also suitably used.
Formula (VIII)
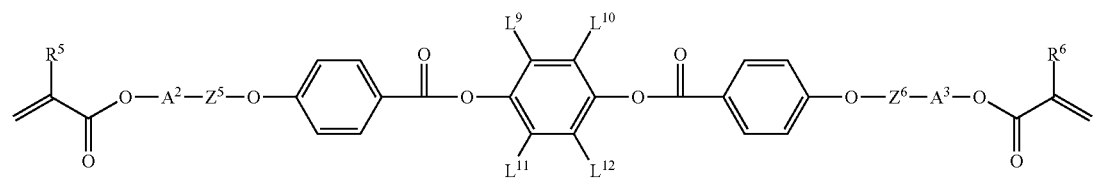

In Formula (VIII), $A^2$ and $A^3$ each independently represent an alkylene group having 2 to 18 carbon atoms, and one $CH_2$ in the alkylene group or two or more non-adjacent $CH_2$ may be substituted with —O—;

$Z^5$ represents —C(=O)—, —OC(=O)—, or a single bond;

$Z^6$ represents —C(=O)—, —C(=O)O—, or a single bond;

$R^5$ and $R^6$ each independently represent a hydrogen atom or a methyl group; and $L^9$, $L^{10}$, $L^{11}$, and $L^{12}$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom or a hydrogen atom, and at least one of $L^9$, $L^{10}$, $L^{11}$, or $L^{12}$ represents a group other than a hydrogen atom.

The compound represented by Formula (VIII) is preferably a compound represented by Formula (IX).

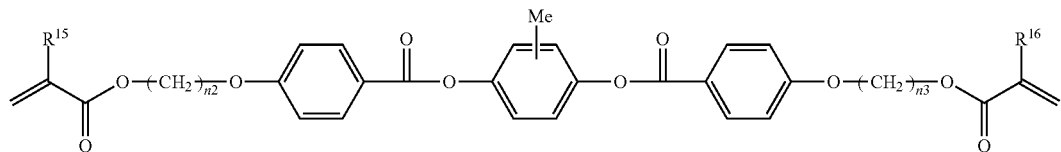

Formula (IX)

In Formula (IX), n2 and n3 each independently represent an integer of 3 to 6; and $R^{15}$ and $R^{16}$ each independently represent a hydrogen atom or a methyl group.

In Formula (IX), n2 and n3 each independently represent an integer of 3 to 6, and it is preferable that n2 and n3 are 4.

In Formula (IX), $R^{15}$ and $R^{16}$ each independently represent a hydrogen atom or a methyl group, and it is preferable that $R^{15}$ and $R^{16}$ represent a hydrogen atom.

Specific examples of the compound represented by Formula (VIII) are shown below. Note that in the present invention, the compound represented by Formula (VIII) is not limited thereto.

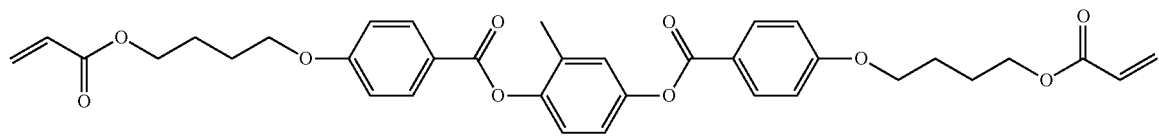

(I-1)

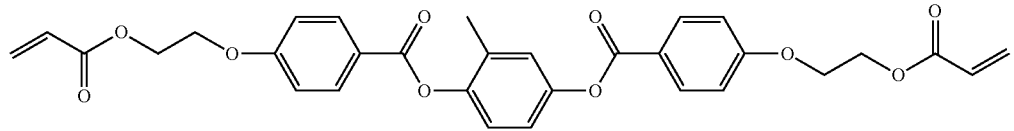

(I-2)

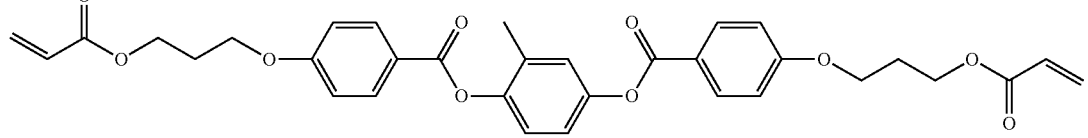

(I-3)

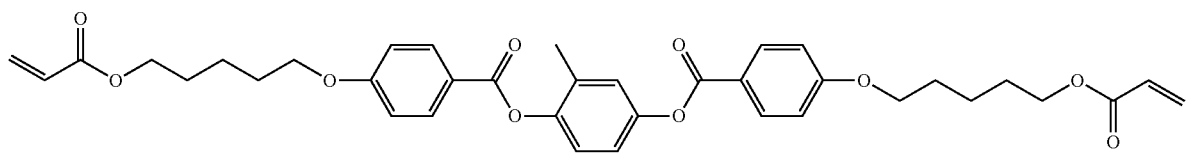

(I-4)

-continued
(I-5)
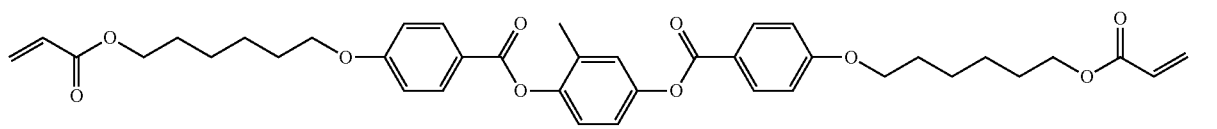
(I-6)
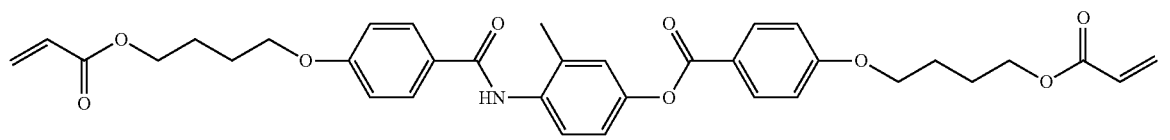
(I-7)
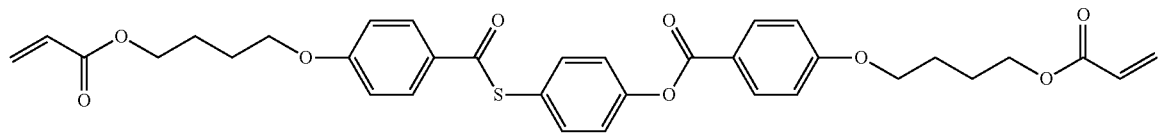
(I-8)
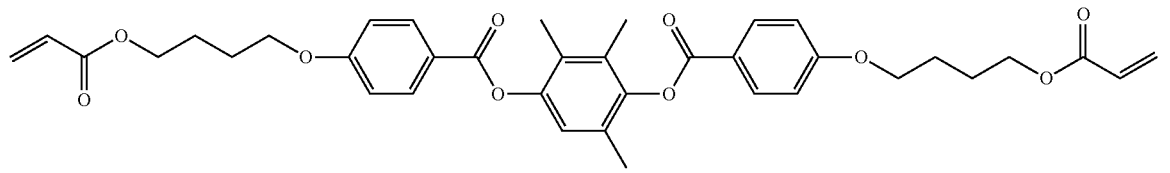
(I-9)
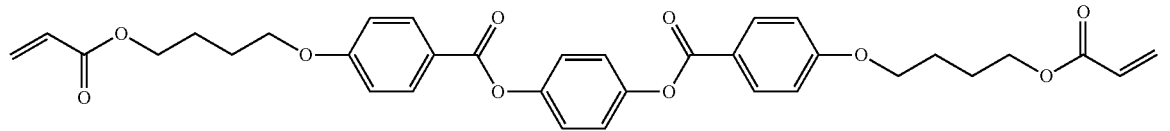
(I-10)
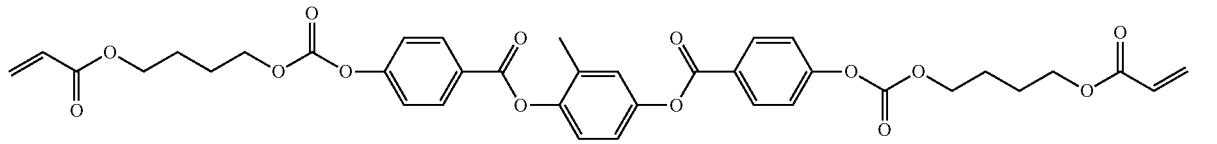
(I-11)
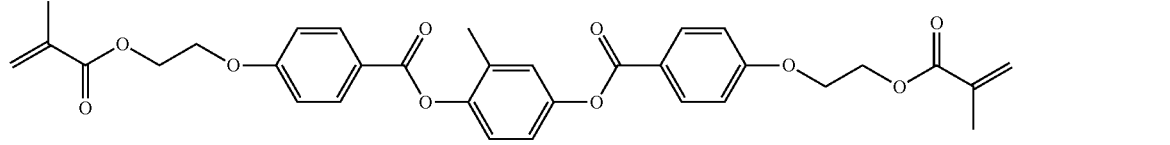
(I-12)
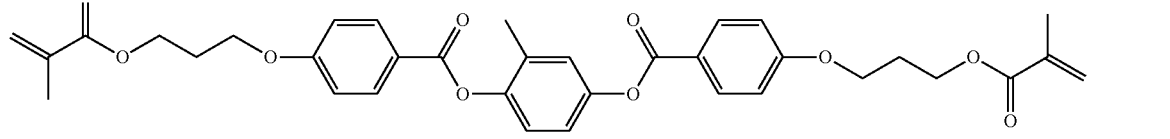
(I-13)
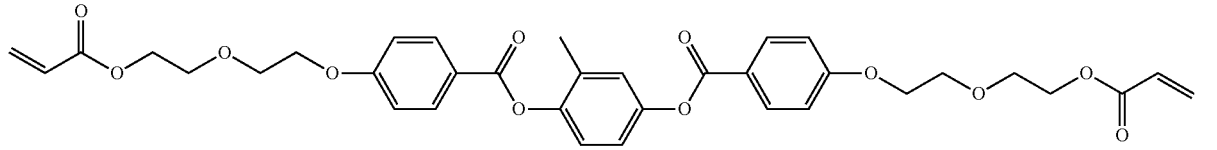

(I-14)

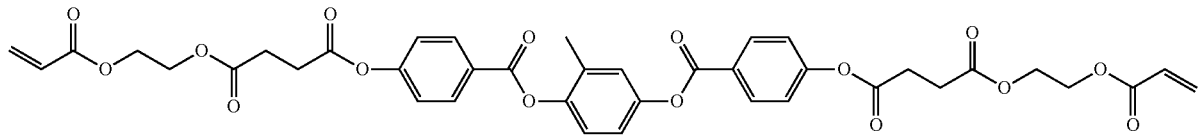

The liquid crystal compounds can be manufactured by known methods.

(Chiral Agent (Chiral Compound))

The composition contains a chiral agent.

The type of the chiral agent is not particularly limited. The chiral agent may be liquid crystalline or non-liquid crystalline. The chiral agent can be selected from a variety of known chiral agents (for example, as described in Liquid Crystal Device Handbook, Chapter 3, Item 4-3, Chiral Agents for Twisted Nematic (TN) and Super Twisted Nematic (STN), page 199, edited by the 142nd Committee of the Japan Society for the Promotion of Science, 1989). The chiral agent typically contains an asymmetric carbon atom. However, an axial asymmetric compound or planar asymmetric compound not containing an asymmetric carbon atom can also be used as the chiral agent. Examples of the axial asymmetric compound or the planar asymmetric compound include binaphthyl, helicene, paracyclophane, and derivatives thereof. The chiral agent may also have a polymerizable group.

A content of the chiral agent in the composition is preferably 0.5% to 30% by mass with respect to a total mass of the liquid crystal compound. Since the chiral agent is less used, the liquid crystallinity is less affected, the chiral agent is preferably used in a smaller amount. Therefore, the chiral agent is preferably a compound having a strong twisting power in order that the compound could achieve twisted alignment of the desired helical pitch even though its amount used is small.

Examples of such a chiral agent having a strong twisting power include the chiral agents described in, for example, JP2002-302487A, JP2002-080478A, JP2002-080851A, JP2002-179668A, JP2002-179670A, JP2002-338575A, JP2002-180051A, JP1987-081354A (JP-S62-081354A), WO2002/006195A, JP2011-241215A, JP2003-287623A, JP2002-302487A, JP2002-080478A, JP2002-080851A, and JP2014-034581A, and LC-756 manufactured by BASF Corporation.

(Optional Components)

The composition may contain components other than the liquid crystal compound and the chiral agent.

(Polymerization Initiator)

The composition may contain a polymerization initiator. In particular, in a case where the liquid crystal compound has a polymerizable group, the composition preferably contains a polymerization initiator.

The polymerization initiator is preferably a photopolymerization initiator capable of initiating a polymerization reaction upon ultraviolet radiation. Examples of the photopolymerization initiator include α-carbonyl compounds (as described in U.S. Pat. No. 2,367,661A and U.S. Pat No. 2,367,670A), acyloin ethers (as described in U.S. Pat. No. 2,448,828A), α-hydrocarbon-substituted aromatic acyloin compounds (as described in U.S. Pat. No. 2,722,512A), polynuclear quinone compounds (as described in U.S. Pat. No. 3,046,127A and U.S. Pat. No. 2,951,758A), combinations of triarylimidazole dimer and p-aminophenyl ketone (as described in U.S. Pat. No. 3,549,367A), acridine and phenazine compounds (as described in JP1985-105667A (JP-S60-105667A) and U.S. Pat. No. 4,239,850A), and oxadiazole compounds (as described in U.S. Pat. No. 4,212,970A).

The content of the polymerization initiator in the composition is not particularly limited, but it is preferably 0.1% to 20% by mass and more preferably 1% to 8% by mass, with respect to the total mass of the liquid crystal compound.

(Alignment Control Agent (Alignment Agent))

The composition may contain an alignment control agent. The composition contains the alignment control agent, which makes it possible to achieve stable or rapid formation of the cholesteric liquid crystalline phase.

Examples of the alignment control agent include fluorine-containing (meth)acrylate-based polymers, compounds represented by General Formulae (X1) to (X3) described in WO2011/162291A, compounds described in paragraphs [0007] to[0029] of JP2012-211306A, compounds described in paragraphs [0020] to[0031] of JP2013-047204A, compounds described in paragraphs [0165] to[0170] of WO 2016/009648A, Paragraphs [00779 to [0081] of the WO2016/092844A, and General formulae (Cy201) to (Cy211) described in Japanese Patent No. 4592225 or the like. Two or more types selected from these may be contained. These compounds can reduce or substantially horizontally align tilt angles of molecules of the liquid crystal compound at an air interface of the layer. Further, in the present specification, a description regarding "horizontally align" means that a major axis of the liquid crystal molecule is parallel to a film surface, and means an alignment less than 20 degrees for the tilt angle to make with a horizontal surface rather than a strict parallel, in the present specification.

The alignment control agent may be used alone or in combination of two or more thereof.

The content of the alignment control agent in the composition is not particularly limited, but it is preferably 0.01% to 10% by mass, more preferably 0.01 to 5% by mass, and still more preferably 0.01 to 1% by mass, with respect to the total mass of the liquid crystal compound.

(Solvent)

The composition may contain a solvent.

The solvent may be, for example, water or an organic solvent. Examples of the organic solvent include amides such as N,N-dimethylformamide; sulfoxides such as dimethylsulfoxide; heterocyclic compounds such as pyridine; hydrocarbons such as benzene and hexane; alkyl halides such as chloroform and dichloromethane; esters such as methyl acetate, butyl acetate, and propylene glycol monoethyl ether acetate; ketones such as acetone, methyl ethyl ketone, cyclohexanone, and cyclopentanone; ethers such as tetrahydrofuran and 1,2-dimethoxyethane; and 1,4-butanediol diacetate. These solvents may be used alone or in combination of two or more thereof.

(Other Additives)

The composition may contain one or two or more other additives such as an antioxidant, an ultraviolet absorber, a sensitizer, a stabilizer, a plasticizer, a chain transfer agent, a polymerization inhibitor, an antifoaming agent, a leveling agent, a thickening agent, a flame retardant, a surface-active substance, a dispersant, and a color material such as a dye and a pigment.

The structure 14 of the present invention as described above can be manufactured by, first, forming the first reflection layer 16 in which the bright portion 20 and the dark portion 24 have the wavy structures in the cross section, on the substrate 12, and forming the upper reflection layer 18 by a coating method using the composition (the upper layer composition) containing the liquid crystal compound and the chiral agent as described above, on the first reflection layer 16.

In the formation of the first reflection layer 16, first, a composition (the first layer composition) containing the liquid crystal compound and the chiral agent as described above is prepared, and the prepared composition is applied to the substrate 12.

The coating method is not particularly limited, and examples thereof include a wire bar coating method, an extrusion coating method, a direct gravure coating method, a reverse gravure coating method, and a die coating method.

Further, if necessary, a treatment for drying the first layer composition with which the substrate 12 is coated may be carried out after the coating. By carrying out the drying treatment, the solvent can be removed from the applied composition.

Next, the first layer composition (a composition layer (a coating film)) applied onto the substrate 12 is heated to align the liquid crystal compound in the composition into a cholesteric liquid crystalline phase state.

A liquid crystalline phase transition temperature of the first layer composition is preferably in the range of 10° C. to 250° C. and more preferably in the range of 10° C. to 150° C. from the viewpoint of manufacturing suitability.

As preferable heating conditions, it is preferable to heat the composition at 40° C. to 100° C. (preferably 60° C. to 100° C.) for 0.5 to 5 minutes (preferably 0.5 to 2 minutes).

The first layer composition is heated to bring the liquid crystal compound into the cholesteric liquid crystalline phase state, and then the composition is cooled or heated to improve the helical twisting power of the chiral agent contained in the first layer composition, and the first reflection layer 16 is formed. That is, the coated layer is subjected to a cooling treatment or a heating treatment so that the helical twisting power (HTP: Helical Twisting Power) of the chiral agent contained in the first layer composition constituting the coated layer (the composition layer) formed on the substrate 12 is enhanced.

By subjecting the coated layer to the cooling treatment and the heating treatment, the helical twisting power of the chiral agent is enhanced, the twist of the liquid crystal compound is increased, and as a result, the alignment of the cholesteric liquid crystalline phase (the tilt of the helical axis) changes, and accordingly, the bright portion 20 and the dark portion 24 parallel to the substrate 12 are changed, and the first reflection layer 16 having the bright portion 20 and the dark portion 24 of the wavy structure (the undulation structure) as shown in FIG. 1 (FIG. 3) (the layer of the composition in the cholesteric liquid crystalline phase state) is formed.

In a case where the first layer composition is cooled, it is preferable to cool the composition so that the temperature of the composition drops by 30° C. or more, from the viewpoint of the more excellent diffuse reflectivity of the first reflection layer 16. Among them, from the viewpoint of the more excellent effects, it is preferable to cool the composition so that the temperature drops by 40° C. or more, and it is more preferable to cool the composition so that the temperature drops by 50° C. or more. The upper limit value of a reduction temperature width of the cooling treatment is not particularly limited, but it is usually about 70° C.

Further, in other words, in a case where the temperature of the composition in the cholesteric liquid crystalline phase state before cooling is T° C., the cooling treatment is intended to cool the composition so that the temperature of the composition is T−30° C. or less.

The method of the cooling is not particularly limited and may be, for example, a method of leaving the substrate on which the composition is disposed in an atmosphere at a predetermined temperature.

A cooling rate in the cooling treatment is not limited, but in order to suitably form the wavy structures of the bright portion 20 and the dark portion 24 of the cholesteric liquid crystalline phase, or further the undulation on the surface of the reflection layer which will be described later, it is preferable to set the cooling rate to a certain degree of speed.

Specifically, for the cooling rate in the cooling treatment, the maximum value thereof is preferably 1° C. per second or more, more preferably 2° C. per second or more.

In a case where the liquid crystal compound has the polymerizable group, the first layer composition on the substrate 12 may be subjected to a curing treatment to fix the cholesteric liquid crystalline phase after the cooling treatment or the heating treatment is carried out. The curing treatment may be performed simultaneously with the cooling treatment or the heating treatment, or may be performed after the cooling treatment or the heating treatment.

Further, as the state in which the cholesteric liquid crystalline phase is "fixed", the most typical and preferable aspect is a state in which the alignment of the liquid crystal compound brought into the cholesteric liquid crystalline phase is retained. The state in which the liquid crystalline phase is "fixed" is not limited thereto, and specifically, it refers to a state in which, in a temperature range of usually 0° C. to 50° C. and in a temperature range of −30° C. to 70° C. under more severe conditions, the layer has no fluidity and can keep a fixed alignment shape stably without causing the change in an alignment shape due to an external field or an external force. In the present invention, as will be described later, it is preferable to fix the alignment state of the cholesteric liquid crystalline phase by a curing reaction proceeding upon the ultraviolet radiation.

Further, in the layer formed by fixing the cholesteric liquid crystalline phase, it is sufficient that optical properties of the cholesteric liquid crystalline phase are retained in the layer, and finally the composition in the layer no longer needs to show the liquid crystallinity.

The method of the curing treatment is not particularly limited, and examples thereof include a photo curing treatment and a thermal curing treatment. Among them, a light radiation treatment is preferable, and the ultraviolet radiation treatment is more preferable.

For ultraviolet radiation, a light source such as an ultraviolet lamp is used.

An amount of ultraviolet radiation energy is not particularly limited, and typically, it is preferably about 0.1 to 0.8 J/cm². In addition, an ultraviolet radiation time is not particularly limited, but it may be determined as appropriate from the viewpoint of both sufficient strength and productivity of the obtained layer.

In this way, the first reflection layer 16 in which the bright portion 20 and the dark portion 24 have the wavy structures is formed, and then the upper reflection layer 18 is formed on the first reflection layer 16 by the coating method.

Accordingly, in the first reflection layer 16 and the upper reflection layer 18, it is possible to form the upper reflection layer 18 that follows the first reflection layer 16 in wavy structure in which the undulations of the wavy structures of the bright portion 20a and bright portion 28a closest to each other coincide.

In the formation of the upper reflection layer 18, first, the upper layer composition containing the liquid crystal compound and the chiral agent as described above is prepared similar to the first layer composition.

Then, the upper layer composition is applied on (the surface of) the first reflection layer 16. As the coating method, the same method as the application method of the first layer composition is used.

Then, after drying the upper layer composition, if necessary, the liquid crystal compound in the composition layer formed on the first reflection layer 16 is aligned into the cholesteric liquid crystalline phase state to form the upper reflection layer 18. In a case where the liquid crystal compound has the polymerizable group, the curing treatment of the composition may be further performed similar to the first reflection layer 16.

In the present invention, it is preferable that the upper reflection layer 18 is formed similar to the first reflection layer 16 described above.

That is, the alignment of the liquid crystal compound in the composition layer formed on the first reflection layer 16 is performed by heating the upper layer composition, and after the liquid crystal compound is aligned, the cooling treatment and the heating treatment of the upper layer composition are performed.

Accordingly, by making the undulations of the wavy structure of the upper reflection layer 18 great, it is possible to form the upper reflection layer 18 having the excellent diffuse reflectivity.

In a case where the reflection layer (the upper reflection layer) is further formed on the upper reflection layer 18, the formation of the upper reflection layer by such a coating method may be repeated depending on the number of the upper reflection layers to be formed.

In the structure 14 of the present invention as described above, a film including the reflection layer showing selective reflection characteristics in the visible light wavelength range can be used as the projection image display screen and a half mirror. In addition, by controlling a reflection band, such a film can also be used as a filter that improves a color purity of display light of a color filter or a display (for example, see JP2003-294948A).

In addition, the structure 14 can be used for various applications such as a polarizing element, a reflection film, an antireflection film, a viewing angle compensation film, holography, and an alignment film, which are components of an optical element.

The structure 14 of the present invention is suitably used particularly as the projection image display member such as the projection image display screen.

That is, by the function of the reflection layer as described above, it is possible to form the projection image by reflecting the circular polarization light of either sense at the wavelength showing the selective reflection in the projection light. The projection image may be visually recognized as such by being displayed on the surface of the projection image display member or may be a virtual image which appears to float above the projection image display member as viewed from an observer.

In addition, as described above, a projection image display member capable of displaying a full color projection image can be produced by preparing and laminating the reflection layers having the apparent center wavelength of the selective reflection in the red light wavelength range, the green light wavelength range, and the blue light wavelength range, respectively.

By adjusting the center wavelength of the selective reflection of each reflection layer according to a light emission wavelength range of the light source used for the image projection and a mode of use of the projection image display member, a clear projection image can be displayed with high efficiency of a light utilization. In particular, by adjusting the center wavelengths of the selective reflection of the reflection layer respectively according to the light emission wavelength range of the light source used for the image projection or the like, the clear color projection image can be displayed with the high efficiency of the light utilization.

In addition, for example, by configuring the projection image display member so as to have the transmittivity to the light in the visible light region, it is possible to provide a half mirror usable as a combiner of a head up display. The projection image display half mirror is capable of displaying the image projected from a projector in a viewable manner, and in a case of observing the projection display half mirror from a surface side same as a surface side on which the image is displayed, it is possible to simultaneously observe information or landscape on the opposite surface side.

EXAMPLES

Hereinafter, the features of the present invention will be described in more detail with reference to Examples and Comparative Examples. The materials, the used amount, the ratio, the contents of a treatment, and the procedures of a treatment described in Examples below may be suitably modified without departing from the spirit of the present invention. Therefore, the scope of the present invention should not be interpreted in a limiting manner by the specific examples described below.

[Preparation of Liquid Crystal Composition 1 to 5]

The components shown in Table 1 below were mixed to prepare liquid crystal compositions (coating liquids) 1 to 5. Further, the amounts of the respective components are all parts by mass.

TABLE 1

|  | Liquid crystal composition 1 | Liquid crystal composition 2 | Liquid crystal composition 3 | Liquid crystal composition 4 | Liquid crystal composition 5 |
| --- | --- | --- | --- | --- | --- |
| Rod-like liquid crystal compound 101 | 55 | 55 | 55 | 0 | 0 |
| Rod-like liquid crystal compound 102 | 30 | 30 | 30 | 0 | 0 |
| Rod-like liquid crystal compound 201 | 13 | 13 | 13 | 85 | 85 |

TABLE 1-continued

|  | Liquid crystal composition 1 | Liquid crystal composition 2 | Liquid crystal composition 3 | Liquid crystal composition 4 | Liquid crystal composition 5 |
|---|---|---|---|---|---|
| Rod-like liquid crystal compound 202 | 2 | 2 | 2 | 15 | 15 |
| Polymerization initiator Irg907 (manufactured by BASF corporation) | 3 | 3 | 3 | 3 | 3 |
| Polymerization sensitizer DETX-S (manufactured by Nippon Kayaku Co., Ltd.) | 1 | 1 | 1 | 1 | 1 |
| Chiral agent A | 4 | 5 | 0 | 0 | 0 |
| Chiral agent LC-756 (manufactured by BASF corporation) | 0 | 0 | 4.2 | 5.4 | 4 |
| Alignment control agent (1) | 0.6 | 0.6 | 0 | 0.06 | 0.6 |
| Alignment control agent (2) | 0 | 0 | 0.05 | 0 | 0 |
| Methyl acetate | 285 | 285 | 285 | 285 | 285 |
| Cyclohexanone | 50 | 50 | 50 | 50 | 50 |
| Set wavelength band (nm) | 600 to 650 | 500 to 600 | 600 to 650 | 500 to 600 | 600 to 650 |

Rod-like liquid crystal compound 101

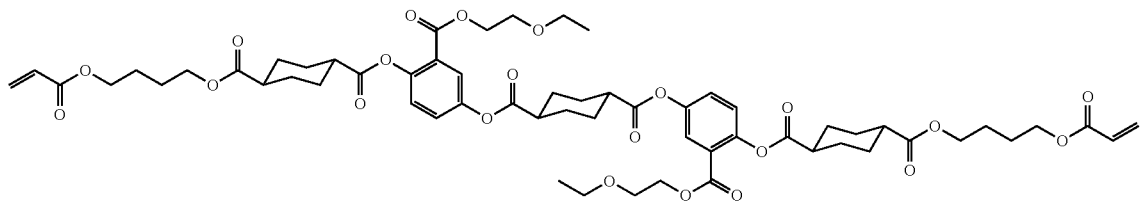 [SMILES: C=CC(=O)OCCCCOC(=O)C1CCC(C(=O)Oc2ccc(OC(=O)C3CCC(C(=O)Oc4ccc(OC(=O)C5CCC(C(=O)OCCCCOC(=O)C=C)CC5)c(C(=O)OCCOCC)c4)CC3)cc2C(=O)OCCOCC)CC1]

Rod-like liquid crystal compound 102

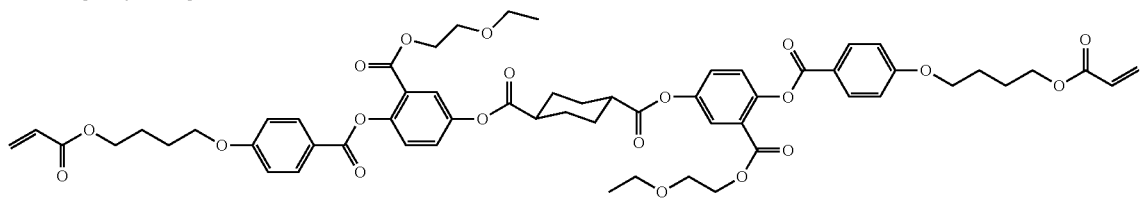 [SMILES: C=CC(=O)OCCCCOc1ccc(C(=O)Oc2ccc(OC(=O)C3CCC(C(=O)Oc4ccc(OC(=O)c5ccc(OCCCCOC(=O)C=C)cc5)c(C(=O)OCCOCC)c4)CC3)cc2C(=O)OCCOCC)cc1]

Rod-like liquid crystal compound 201

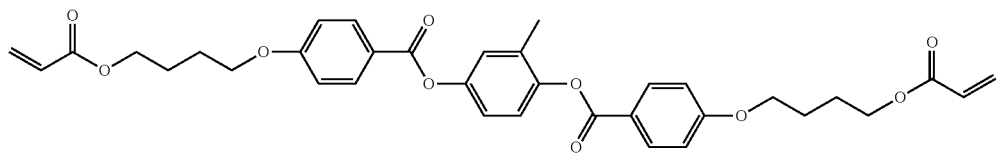 [SMILES: C=CC(=O)OCCCCOc1ccc(C(=O)Oc2ccc(OC(=O)c3ccc(OCCCCOC(=O)C=C)cc3)c(C)c2)cc1]

Rod-like liquid crystal compound 202

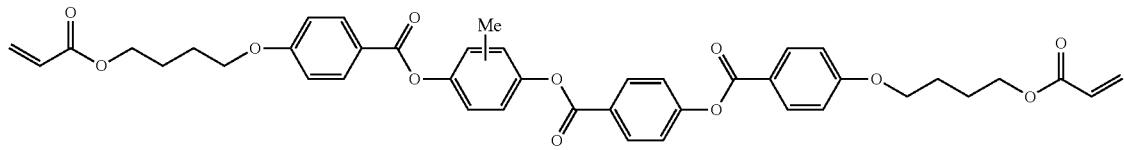

Chiral agent A

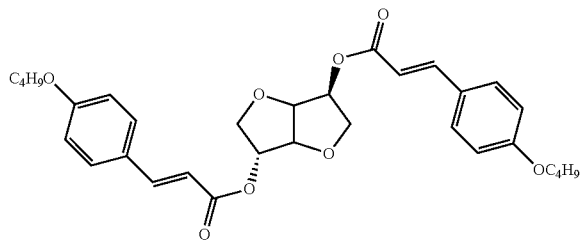

Alignment control agent (1)

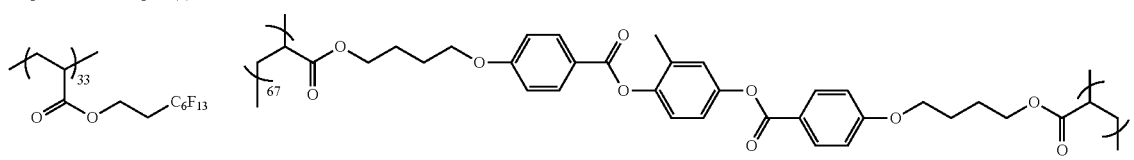

TABLE 1-continued

|  | Liquid crystal composition 1 | Liquid crystal composition 2 | Liquid crystal composition 3 | Liquid crystal composition 4 | Liquid crystal composition 5 |
|---|---|---|---|---|---|
| Alignment control agent (2) | | | | | |

[Chemical structure: $C_6F_{13}$—CH$_2$CH$_2$—O—CH$_2$CH$_2$—O—(phenyl)—C(=O)—O—(methylphenyl)—O—C(=O)—(phenyl)—O—CH$_2$CH$_2$—O—CH$_2$CH$_2$—$C_6F_{13}$]

Example 1

As the substrate 12, a poly-ethylene terephthalate (PET) substrate (manufactured by Toyobo Co., Ltd.) subjected to a rubbing treatment was prepared.

A liquid crystal composition 1 was applied to the surface of the substrate 12 subjected to the rubbing treatment as the first layer composition at room temperature using a wire bar. The coated layer of the liquid crystal composition was dried at room temperature for 50 seconds and then heated in an atmosphere at 95° C. for 1 minute to align the liquid crystal compound.

Thereafter, the coated layer was irradiated with the ultraviolet (UV) rays using a D bulb (lamp, 90 mW/cm$^2$) manufactured by Fusion UV Systems, Inc. at an output of 80% at 30° C. for 8 seconds, so that the first reflection layer 16 was formed on the substrate 12. In the above procedure, after aligning the liquid crystal compound at 95° C., the liquid crystal composition was cooled to 30° C. A part of the formed first reflection layer 16 was peeled off, and the film thickness of the first reflection layer 16 was measured with a shape measuring laser microscope VK-X200 (manufactured by Keyence Corporation) using a 10× objective lens. As a result, the film thickness of the first reflection layer 16 was 3.4 μm.

A liquid crystal composition 2 was applied on the formed first reflection layer 16 as the upper layer composition at room temperature using a wire bar. The coated layer of the liquid crystal composition was dried at room temperature for 50 seconds and then heated in an atmosphere at 95° C. for 1 minute to align the liquid crystal compound.

Thereafter, the coated layer was irradiated with the ultraviolet (UV) rays using a D bulb (lamp, 90 mW/cm$^2$) manufactured by Fusion UV Systems, Inc. at an output of 80% at 30° C. for 8 seconds, and the upper reflection layer 18 was formed on the first reflection layer 16, so that the structure 14 was formed on the substrate 12. In the above procedure, after aligning the liquid crystal compound at 95° C., the liquid crystal composition was cooled to 30° C. As a result of measuring the film thickness of the upper reflection layer 18 formed similar to the first reflection layer 16, the film thickness of the upper reflection layer 18 was 3.4 μm.

Examples 2 to 4 and Comparative Examples 1 to 4

The structure 14 was formed in the same manner as in Example 1, except that the liquid crystal composition to be used and the application amount of the liquid crystal composition were changed.

Further, in Comparative Examples 1 and 2, only one reflection layer was formed.

<Evaluation>

The following evaluations were made on the structure 14 produced in Examples 1 to 4 and Comparative Examples 1 to 4.

«Coincidence of Undulation of Bright Portions Closest to Each Other (Coincidence of Undulation)»

The cross section of the structure 14 was cut with an ultramicrotome, an appropriate pretreatment was carried out, and the measurement was carried out using a SU8030 SEM manufactured by Hitachi High-Technologies Corporation. The measurement results were analyzed to detect whether the undulations of the wavy structures of the bright portion 20a and the bright portion 28a which are closest to each other in the first reflection layer 16 and the upper reflection layer 18 coincide.

Further, in a case where the interface between the first reflection layer 16 and the upper reflection layer 18 is not clear, the interface between both of the reflection layers is determined from the film thickness of each reflection layer to detect the coincidence of the undulations of the wavy structure.

In addition, the wavy structures of the bright portion and the dark portion in the cross section of the reflection layer were confirmed from an SEM image. As a result, in Examples 1 to 4, a clear wavy structure was confirmed in both of the first reflection layer 16 and the upper reflection layer 18.

Also in Comparative Example 1, the clear wavy structure was confirmed in the cross section of the reflection layer. Further, the upper reflection layer 18 of Example 4 and the reflection layer of Comparative Example 1 were formed in the same manner, but compared to the reflection layer of Comparative Example 1, the upper reflection layer 18 of Example 4 had a great wavy structure.

In Comparative Example 2 and Comparative Example 3, no clear wavy structure was confirmed in the cross section of any of the reflection layers (no undulation). In Comparative Example 4, the clear wavy structure was not confirmed in the cross section of the first reflection layer 16 (no undulation), but the similar clear wavy structure was confirmed in the cross section of the upper reflection layer 18.

Figure 5:
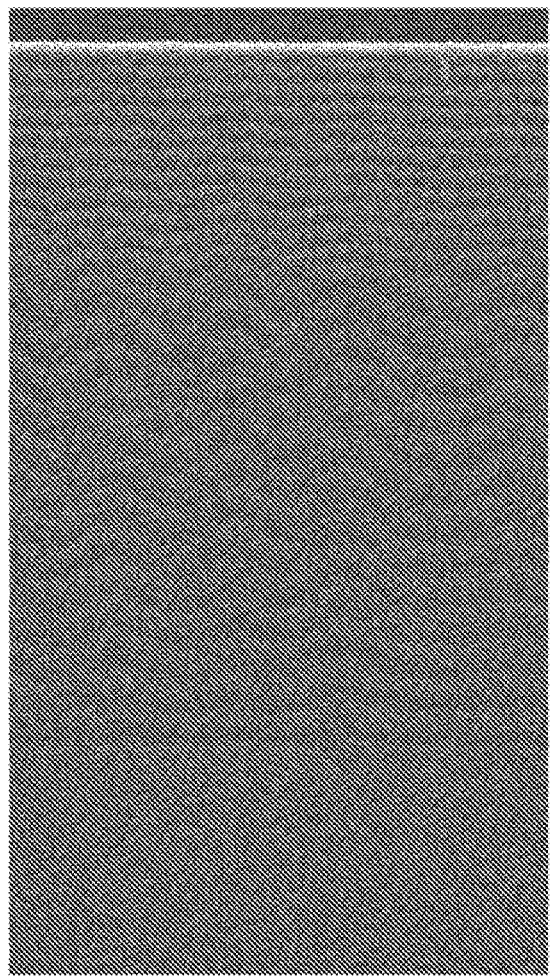
FIG. 5 is a SEM photograph of a cross section of the structure of Example 3.

The SEM photograph of the cross section of the structure of Example 3 is shown in FIG. 5.

«Reflection Amount of 45° Detection Derived from Upper Reflection Layer (45° Reflection Amount)»

On a spectrophotometer V-670 (manufactured by JASCO Corporation) equipped with an absolute reflectivity measuring system, the upper reflection layer 18 was set facing the light source side, and the height of the reflection performance at 45° was evaluated under 0° incident and 45° detection conditions. The reflection performance at 45° was evaluated by creating a graph of the wavelength on a lateral axis and the reflectivity on a vertical axis, removing the reflectivity originating from the substrate, calculating an area of the reflection peak in the region of 500 to 600 nm corresponding to the selective reflection wavelength of the reflection layer (the cholesteric liquid crystalline phase), and then taking the size of this area as the reflection amount at 45°.

The above results are shown in Table 2 below.

structure cannot obtain the diffuse reflectivity even when two layers are laminated. In addition, as shown in Comparative Example 4, by forming the upper reflection layer 18 using the liquid crystal composition 2 forming the wavy structure, a certain degree of the diffuse reflectivity can be

TABLE 2

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| First layer | Liquid crystal composition | 1 | 1 | 1 | 3 | — | — | 5 | 5 |
| | Film thickness [μm] | 3.4 | 3.4 | 3.4 | 3.4 | — | — | 1.6 | 1.6 |
| Upper layer | Liquid crystal composition | 2 | 2 | 4 | 2 | 2 | 4 | 4 | 2 |
| | Film thickness [μm] | 3.4 | 2.0 | 1.7 | 2.0 | 2.0 | 1.6 | 1.7 | 2.0 |
| Coincidence of undulations | | Coincidence | Coincidence | Coincidence | Coincidence | — | — | No undulation | No undulation |
| 45° reflection amount | | 9.1 | 4.5 | 2.0 | 4.3 | 0.7 | 0 | 0.1 | 0.8 |

In the above table, the first layer indicates the first reflection layer, the upper layer indicates the upper reflection layer, respectively, In Comparative Example 4, the upper reflection layer had undulations, but the first reflection layer had no undulation The reflection layer using liquid crystal compositions 1 to 3 has the cross section in which the bright portion and dark portion have the periodic wavy structures (the undulation structure), so that it is possible to form the reflection layer having the diffuse reflectivity that reflects and diffuses the light incident at 0° in the direction of 45°.

Here, in both of the first reflection layer 16 and the upper reflection layer 18 in Examples 1 to 4 which are the structures of the present invention, the bright portion and dark portion have the periodic wavy structures, and the undulations of the wavy structures of the closest bright portion 20a and the bright portion 28a, which are closest to each other, in the first reflection layer 16 and the upper reflection layer 18 coincide, that is, the wavy structure of the upper reflection layer 18 follows the wavy structure of the first reflection layer 16, and thus the high diffuse reflectivity is able to be obtained, originating from the upper reflection layer 18.

Specifically, as shown in Comparative Example 1, by forming the upper reflection layer 18 using the liquid crystal composition 2 capable of forming the wavy structure, it is possible to obtain a certain degree of the diffuse reflectivity, but as shown in Examples 1, 2 and 4, by forming the upper reflection layer 18 having the wavy structure on the first reflection layer 16 having the wavy structure, the upper reflection layer 18 follows the wavy structure of the first reflection layer 16 to have the wavy structure from a vicinity of the interface with the first reflection layer 16, and thus a very good diffuse reflectivity can be obtained.

In addition, as shown in Comparative Example 2, liquid crystal composition 4 does not form the wavy structure of the bright portion and the dark portion, but as shown in Example 3, by setting the liquid crystal composition 1 forming the wavy structure to be the first reflection layer 16, and forming the upper reflection layer 18 including the liquid crystal composition 4 thereon, the upper reflection layer 18 including the liquid crystal composition 4 also forms the wavy structure so that it is possible to obtain the good diffuse reflectivity.

On the other hand, as shown in Comparative Example 3, the liquid crystal composition which does not form the wavy obtained, but since the first reflection layer 16 does not have the wavy structure, the diffuse reflectivity is low compared to the structure of the present invention.

From the above results, the effects of the present invention are obvious.

EXPLANATION OF REFERENCES 10 reflection member
12 substrate
14 structure
16 first reflection layer
18 upper reflection layer
20, 28, B bright portion
20a, 28a bright portions closest to each other
24.30, D dark portion
32, 34 layer
p1. p2 pitch
t phase difference

What is claimed is:

1. A structure comprising:
a plurality of reflection layers formed by fixing a cholesteric liquid crystalline phase, the reflection layers being laminated,
wherein in a reflection layer, a bright portion and a dark portion derived from the cholesteric liquid crystalline phase have wavy structures in a cross section of the structure,
undulations of the wavy structures of bright portions closest to each other coincide in adjacent reflection layers, and
a surface of a reflection layer at a side of the structure has an undulation structure, wherein a phase of undulation of the undulation structure of the surface is opposite to a phase of the undulations of the wavy structures in the cross section of the structure.

2. The structure according to claim 1,
wherein a selective reflection wavelength of at least one of the plurality of reflection layers is different from selective reflection wavelengths of other reflection layers.

3. The structure according to claim 2,
wherein in the reflection layer having the selective reflection wavelength different from those of the other reflection layers, the difference of the selective reflection wavelength from those of the other reflection layers is 10 nm or more.

4. The structure according to claim 1, further comprising three or more of the reflection layers,
   wherein at least one of the reflection layers reflects red light, at least one of the reflection layers reflects green light, and at least one of the reflection layers reflects blue light.

5. The structure according to claim 1,
   wherein in the wavy structure of the reflection layer in the cross section of the structure, a pitch of the wavy structure of the bright portion closest to the adjacent reflection layer is 0.5 to 5 µm.

6. The structure according to claim 1,
   wherein a thickness of the reflection layer is 0.5 to 30 µm.

7. The structure according to claim 1, wherein the selective reflection wavelength of the reflection layer is 200 to 2000 nm.

8. The structure according to claim 1,
   wherein in the undulations of the wavy structures of the closest bright portions in the adjacent reflection layers, while a distance between peaks of convex portions of one of the closest bright portions in one of the adjacent reflection layers is a pitch p1, and a distance between peaks of convex portions of the other of the closest bright portions in the other of the adjacent reflection layers is a pitch p2, a difference between the pitch p1 and the pitch p2 calculated by "[(p1 −p2)/p1]×100" is ±15% or less, and a phase difference t between the peaks of the convex portions of one of the closest bright portions in one of the adjacent reflection layers and the peaks of the convex portions of the other of the closest bright portions in the other of the adjacent reflection layers is 20° or less.

9. The structure according to claim 1, wherein a height of wave in the wavy structures in a reflection layer is highest at a center region of the reflection layer in a thickness direction, and decreases gradually toward both sides of the reflection layer in the thickness direction.

10. A method of manufacturing a structure comprising:
    a step of forming a first reflection layer, which is a layer formed by fixing a cholesteric liquid crystalline phase, and in which a bright portion and a dark portion derived from the cholesteric liquid crystalline phase have wavy structures, in a cross section; and
    a step of forming an upper reflection layer by applying an upper layer composition containing a liquid crystal compound and a chiral agent, and aligning the liquid crystal compound into a cholesteric liquid crystalline phase state,
    wherein after the step of forming the first reflection layer, the step of forming the upper reflection layer is performed on the first reflection layer, or further the step of forming the upper reflection layer is performed once or more times on the formed upper reflection layer, to form a structure in which a plurality of reflection layers including the first reflection layer and the upper reflection layer(s) are laminated, and
    a surface of a reflection layer at a side of the structure has an undulation structure, wherein a phase of undulation of the undulation structure of the surface is opposite to a phase of undulations of the wavy structures in the cross section of the reflection layer.

11. The method of manufacturing a structure according to claim 10,
    wherein in the step of forming the first reflection layer, a treatment is performed, the treatment being for applying a first layer composition containing the liquid crystal compound and the chiral agent onto a substrate, and heating the applied first layer composition to align the liquid crystal compound into the cholesteric liquid crystalline phase state, and then a treatment for cooling or heating the first layer composition is performed.

12. The method of manufacturing a structure according to claim 11,
    wherein in the step of forming the first reflection layer, a treatment for curing the first layer composition is performed simultaneously with the cooling or the heating of the first layer composition, or after the first layer composition is cooled or heated.

13. The method of manufacturing a structure according to claim 10,
    wherein in the step of forming the upper reflection layer, in a case where at least one of the upper reflection layers is formed, after the upper layer composition is applied, the upper layer composition is heated to align the liquid crystal compound into the cholesteric liquid crystalline phase state, and then the upper layer composition is cooled.

* * * * *